(12) United States Patent
Okamoto et al.

(10) Patent No.: US 7,653,831 B2
(45) Date of Patent: Jan. 26, 2010

(54) STORAGE SYSTEM AND DATA GUARANTEE METHOD

(75) Inventors: Takeki Okamoto, Odawara (JP); Takao Sato, Odawara (JP); Mikio Fukuoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 11/680,106

(22) Filed: Feb. 28, 2007

(65) Prior Publication Data
US 2008/0162826 A1 Jul. 3, 2008

(30) Foreign Application Priority Data
Dec. 28, 2006 (JP) .............................. 2006-355692

(51) Int. Cl.
*G06F 11/00* (2006.01)
(52) U.S. Cl. .......................................... 714/6; 714/758
(58) Field of Classification Search ........................ None
See application file for complete search history.

(56) References Cited

U.S. PATENT DOCUMENTS 6,883,131 B2 * 4/2005 Acton ......................... 714/755
7,421,547 B2 * 9/2008 Matsui et al. ................ 711/156
2003/0066010 A1 * 4/2003 Acton ......................... 714/758
2006/0206640 A1 9/2006 Abe
2007/0198890 A1 * 8/2007 Dholakia et al. ............. 714/758

FOREIGN PATENT DOCUMENTS

JP 2006-251960 9/2006

\* cited by examiner

*Primary Examiner*—Michael C Maskulinski
(74) *Attorney, Agent, or Firm*—Brundidge & Stanger, P.C.

(57) ABSTRACT

Proposed is a storage system and a data guarantee method capable of guaranteeing and verifying the reliability of data in a short period of time even with the heavy usage of inexpensive hard disk drives. This storage system having a storage apparatus that provides a storage extent for reading and writing data from and in a host system, and a storage controller for controlling the storage apparatus includes a first generation unit for generating a guarantee number in data from a host system to be stored in the storage apparatus showing the guarantee of the data, a second generation unit for generating a guarantee number showing the guarantee of parity data corresponding to data from the host system, and a verification unit for verifying the guarantee number showing the guarantee of data from the host system and the guarantee number showing the guarantee of the parity data.

10 Claims, 54 Drawing Sheets

FIG.4

| 900A | 900B | 900C | 900D | 900E | 900F |
|---|---|---|---|---|---|
| FLAG | MESSAGE ID | SENDING ID | ADDRESS OF SENT CONTENTS | RECEPTION ID | ADDRESS OF RECEIVED CONTENTS |
| VALID | 1 | MPC1 | AAAAA | MPD1 | AAAAA |
| VALID | 2 | MPC2 | BBBBB | MPD2 | BBBBB |
| ... | ... | ... | ... | ... | ... |
| INVALID | n | MPC4 | NNNNN | MPD4 | NNNNN |

| 910A | 910B | 910C | 910D | 910E | | | |
|---|---|---|---|---|---|---|---|
| RAID GROUP NUMBER | RAID LEVEL | STATUS | HARD DISK DRIVE QUANTITY | HARD DISK DRIVE ID | | | |
| | | | | ID0 | ID1 | ... | IDn |
| 1 | 6 | USABLE | 4 | HDD1-1 | HDD2-1 | ... | UNLOADED |
| 2 | 5 | USABLE | n | HDD2-1 | HDD2-2 | ... | UNLOADED |
| ... | ... | ... | ... | ... | ... | ... | ... |
| n | 1 | UNUSABLE | 4 | HDDn-1 | HDDn-2 | ... | HDDn-n |

| ID (912A) | STATUS (912B) |
|---|---|
| 1-1 | USABLE |
| 1-2 | USABLE |
| ⋮ | ⋮ |
| m-n | UNUSABLE |

| HARD DISK DRIVE ID (920A) | SECTOR FAILURE COUNTER (920B) | MECHANICAL FAILURE COUNTER (920C) | REPLY FAILURE COUNTER (920D) |
|---|---|---|---|
| HDD1-1 | 0 | 0 | 0 |
| HDD1-2 | 0 | 0 | 0 |
| ⋮ | ⋮ | ⋮ | ⋮ |
| HDDn-n | 0 | 0 | 1 |

920

STORAGE SYSTEM AND DATA GUARANTEE METHOD

CROSS REFERENCES

This application relates to and claims priority from Japanese Patent Application No. 2006-355692, filed on Dec. 28 2006, the entire disclosure of which is incorporated herein by reference.

BACKGROUND

The present invention generally relates to a storage system and a data guarantee method, and, for instance, can be suitably applied to a storage system using inexpensive hard disk drives.

In recent years, pursuant to the development of information society, the volume of data from a host system to be stored in a storage apparatus is increasing rapidly, and the storage capacity in a storage apparatus is being enlarged according to such rapid increase. Thus, in a storage apparatus, a disk array configured from RAID (Redundant Array of Independent/inexpensive Disks) is foremost created from hard disk drives, and a plurality of such physical storage resources are gathered to create a physical volume in order to seek the enlargement of the storage capacity in the storage apparatus.

As the hard disk drives supporting the foregoing RAID configuration, there are expensive hard disk drives having high performance and high reliability of data, and inexpensive hard disk drives capable of storing large capacity data but unable to guarantee the reliability of data.

These hard disk drives are used appropriately in consideration of the quality and volume of data to be stored in the storage apparatus, customer needs, and other factors.

Particularly in recent years, demands for storing data with the heavy use of inexpensive hard disk drives are increasing.

As primary technology for increasing the reliability of data to be stored in inexpensive hard disk drives, there is the method disclosed in Japanese Patent Laid-Open Publication No. 2006-251960. Japanese Patent Laid-Open Publication No. 2006-251960 proposes a method of guaranteeing the reliability of data by creating compressed data of host data, and comparing the compressed data and data to be stored in a storage extent that is different from the storage extent to which such compressed data is to be stored.

SUMMARY

When engaging in the heavy use of inexpensive hard disk drives as described above, there is a possibility that data will not be written accurately in the target storage extent inside the hard disk drive.

Further, in order to ensure the reliability of data, it is necessary to verify whether all data to be stored have been accurately written in the target storage extent, and much time is required in order to verify each and every data individually.

The present invention was devised in view of the foregoing problems. Thus, an object of the present invention is to provide a storage system and a data guarantee method capable of guaranteeing and verifying the reliability of data in a short period of time even with the heavy usage of inexpensive hard disk drives.

In order to achieve the foregoing object, the present invention provides a storage system having a storage apparatus that provides a storage extent for reading and writing data from and in a host system, and a storage controller for controlling the storage apparatus. This storage system comprises a first generation unit for generating a guarantee number in data from a host system to be stored in the storage apparatus showing the guarantee of the data, a second generation unit for generating a guarantee number showing the guarantee of parity data corresponding to data from the host system, and a verification unit for verifying the guarantee number showing the guarantee of data from the host system and the guarantee number showing the guarantee of the parity data.

Thereby, it is possible to ensure the reliability of data to be stored in the storage apparatus since a guarantee number of data from the host system and a guarantee number of parity data corresponding to such data are generated and both guarantee numbers are verified upon storing data from the host system in the storage apparatus.

The present invention further provides a data guarantee method of a storage system having a storage apparatus that provides a storage extent for reading and writing data from and in a host system, and a storage controller for controlling the storage apparatus. This data guarantee method comprises a first generation step for generating a guarantee number in data from a host system to be stored in the storage apparatus showing the guarantee of the data, a second generation step for generating a guarantee number showing the guarantee of parity data corresponding to data from the host system, and a verification step for verifying the guarantee number showing the guarantee of data from the host system and the guarantee number showing the guarantee of the parity data.

Thereby, it is possible to ensure the reliability of data to be stored in the storage apparatus since a guarantee number of data from the host system and a guarantee number of parity data corresponding to such data are generated and both guarantee numbers are verified upon storing data from the host system in the storage apparatus.

According to the present invention, it is possible to guarantee the reliability of data even with the heavy use of inexpensive hard disk drives.

Further, it is possible to verify the reliability of data to be stored in the hard disk drive in a short period of time inside the storage system.

DESCRIPTION OF DRAWINGS

FIG. 4 is a conceptual diagram showing a message information table according to an embodiment of the present invention;

FIG. 5 is a conceptual diagram showing a RAID group information table according to an embodiment of the present invention;

FIG. 6 is a conceptual diagram showing a hard disk drive information table according to an embodiment of the present invention;

FIG. 7 is a conceptual diagram showing a failure information table according to an embodiment of the present invention;

DETAILED DESCRIPTION

An embodiment of the present invention is now explained in detail with reference to the attached drawings.

Figure 1:
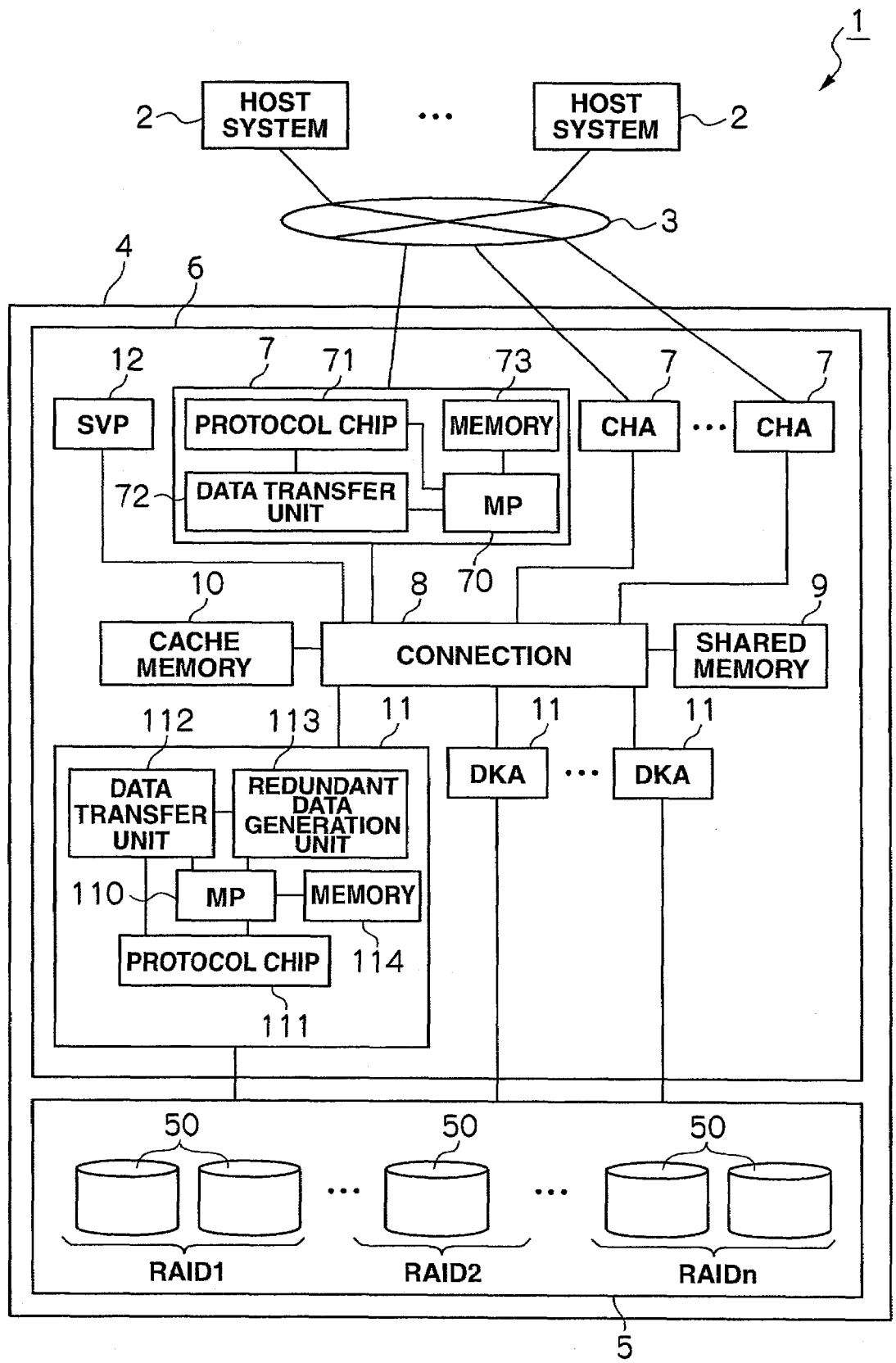
FIG. 1 is a block diagram showing the overall configuration of a storage system according to an embodiment of the present invention.

(1) First Embodiment (1-1) Configuration of Storage System in First Embodiment (1-1-1) Overall Configuration of Storage System FIG. 1 shows the overall storage system 1 according to the present embodiment. The storage system 1 is configured by a host system 2 being connected to a storage apparatus 4 via a network 3.

The host system 2 is a computer device comprising information processing resources such as a CPU (Central Processing Unit) and a memory, and, for instance, is configured from a personal computer, a workstation, a mainframe or the like. Further, the host system 2 comprises an information input device (not shown) such as a keyboard, a switch, a pointing device or a microphone, and an information output device (not shown) such as a monitor display or a speaker.

The network 3, for instance, is configured from a SAN (Storage Area Network), a LAN (Local Area Network), Internet, a public line, a dedicated line or the like. Communication between the host system 2 and the storage apparatus 4 via the network 3, for instance, is conducted according to a fibre channel protocol when the network 3 is a SAN, and conducted according to a TCP/IP (Transmission Control Protocol/Internet Protocol) protocol when the network 3 is a LAN.

The storage apparatus 4 comprises a disk drive unit 5 configured from a plurality of hard disk drives 50, and a controller 6 that manages the plurality of hard disk drives 50 according to the RAID (Redundant Array of Independent/Inexpensive Disks) system.

The hard disk drive 50, for instance, is configured from an expensive disk drive such as a SCSI (Small Computer System Interface) disk, or an inexpensive disk drive such as a SATA (Serial AT Attachment) disk or an optical disk drive. In this embodiment, the hard disk drive 50 is configured from an inexpensive disk drive such as a SATA (Serial AT Attachment) disk or an optical disk drive.

The controller 6 comprises a plurality of channel adapters 7, a connection 8, a shared memory 9, a cache memory 10, a plurality of disk adapters 11 and a service processor 12.

Each channel adapter 7 is configured as a microcomputer system comprising a microprocessor 70, a protocol chip for interpreting an interface protocol of the host system 2, a data transfer unit 72 equipped with a DMA (Direct Memory Access) circuit for sending and receiving data at high speed, a memory 73, a communication interface and the like, and comprises a port (not shown) for connecting to the network 3. Each channel adapter 7 executes necessary processing by interpreting various commands sent from the host system 2. The port of each channel adapter 7 is assigned a network address (for instance, an IP address or WWN) for respectively identifying the ports, and the channel adapters 7 are thereby able to function independently as a NAS (Network Attached Storage). And each channel adapter 7 is connected to the connection 8 via an internal bus adapter (not shown).

The connection 8, in addition to the channel adapters 7 described above, is connected to the shared memory 9, the cache memory 10 and the disk adapters 11. The sending and receiving of data and commands among the channel adapters 7, the shared memory 9, the cache memory 10 and the disk adapters 11 are conducted via the connection 8. The connection 8 is configured from a switch such as an ultrafast crossbar switch or a bus capable of sending data with high-speed switching.

The shared memory 9 is a storage memory to be shared by the channel adapters 7 and the disk adapters 11. The shared memory 9 is primarily used for storing the system configuration information and various control programs read from the system volume when the storage apparatus 4 is turned on, and commands from the host system 2. The shared memory 9 will be described in detail later.

The cache memory 10 is also a storage memory to be shared by the channel adapters 7 and the disk adapters 11. The cache memory 10 is primarily used for temporarily storing user data to be input and output to and from the storage apparatus 4.

Each disk adapter 11 is configured as a microcomputer system comprising a microprocessor 110, a memory (not shown), a protocol chip 111 for interpreting an interface protocol of the hard disk drive 50, a data transfer unit 112 equipped with a DMA circuit for sending and receiving data at high speed, a redundant data generation unit 113 equipped with a DRR (Data Recovery Reconstruct) circuit for generating redundant data and the like, and functions as an interface for controlling the protocol during communication with the disk drive unit 5. In this embodiment, the redundant data generation unit 113 is used for generating parity data. These disk adapters 11, for instance, are connected to the corresponding disk drive units 5 via a fibre channel cable, and send and receive data to and from the disk drive units 5 according to a fibre channel protocol.

The service processor 12 is a computer device to be operated for maintaining or managing the storage apparatus 4, and, for instance, is configured from a personal laptop computer. The service processor 12 is connected to the host system 2 via the network 3, and is able to receive data and commands from the host system 2. The service processor 12 is able to monitor the occurrence of a failure in the storage apparatus 4 and display such failure on a display screen (not shown).

(1-1-2) Configuration of Memory in Channel Adapter

Configuration of the memory 73 in the foregoing channel adapters 7 is now explained.

Figure 2:
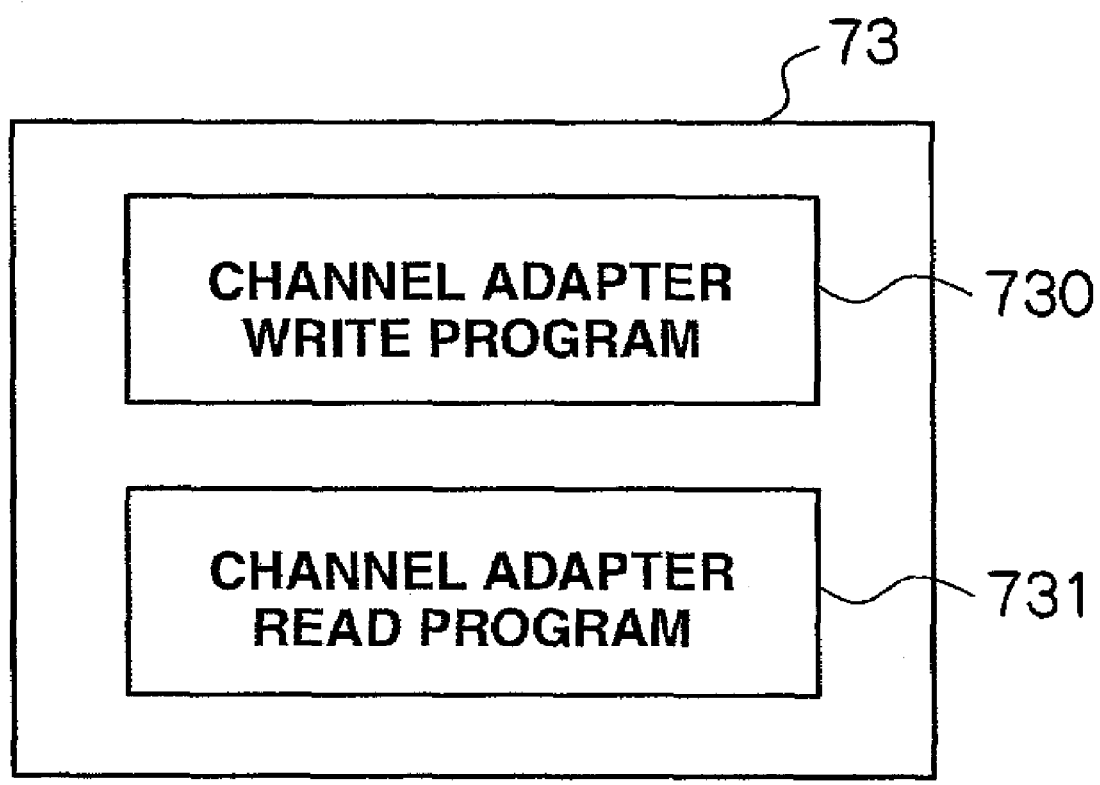
FIG. 2 is a block diagram showing the contents of a memory of a channel adapter according to an embodiment of the present invention.

The channel adapters 7, as shown in FIG. 2, comprise a channel adapter write program 73 to be executed based on a write request of host data from the host system 2, and a channel adapter read program 731 to be executed based on a read request of read data from the host system 2.

(1-1-3) Configuration of Shared Memory

The configuration of the foregoing shared memory 9 is now explained.

Figure 3:
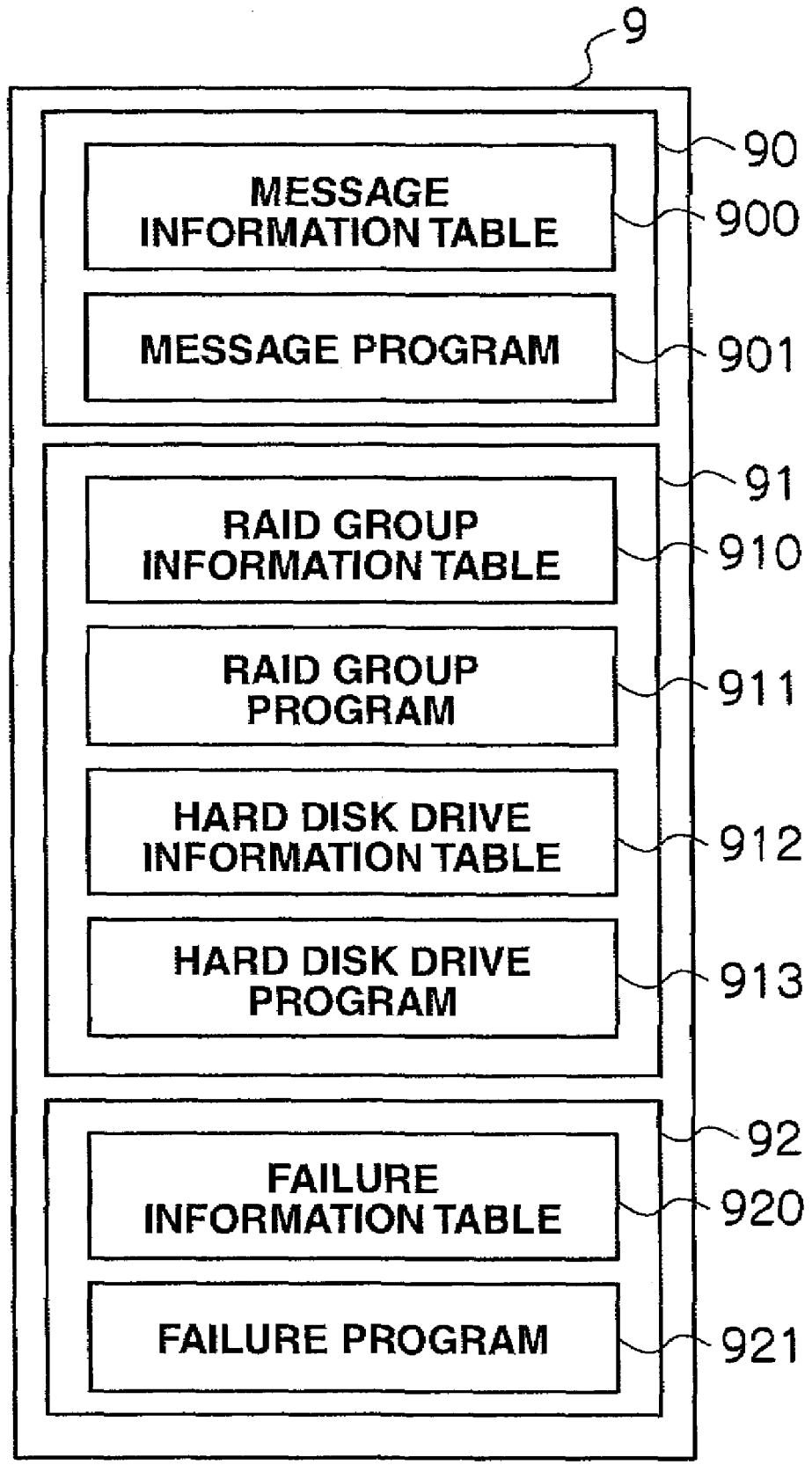
FIG. 3 is a block diagram showing the contents of a shared memory according to an embodiment of the present invention.

The shared memory 9, as shown in FIG. 3, comprises a message area 90 for storing communication messages between the channel adapters 7 and the disk adapters 11, a configuration information area 91 for storing RAID configuration information in the hard disk drive 50, and a failure management area 92 for storing the failure count of the hard disk drive 50.

The message area 90 comprises a message information table 900 for managing communication messages between the channel adapters 7 and the disk adapters 11, and a message program 901 for adding, changing or deleting information in the foregoing table.

The message information table 900, as shown in FIG. 4, is a table for managing the source and destination of the communication message.

The message information table 900 is configured from a "flag" field 900A showing whether the communication message is valid/invalid, a "message code" field 900B for identifying the communication message, a "send code" field 900C for identifying the microprocessor 70 of the channel adapter 7 as the source of the communication message, an "address of sent contents" field 900D showing the address of the sent contents, a "receive code" field 900E for identifying the microprocessor 110 of the disk adapter 11 as the destination of the communication message, and an "address of received contents" field 900F showing the address of the received contents.

The configuration information area 91 comprises a RAID group information table 910 for storing RAID configuration information in the hard disk drive 50, a RAID group program 911 for adding, changing or deleting information in the information table 910, a hard disk drive information table 912 for storing configuration information of the hard disk drive 50, and a hard disk drive program 913 for adding, changing or deleting information in the information table 912.

The RAID group information table 910, as shown in FIG. 5, is a table for managing the configuration information that configures the RAID group. The RAID group information table 910 is configured from a "RAID group number" field 910A showing the RAID group number, a "RAID level" field 910B showing the RAID level, a "status" field 910C showing the usability status of the RAID group, a "hard disk drive quantity" field 910D showing the number of hard disk drives 50 configuring the RAID group, and a "hard disk drive code" field 910E for identifying the hard disk drives contained in the RAID group.

The hard disk drive information table 912, as shown in FIG. 6, is a table for managing the configuration information that configures the hard disk drive.

The hard disk drive table 912 is configured from a "hard disk drive code" field 912 for identifying the hard disk drive, and a "status" field 912B showing the usability status of the hard disk drive.

The failure information table 920, as shown in FIG. 7, is a table for managing the type of failure and the number of times a failure occurred in the hard disk drive.

The failure information table 920 is configured from a "hard disk drive code" field 920A for identifying the hard disk drive, a "sector failure counter" field 920B for counting the number of failures in the hard disk drive in sector units, a "mechanical failure counter" field 920C for counting the number of mechanical failures in the hard disk drive, and a "reply failure counter" field 920D showing the number of time the hard disk drive did not offer a reply within a specified period of time.

(1-1-4) Configuration of Memory in Disk Adapter

Configuration of the memory 114 in the foregoing disk adapters 11 is now explained.

Figure 8:
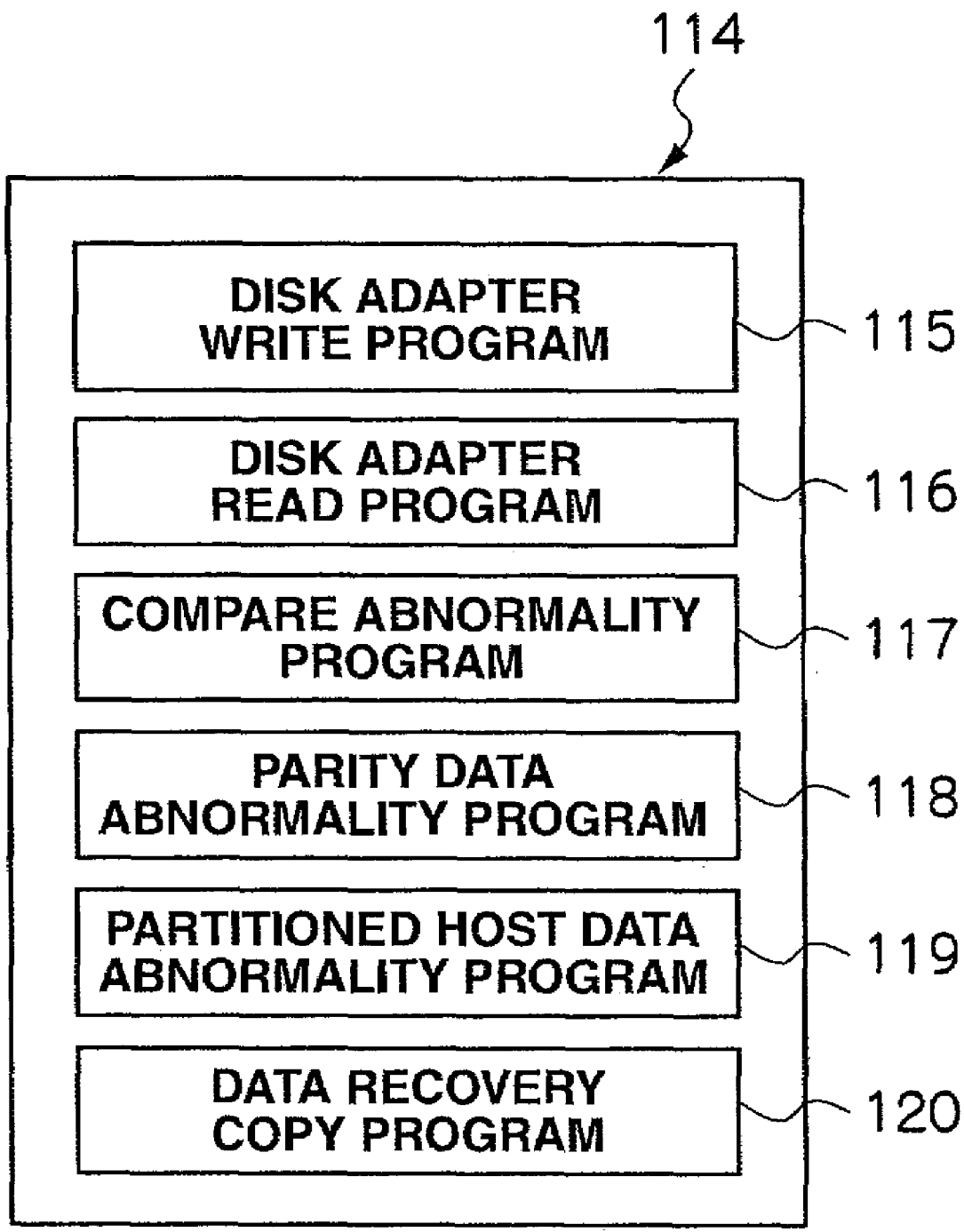
FIG. 8 is a block diagram showing the contents of a memory of a disk adapter according to an embodiment of the present invention.

The disk adapter 11, as shown in FIG. 8, comprises a disk adapter write program 115 to be executed based on a write request of host data from the host system 2, a disk adapter read program 116 to be executed based on a read request of read data from the host system 2, a comparison abnormality program 117 to be executed when an abnormality is detected upon comparing the guarantee code assigned to data in which host data from the host system 2 was partitioned (hereinafter referred to as the "partitioned host data") and the guarantee code assigned to parity data corresponding to such partitioned host data, a parity data abnormality program 118 to be executed when an abnormality of parity data is detected, a partitioned host data abnormality program 119 to be executed when an abnormality of partitioned host data is detected, and a data recovery copy program 120 to be executed when recovering partitioned host data or parity data and storing it in the hard disk drive.

(1-1-5) Various Data Blocks

Figure 9:
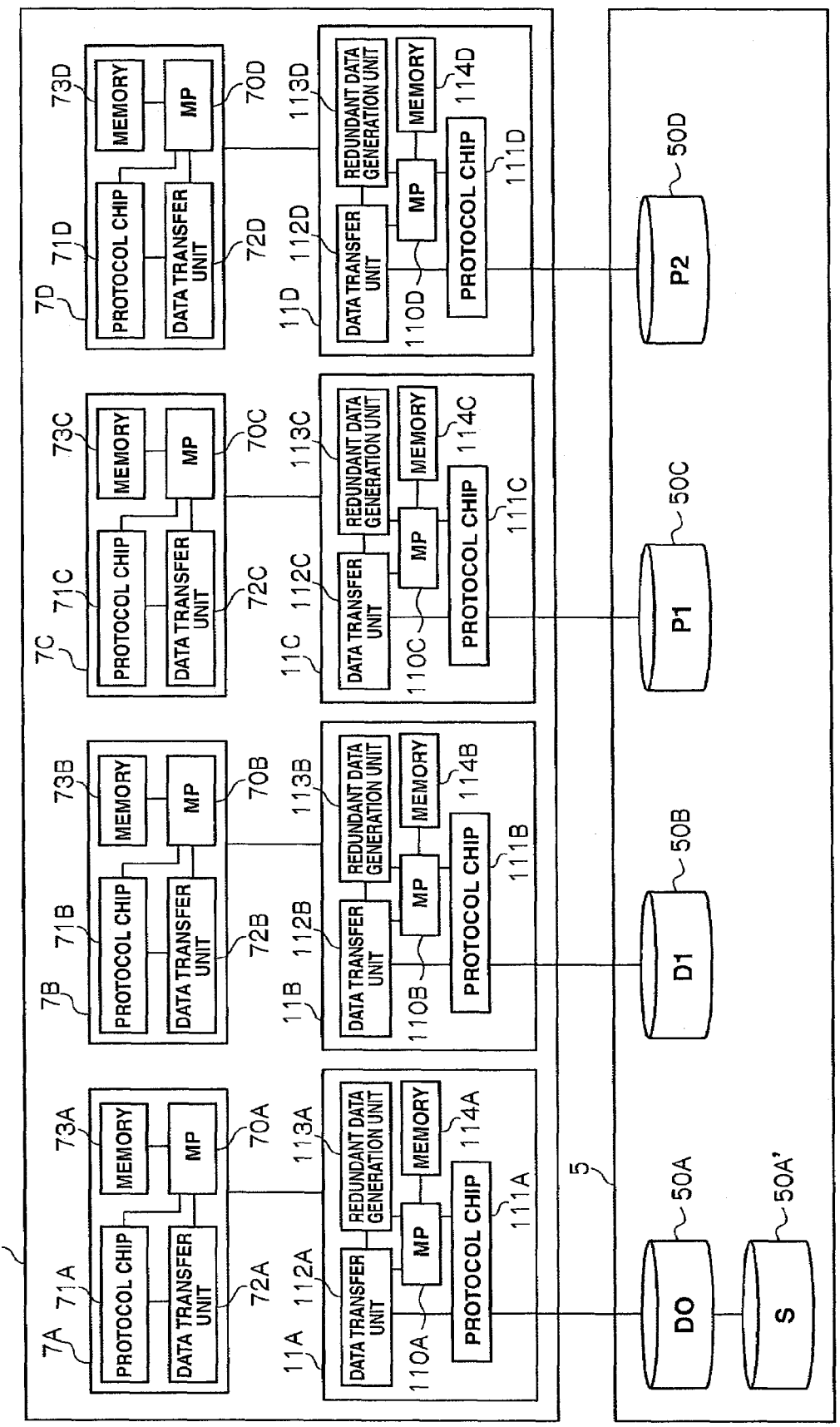
FIG. 9 is a block diagram showing the overall configuration in a storage apparatus according to an embodiment of the present invention.

In the storage system 1 according to an embodiment of the present invention, as shown in FIG. 9, five inexpensive hard disk drives 50 are used. Among the five hard disk drives 50, two hard disk drives 50A, 50B are disks for storing partitioned host data D0, D1 in which host data from the host system 2 has been partitioned, and the other two hard disk drives 50C, 50D are disks for storing parity data P1, P2 to be used in detecting errors in the data to be stored in the partitioned host data D0, D1. In other words, let it be assumed that the quantity n of the hard disk drives is set to "4". The remaining hard disk drive 50A' is used as a spare disk of the hard disk drive 50A.

Further, each hard disk drive 50A to 50D is connected to each disk adapter 11A to 11D, and each disk adapter 11A to 11D is connected to each channel adapter 7A to 7D.

Figure 10:
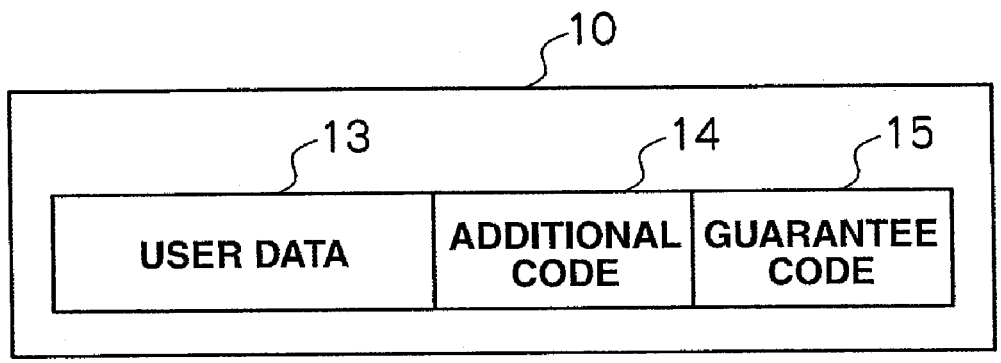
FIG. 10 is a data block diagram in a cache memory according to an embodiment of the present invention.

In the configuration of this kind of storage system, as shown in FIG. 10, the minimum block unit of host data to be stored in the cache memory 10 is configured from a "user data" area 13 for storing user data, an "additional code" area 14 showing the position information of such user data, and a "guarantee code" area 15 showing the identification number for identifying data. For example, the "user data" area 13 in the minimum block format is configured from 512 bytes, the "additional code" area 14 is configured from 8 bytes, and the "guarantee code" area 15 is configured from 8 bytes.

Incidentally, the minimum block unit is of the same configuration in the hard disk drive 50, and the explanation thereof is omitted.

In the minimum block unit of data to be stored in the hard disk drive 50, a sub block is configured in the "guarantee code" area 15. This sub block is of a different format in the hard disk drives 50A, 50B and the hard disk drives 50C, 50D.

Figure 11:
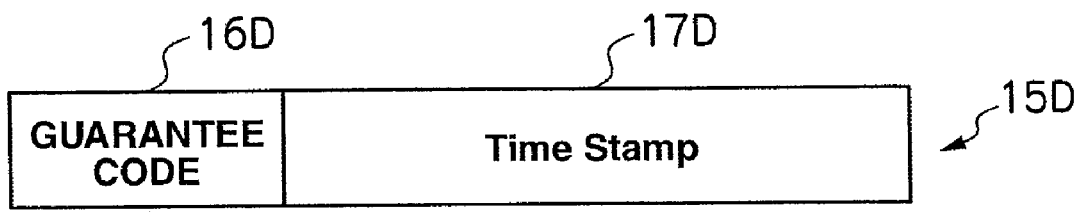
FIG. 11 is a data block diagram of partitioned host data according to an embodiment of the present invention.

As shown in FIG. 11, the sub block of data to be stored in the hard disk drives 50A, 50B is configured from a "guarantee code" area 16D showing the identification number for verifying data, and a "Time Stamp" area 17D showing the record of the date in which the data was stored.

Figure 12:
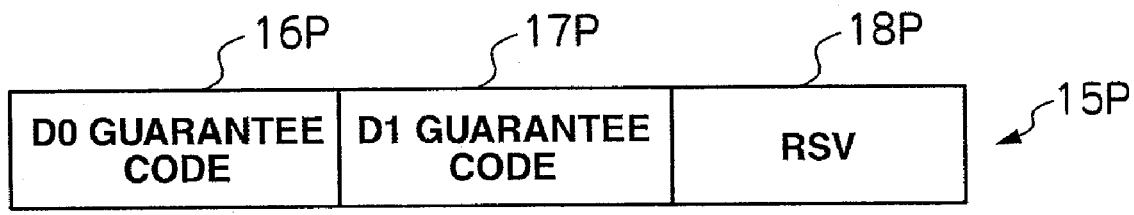
FIG. 12 is a data block diagram of parity data according to an embodiment of the present invention.

Further, as shown in FIG. 12, the sub block of parity data to be stored in the hard disk drives 50C, 50D is configured from "guarantee code" areas 16P, 17P showing the identification number corresponding to each hard disk drive 50A, 50B, and an "RSV" area 18P showing the backup area that will not be used.

(1-2) Data Guarantee Function

The data guarantee function loaded in the storage system 1 according to the present embodiment is now explained.

When the storage system 1 is to write partitioned host data D in the hard disk drive 50 based on a request from the host system 2, the storage system 1 generates a guarantee code 16D and assigns it to such data D for the channel adapter 7 to identify such data each time it writes the partitioned host data D, and assigns the guarantee code by the disk adapter 11 copying such guarantee code 16P to the parity data P created in the disk adapter 11.

Further, when the storage system 1 is to read partitioned host data D from the hard disk drive 50 based on a request from the host system 2, it compares (verifies) the guarantee code 16 assigned to the partitioned host data D and the guarantee code 16P of the parity data P corresponding to the partitioned host data D.

(1-2-1) Processing Contents During Writing of Data

As a means for realizing the foregoing feature, the processing contents upon setting a guarantee code of the partitioned host data based on a write request of the host system and copying the guarantee code of such data to the parity data is now explained.

(1-2-1-1) Processing Contents of Channel Adapter

The processing contents of the channel adapter 7 setting the guarantee code of partitioned host data based on a write request of the host system is now explained. Regarding the write processing to be performed on the side of the channel adapter 7, the microprocessor 70 executes such processing based on the channel adapter write program 730.

Figure 13:
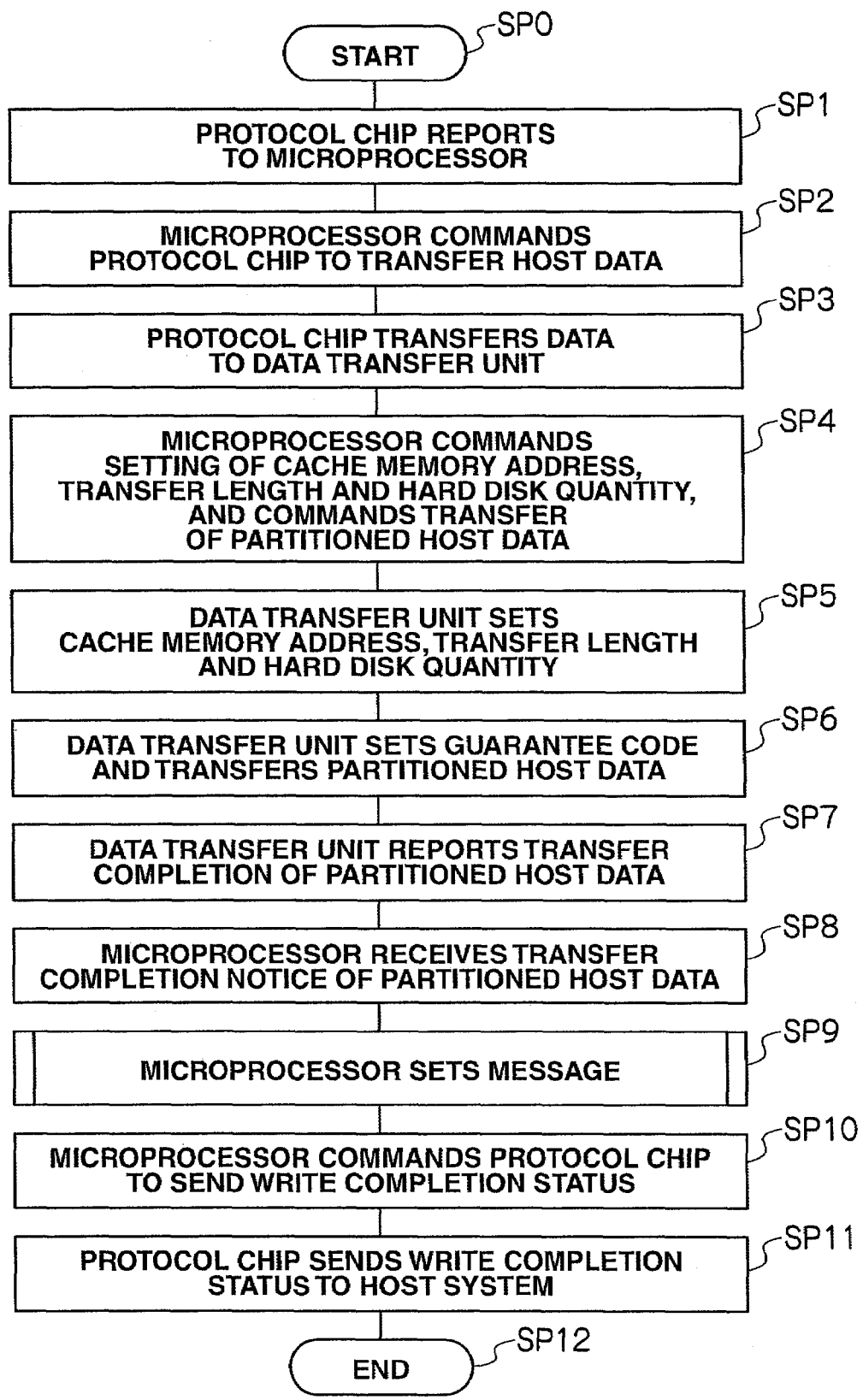
FIG. 13 is a flowchart showing a case of writing host data in a channel adapter according to an embodiment of the present invention.

Foremost, as shown in FIG. 13, the protocol chip 71A starts the processing by receiving a write request from the host system 2 (SP0). Subsequently, the protocol chip 71A reports to the protocol chip 70A to the effect that it received the write request (SP1).

Upon receiving this report, the microprocessor 70A issues a command to the protocol chip 71A to transfer the host data from the host system 2 to the data transfer unit 72A (SP2).

The protocol chip 71A that received this command transfers the host data from the host system 2 to the data transfer unit 72A (SP3).

Subsequently, the microprocessor 70A issues a command to the data transfer unit 72A to logically partition the host data (hereinafter referred to as a "RAID stripe partition"), and set the address of the cache memory 10 for temporarily storing the partitioned host data D0, D1 and the transfer length of the partitioned host data D0, D1 (SP4). Continuously, the microprocessor 70A refers to the configuration information area 91 in the shared memory 9, and issues a command to the data transfer unit 72A to set the number of hard disk drives (SP4).

The microprocessor 70A thereafter reads the partitioned host data D0, D1 from the protocol chip 71A, and issues a command to the protocol chip 71A to transfer the partitioned host data D0, D1 to the cache memory 10 (SP4).

Thereby, the data transfer unit 72A will logically partition the host data and create the partitioned host data D0, D1 according to the command from the microprocessor 70A. Then, the data transfer unit 72A sets the address of the cache memory 10 for temporarily storing the partitioned host data D0, D1 and the transfer length of the partitioned host data D0, D1 (SP5).

Further, the data transfer unit 72A sets the number of hard disk drives (SP5).

Continuously, the data transfer unit 72A sets a guarantee code for each minimum block unit for storing the partitioned host data D0, D1 in the cache memory, and assigns it to the partitioned host data D0, D1 (SP6).

Figure 14:
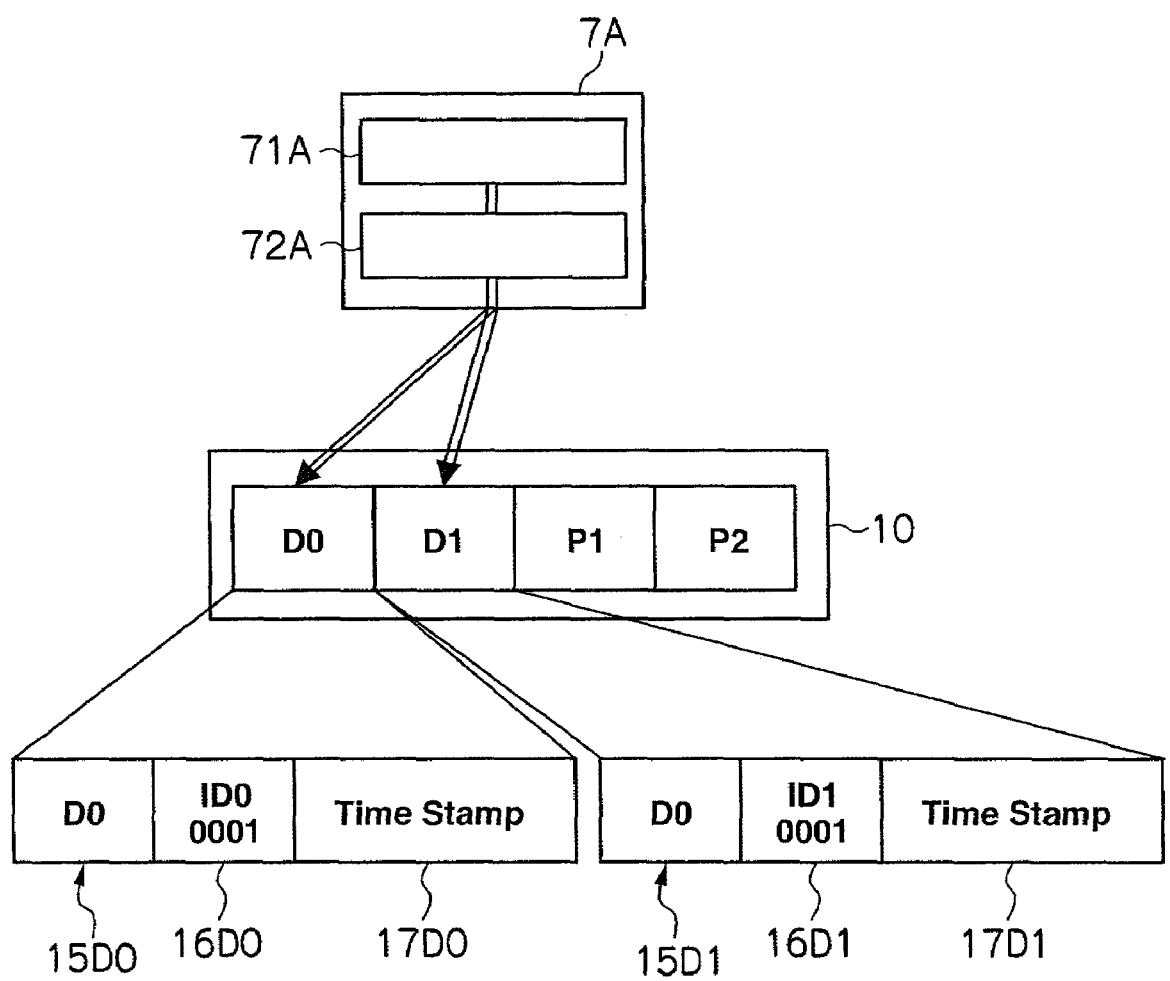
FIG. 14 is a conceptual diagram showing a case of writing host data in a channel adapter according to an embodiment of the present invention.

As shown in FIG. 14, the data transfer unit 72A transfers the partitioned host data D0, D1 assigned with a guarantee code to the cache memory 10 (SP6).

When the transfer to the cache memory 10 is complete, the data transfer unit 72A reports the transfer completion to the microprocessor 70A (SP7).

When the microprocessor 70A receives the transfer completion notice from the protocol chip 71A (SP8), it sets a message of writing the partitioned host data D0, D1 transferred from the cache memory into the hard disk drive 50 of the message information table 900 in the message area 90 of the shared memory 9 (SP9).

The microprocessor 70A thereafter issues a command to the protocol chip 71A to send a status indicating the write processing completion to the host system 2 (SP10).

The protocol chip 71A that received this command sends a status indicating the write processing completion to the host system 2 (SP11), and thereafter ends the write processing on the side of the channel adapter (SP12).

(1-2-1-2) Processing Contents of Disk Adapter

The processing contents of the disk adapter 11 copying the guarantee code of partitioned host data to the parity data based on a write request from the host system 2 are now explained. Regarding the write processing to be performed on the side of the disk adapter 11, the microprocessor 110 executes such processing based on the disk adapter write program 115.

Figure 15:
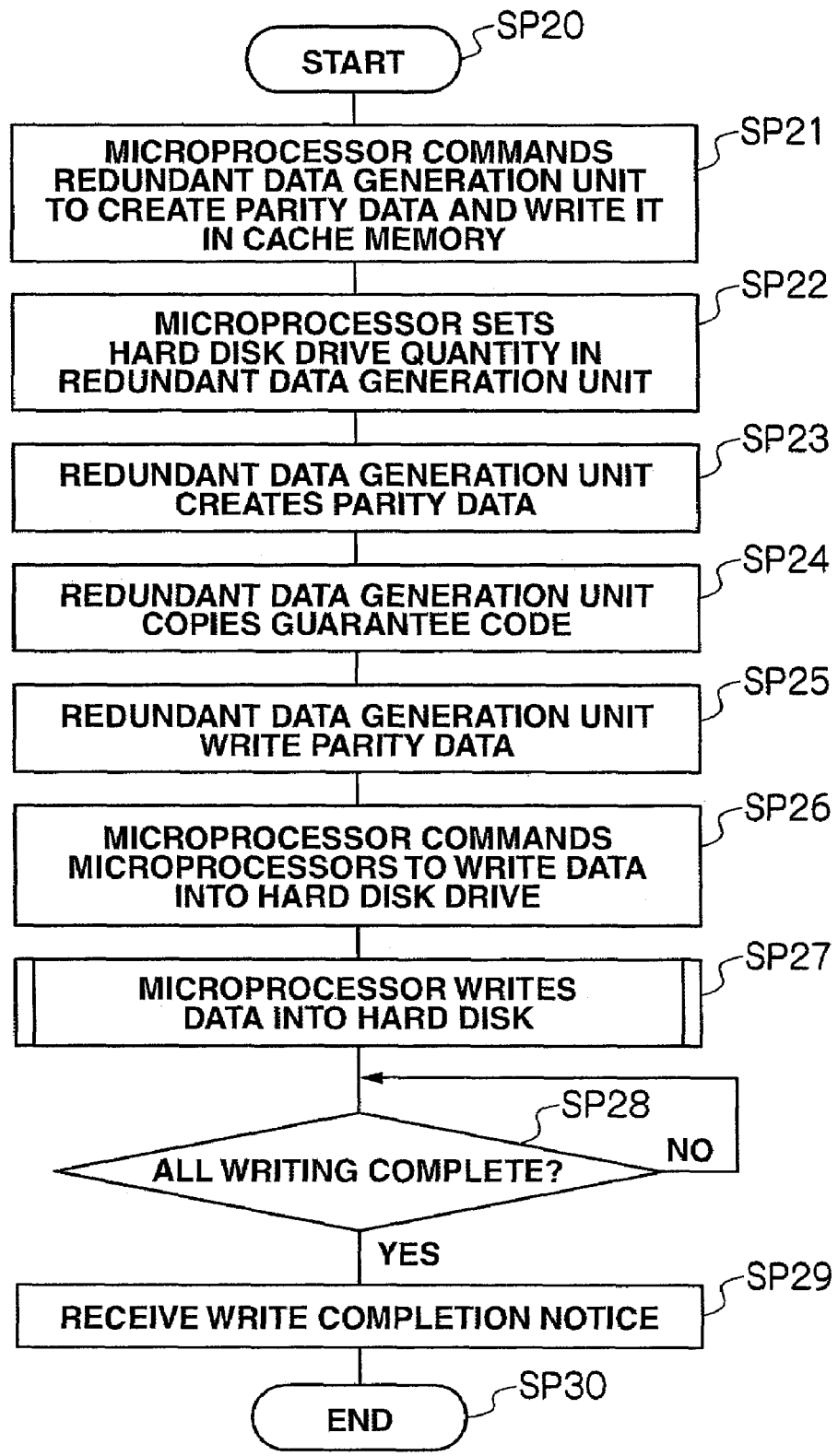
FIG. 15 is a flowchart for writing host data in a disk adapter according to an embodiment of the present invention.

Specifically, as shown in FIG. 15, the microprocessor 110A starts the processing when a write command to the hard disk drive 50A is written in the message area 90 of the shared memory 9 (SP20).

The microprocessor 110A reads partitioned host data D0, D1 from the cache memory 10, and issues a command to the redundant data generation unit 113A to create parity data P1, P2 corresponding to the partitioned host data D0, D1 (SP21).

Simultaneously, the microprocessor 110A issues a command to the redundant data generation unit 113A to write the created parity data P1, P2 in the cache memory 10 (SP21).

The microprocessor 110A thereafter issues a command to the redundant data generation unit 113A to refer to the RAID group information table 910 in the configuration information area 91, and set the number of hard disk drives configuring the RAID group (SP22). In this embodiment, the microprocessor 110A sets the number of hard disk drives to "4".

The redundant data generation unit 113A that received the foregoing command creates parity data P1, P2 (SP23).

The redundant data generation unit 113A copies the guarantee codes 16D0, 16D1 of the partitioned host data D0, D1 to the created parity data P1, P2 (SP24).

Figure 16:
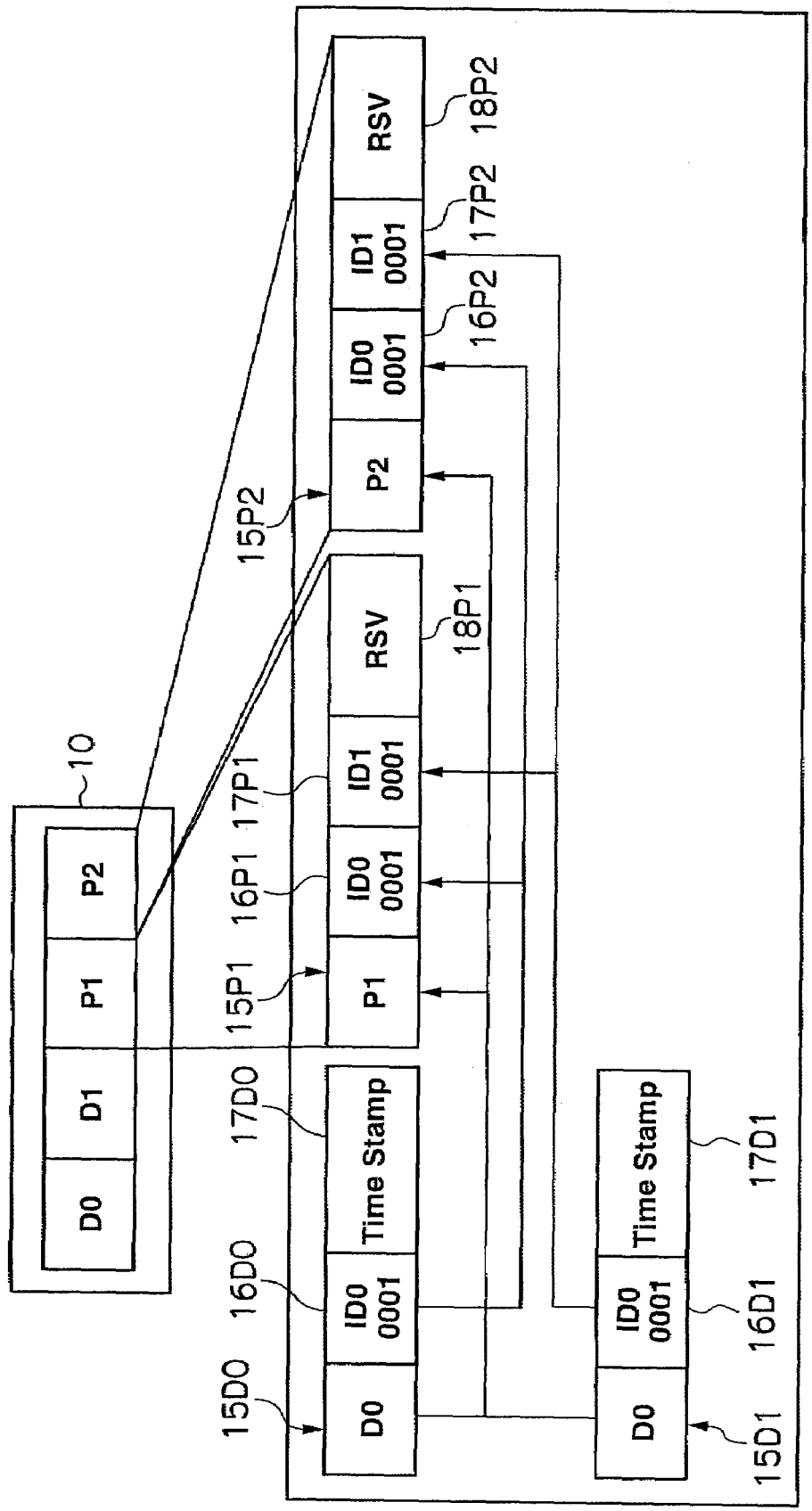
FIG. 16 is a conceptual diagram showing a case of writing host data in a disk adapter according to an embodiment of the present invention.

Specifically, as shown in FIG. 16, the redundant data generation unit 113A creates the corresponding guarantee codes 16P1, 17P1 by copying the guarantee codes 16D0, 16D1 of the partitioned host data D0, D1 to the parity data P1. Continuously, the redundant data generation unit 113A creates the corresponding guarantee codes 16P2, 17P2 by copying the guarantee codes 16D0, 16D1 of the partitioned host data D0, D1 to the parity data P2.

Thereby, the redundant data generation unit 113A writes the parity data P1, P2 in the cache memory 10 (SP25).

Subsequently, the microprocessor 110A issues a command to the microprocessors 110A to 110D including the self-microprocessor 110A to write the partitioned host data D0, D1 or the parity data P1, P2 in the hard disk drives 50A to 50D connected to the microprocessors 110A to 110D (SP26).

Specifically, the microprocessor 110A sets a message in the message information table 900 of the shared memory 9 to write the partitioned host data D0, D1 or the parity data P1, P2 in the hard disk drives 50A to 50D.

Figure 17:
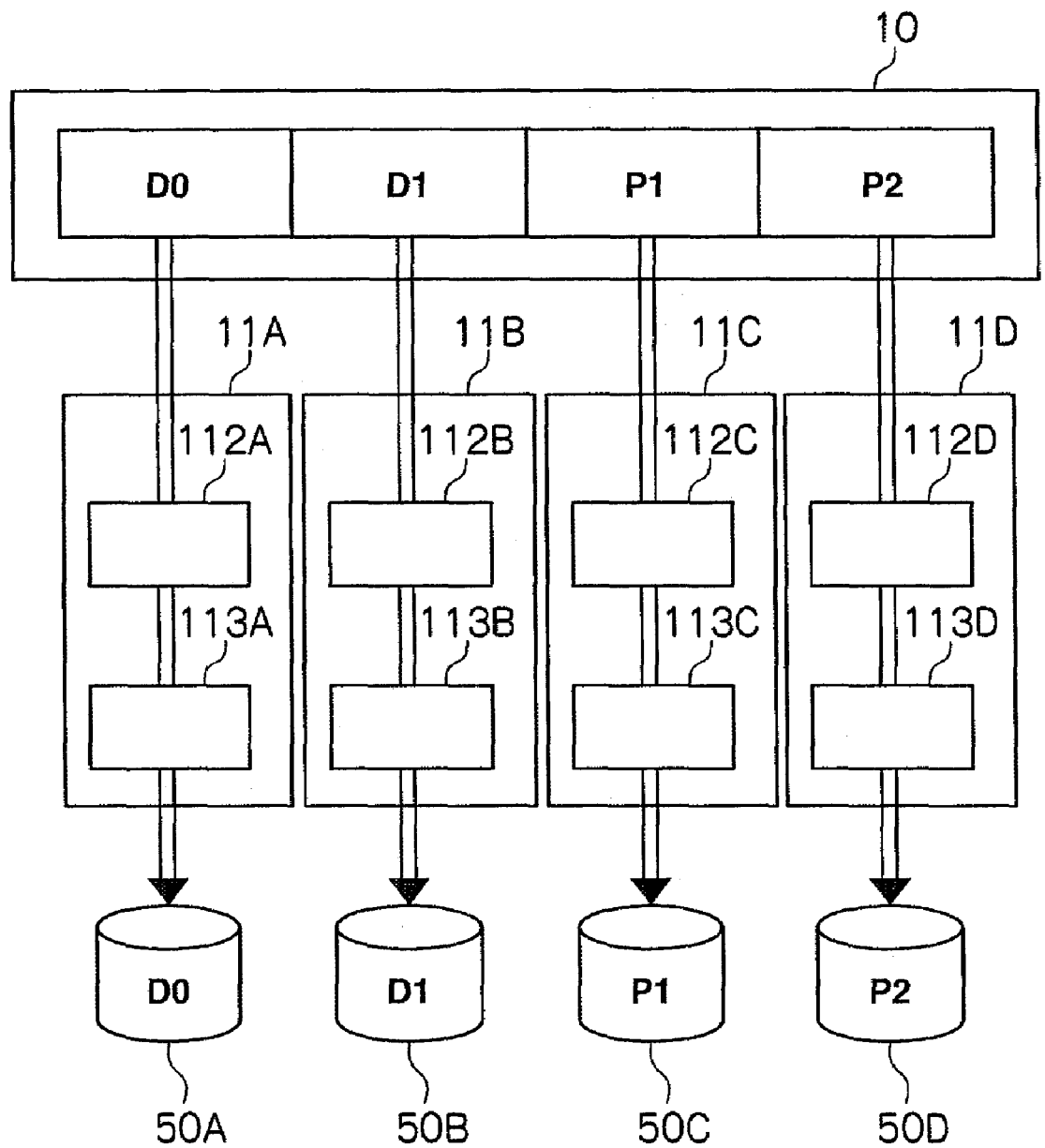
FIG. 17 is a conceptual diagram showing a case of writing host data in a disk adapter according to an embodiment of the present invention.

Thereafter, as shown in FIG. 17, the microprocessors 110A to 110D write the partitioned host data D0, D1 or the parity data P1, P2 in the hard disk drives 50A to 50D according to the command from the microprocessor 110A (SP27).

The microprocessor 110A determines whether writing is complete from the other microprocessors 110B to 110D (SP28), and, when all writing is not complete (SP28: NO), it waits to receive a report indicating the completion of all writing.

Meanwhile, when the microprocessor 110A receives a report indicating the completion of all writing (SP28: YES), it receives a notice to such effect (SP29), and ends the write processing on the side of the disk adapter (SP30).

Specifically, the microprocessor 110A validates the "flag" field 900A in the message information table 900 of the shared memory 9, and then ends this processing.

Continuously, the write processing of the microprocessors 110A to 110D that received a write command of the hard disk drives 50A to 50D from the microprocessor 110A at step SP27 is now explained.

Figure 18:
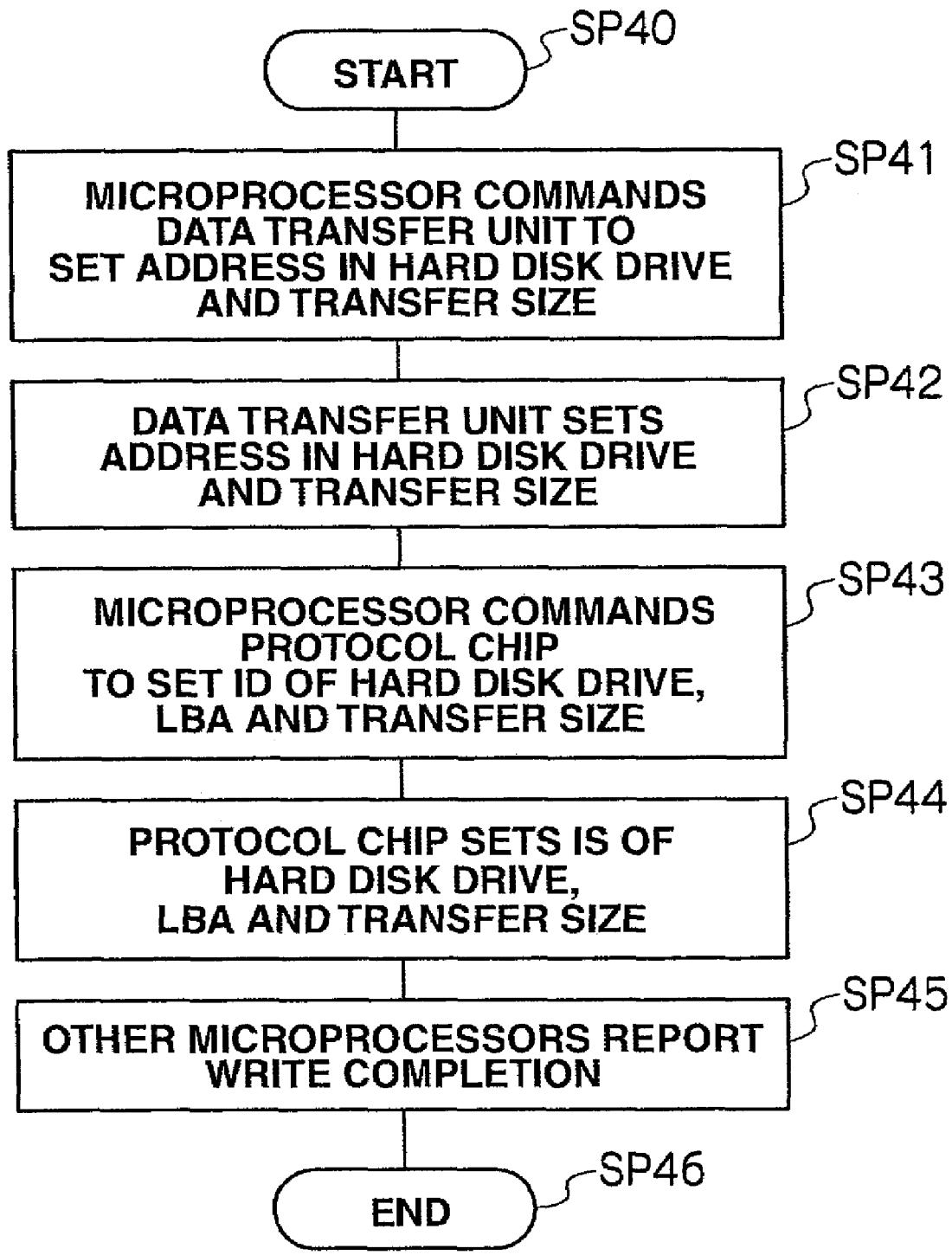
FIG. 18 is a flowchart for writing host data in a disk adapter according to an embodiment of the present invention.

As shown in FIG. 18, when the microprocessors 110A to 110D receive a command from the microprocessor 110A to write the partitioned host data D0, D1 or the parity data P1, P2, they start this processing according to the information set in the message information table 900 of the shared memory 9 (SP40).

The microprocessors 110A to 110D thereafter issue a command to the data transfer units 112A to 112D to set the address and transfer size of the hard disk drives 50A to 50D to store the partitioned host data D0, D1 or the parity data P1, P2 (SP41).

The address and transfer size of the hard disk drives 50A to 50D are set in the data transfer units 112A to 112D that received this command (SP42).

The microprocessors 110A to 110D issue a command to the protocol chips 111A to 111D to set the identification (ID), LBA (Logical Block Address) and transfer size in the hard disk drives 50A to 50D to be written into (SP43).

The protocol chips 111A to 111D set the identification (ID), LBA (Logical Block Address) and transfer size in the hard disk drives 50A to 50D to be written into (SP44).

As shown in FIG. 17, the protocol chips 111A to 111D transfer the partitioned host data D0, D1 or the parity data P1, P2 to the hard disk drives 50A to 50D.

When the other microprocessors 110B to 110D complete writing the partitioned host data D1 or the parity data P1, P2 in the hard disk drive 50, they report this to the microprocessor 110A (SP45), and end this processing (SP46).

Incidentally, in the case of processing in the microprocessor 110A, a write completion report is not issued, and the microprocessor 110A waits for a write completion notice from the other microprocessors 110B to 110D (SP28).

(1-2-1-3) Setup Processing Contents of Guarantee Code

Contents of the guarantee code setup processing for the storage apparatus 4 to set the guarantee code of the partitioned host data and the guarantee code of the parity data based on a data write request from the host system are now explained.

Figure 19:
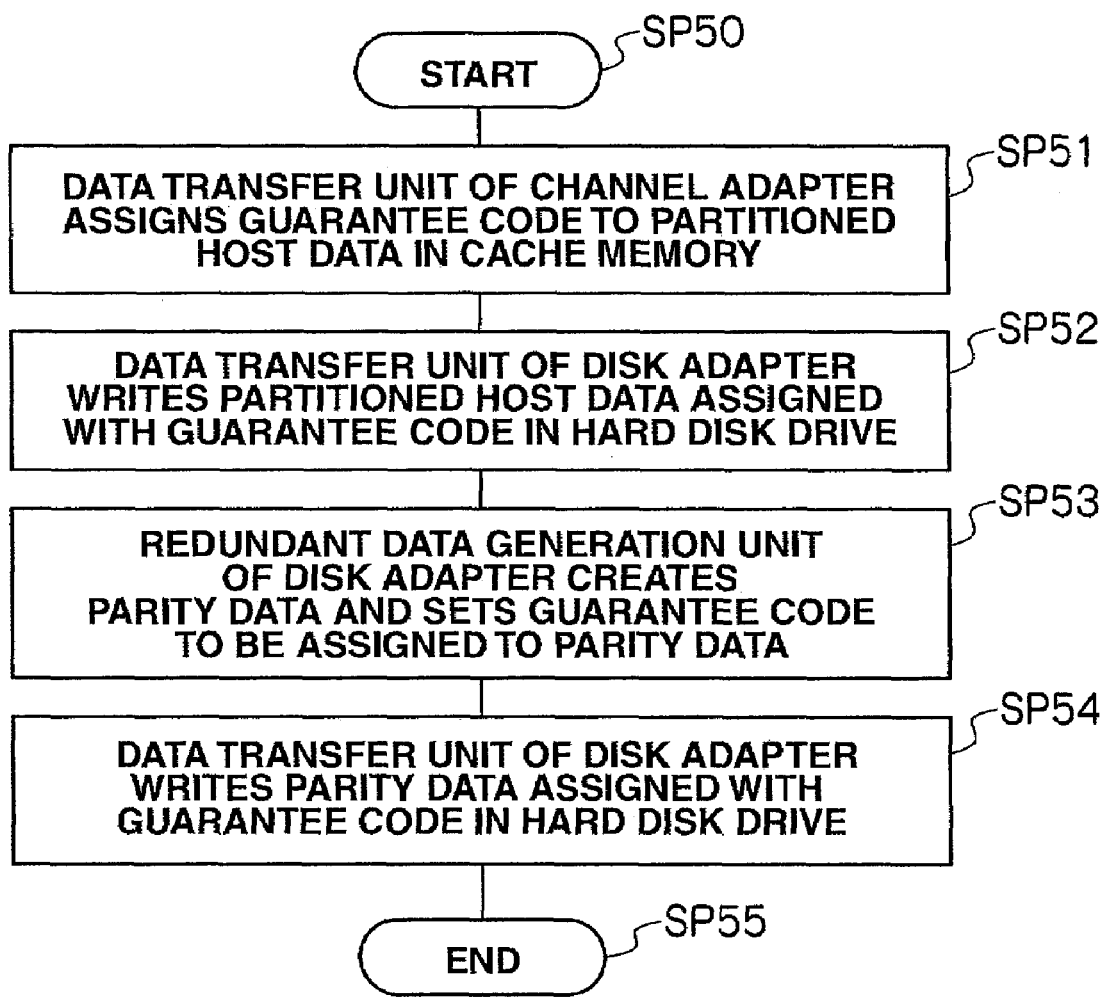
FIG. 19 is a flowchart for assigning a guarantee code according to an embodiment of the present invention.

Specifically, as shown in FIG. 19, the channel adapter 7 starts the guarantee code setup processing when it receives a write request of host data from the host system 2 (SP50).

The data transfer unit 72 of the channel adapter 7 sets a guarantee code 16D0 to the partitioned host data D0 subject to RAID stripe partition in the cache memory 10, and assigns it to the partitioned host data D0 (SP51).

Subsequently, the data transfer unit 112 of the disk adapter 11 writes the partitioned host data D0 assigned a guarantee code in the hard disk drive 50 (SP52).

The redundant data generation unit 113 of the disk adapter 11 creates parity data corresponding to the partitioned host data, and creates a guarantee code to be assigned to the parity data (SP53).

When the data transfer unit 112 of the disk adapter 11 writes the parity data assigned with the guarantee code in the hard disk drive (SP54), it ends this processing (SP55).

(1-2-2) Processing Contents During Reading of Data

As a means for realizing the foregoing feature, the processing contents for comparing the guarantee code of partitioned host data read from the hard disk drive and the guarantee code of parity data and ensuring the guarantee of data subject to a read request based on the read request of data from the host system are not explained. Here, when the guarantee of data is not ensured, the processing contents of detecting data subject to a failure and recovering data so as to ensure the guarantee of such data are also explained.

(1-2-2-1) Processing Contents of Channel Adapter

Foremost, the processing contents of the channel adapters 7 transferring the requested data to the host system 2 based on a read request of data from the host system are explained. Regarding the read processing of the channel adapters 7, the microprocessor 70 executes such processing based on the channel adapter read program 731.

Figure 20:
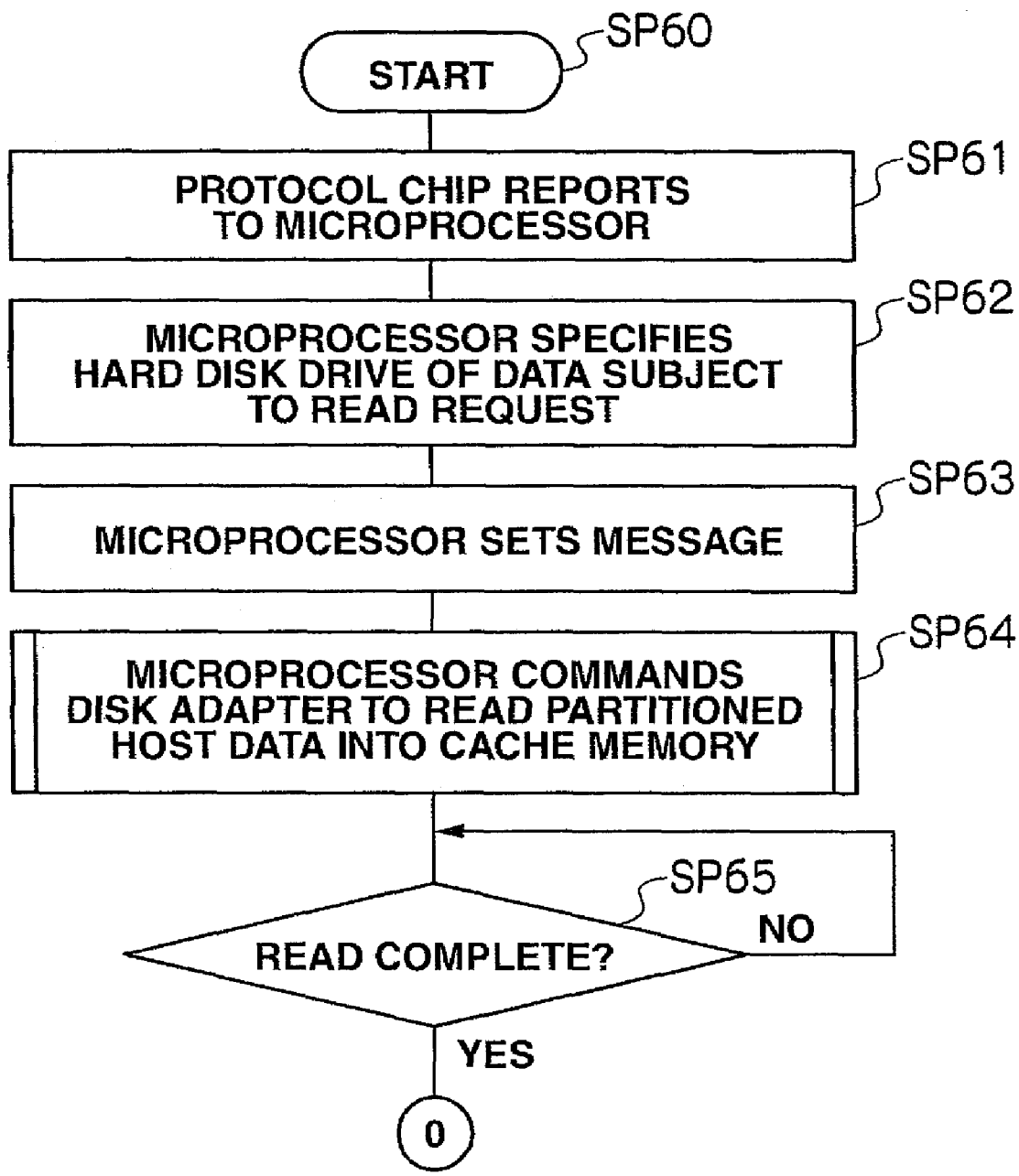
FIG. 20 is a flowchart for reading read data in a channel adapter according to an embodiment of the present invention.
Figure 21:
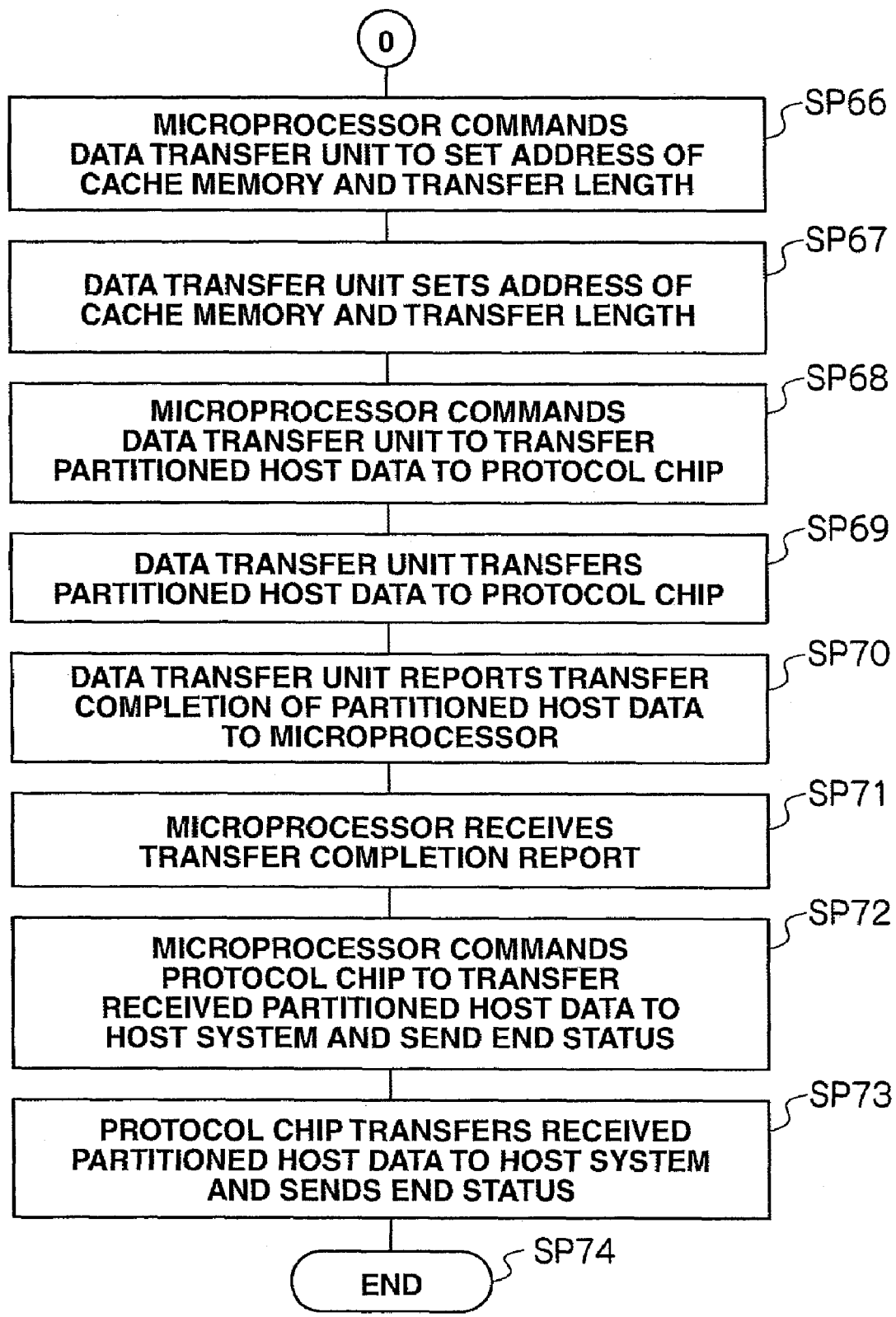
FIG. 21 is a flowchart for reading read data in a channel adapter according to an embodiment of the present invention.

As shown in FIGS. 20 and 21, the protocol chip 71A starts this processing by receiving a read request of data from the host system 2 (SP60). The protocol chip 71A thereafter issues a report to the microprocessor 70A indicating that a read request of data has been issued (SP61).

The microprocessor 70A that received this report specifies (physical/logical conversion) to which hard disk drive among the hard disk drives subject to RAID stripe partition the data requested by the host system 2 corresponds to by referring to the RAID group information table 910 and the hard disk drive information table 911 of the shared memory 9 (SP62). Here, let it be assumed that the data requested by the host system 2 is the partitioned host data D0.

Subsequently, the microprocessor 70A sets a message in the message information table 900 of the shared memory 9 to read the partitioned host data D0 to be stored in the hard disk drive 50A into the cache memory 10 (SP63).

The microprocessor 70A thereafter issues a command to the disk adapter 11A to read the partitioned host data D0 to be stored in the hard disk drive 50A into the cache memory 10 (SP64), and determines whether the partitioned host data D0 has been read into the cache memory 10 (SP65).

Here, when the microprocessor 70A determines that the partitioned host data D0 stored in the hard disk drive 50 has not been read into the cache memory 10 (SP65: NO), it waits until such partitioned host data D0 is read.

Meanwhile, when the microprocessor 70A determines that the partitioned host data D0 stored in the hard disk drive 50 has been read into the cache memory 10 (SP65: YES), it issues a command to the data transfer unit 72A to set the address and transfer length in the cache memory 10 to which the partitioned host data D0 was read into (SP66).

Upon receiving this command, the data transfer unit 72A sets the address and transfer length in the cache memory 10 to which the partitioned host data D0 was read into (SP67).

The microprocessor 70A thereafter issues a command to the data transfer unit 72A to transfer the partitioned host data D0 in the cache memory 10 to the protocol chip 71A (SP68).

The data transfer unit 72A that received this command transfers the partitioned host data D0 in the cache memory 10 to the protocol chip 71A (SP69), and thereafter reports the transfer completion to the microprocessor 70A (SP70).

When the microprocessor 70A receives a transfer completion report from the data transfer unit 72A (SP71), it issues a command to the protocol chip 71A to transfer the partitioned host data to the host system 2, and sends the end status (SP72).

The protocol chip 71A that received this command transfers the partitioned host data to the host system 2 and sends the end status (SP73), and thereafter ends this processing (SP74).

(1-2-2-2) Processing Contents of Disk Adapter (1-2-2-2-1) Read Processing

The processing contents of the disk adapter 11 comparing the guarantee code of partitioned host data read from the hard disk drive and the guarantee code of parity data based on a read request from the host system 2 are now explained. Regarding the write processing of the disk adapter 11, the microprocessor 110 executes such processing based on the disk adapter read program 116.

Figure 22:
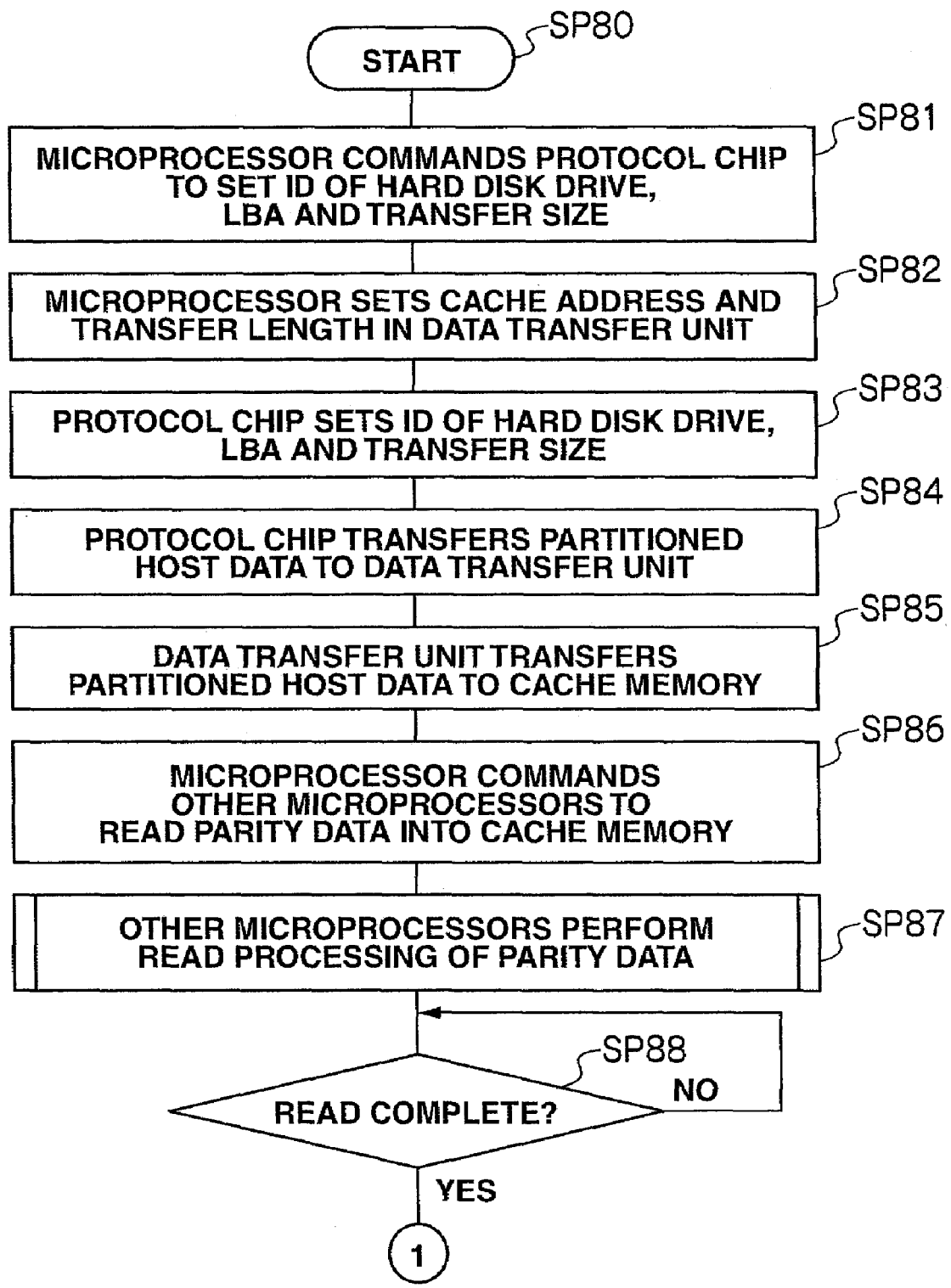
FIG. 22 is a flowchart for reading read data in a disk adapter according to an embodiment of the present invention.
Figure 23:
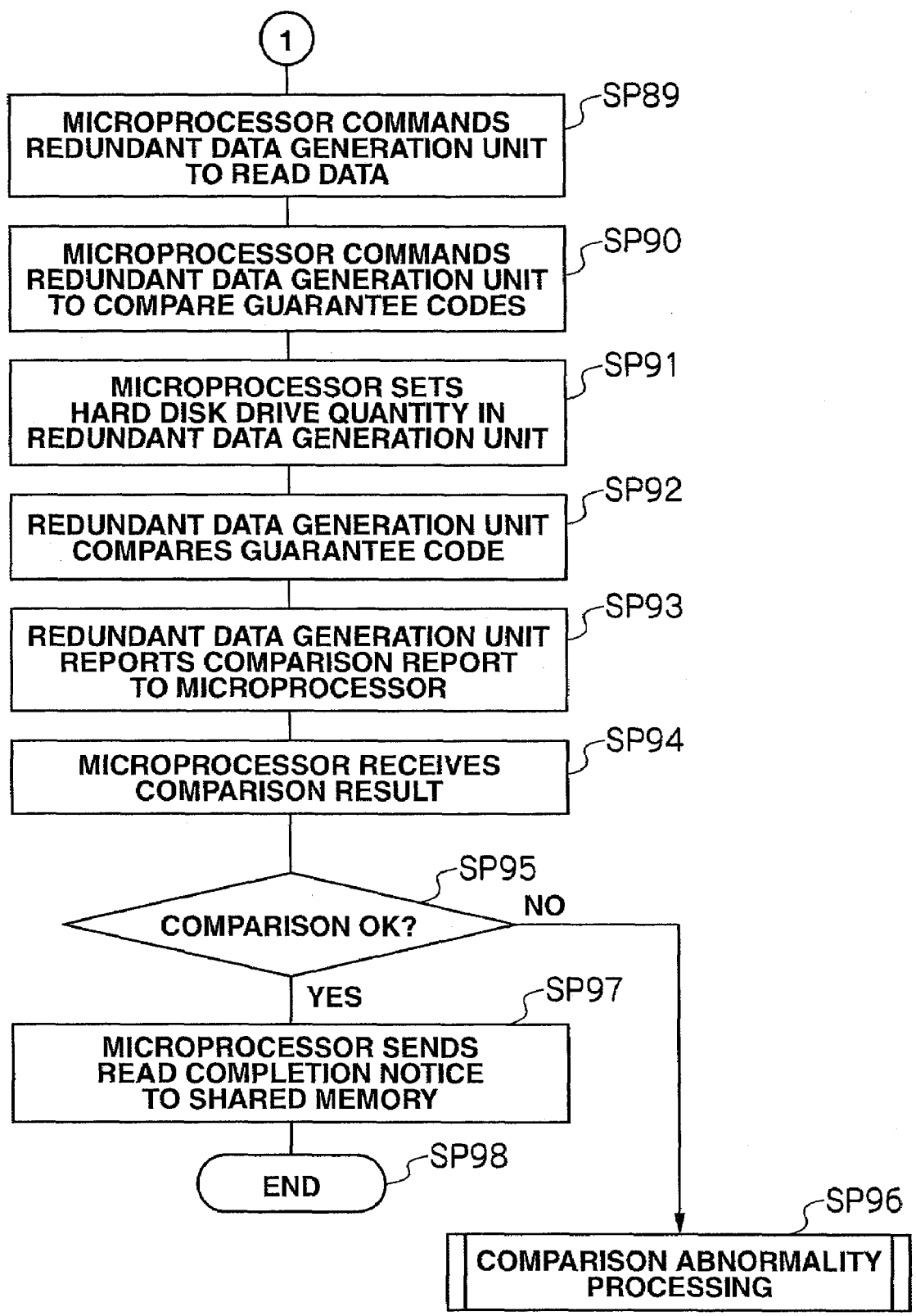
FIG. 23 is a flowchart for reading read data in a disk adapter according to an embodiment of the present invention.

As shown in FIGS. 22 and 23, the microprocessor 110A starts this processing when it receives a read command from the channel adapter 7A for reading the partitioned host data D0 stored in the hard disk drive 50 into the cache memory 10 at step SP64.

Subsequently, the microprocessor 110A issues a command to the protocol chip 111A to set the identification (ID), LBA and transfer size of the partitioned host data D0 of the hard disk drive stored in the partitioned host data D0 (SP81).

The microprocessor 110A thereafter sets the address and transfer block size of the cache memory 10 as the transfer destination of the partitioned host data in the data transfer unit 112A (SP82).

According to a command from the microprocessor 110A, the protocol chip 111A sets the identification (ID), LBA and transfer size of the partitioned host data D0 of the hard disk drive 50A (SP83), and thereafter reads the partitioned host data D0 and transfers it to the data transfer unit 112A (SP84).

Figure 24:
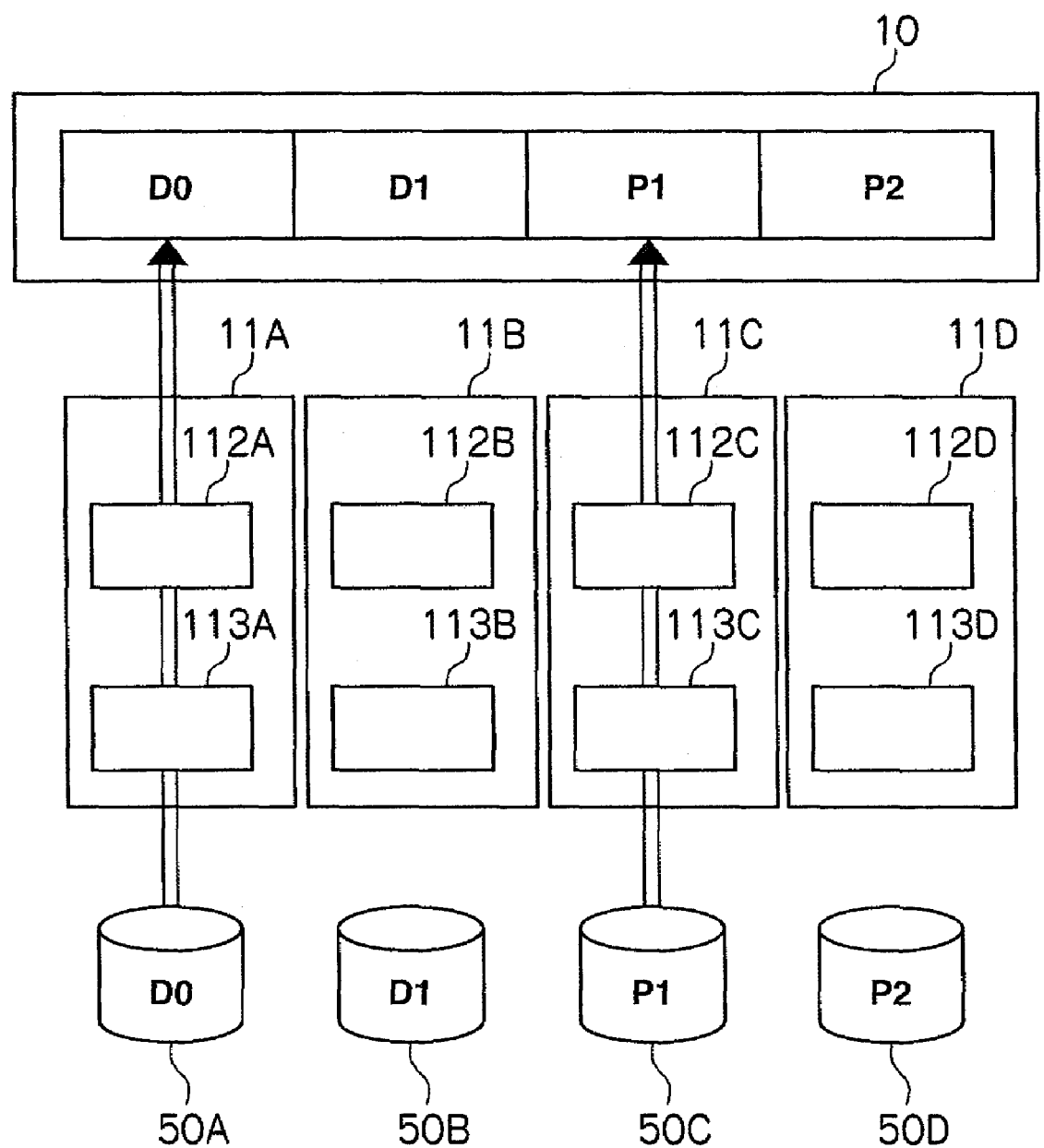
FIG. 24 is a conceptual diagram showing a case of reading read data in a disk adapter according to an embodiment of the present invention.

Then, the data transfer unit 112A, as shown in FIG. 24, transfers the partitioned host data D0 to the address of the cache memory 10 set at step SP72 (SP85).

Subsequently, the microprocessor 110A issues a command to the other microprocessor 110C to read the parity data P1 from the hard disk drive 50C and transfer it to the cache memory 10 (SP86).

Incidentally, this command may also be issued to the microprocessor 110D connected to the hard disk drive 50D storing the parity data P2.

The other microprocessor 110C reads the parity data P1 from the hard disk drive 50C and transfers it to the cache memory 10 (SP87). Incidentally, details of this processing of the microprocessor 110C will be explained later with reference to the flowchart shown in FIG. 26.

The microprocessor 110A thereby determines, based on the foregoing command, whether the parity data P1 was transferred and read into the cache memory 10 (SP88), and, when it determines that such parity data P1 was not read into the cache memory 10 (SP88: NO), the microprocessor 110A waits for the parity data P1 to be read into the cache memory 10.

Meanwhile, when the microprocessor 110A determines, based on the foregoing command, that the parity data P1 has been read into the cache memory 10 as shown in FIG. 24 and reading is complete (SP88: YES), it issues a command to the redundant data generation unit 113A to read the partitioned host data D0 and the parity data P1 from the cache memory 10 into the disk adapter 11A (SP89).

When the partitioned host data D0 and the parity data P1 are read into the disk adapter 11, the microprocessor 110A issues a command to the redundant data generation unit 113A to compare (verify) the guarantee code 16D0 of the partitioned host data D0 and the guarantee code 16P1 of the parity data P1 (SP90).

The microprocessor 110A refers to the RAID group information table 910 in the configuration information area 91 of the shared memory 9, and sets the number of hard disk drives configuring the RAID group in the redundant data generation unit 113A (SP91). In this embodiment, the microprocessor 110A sets the number of hard disk drives to "4".

Figure 25:
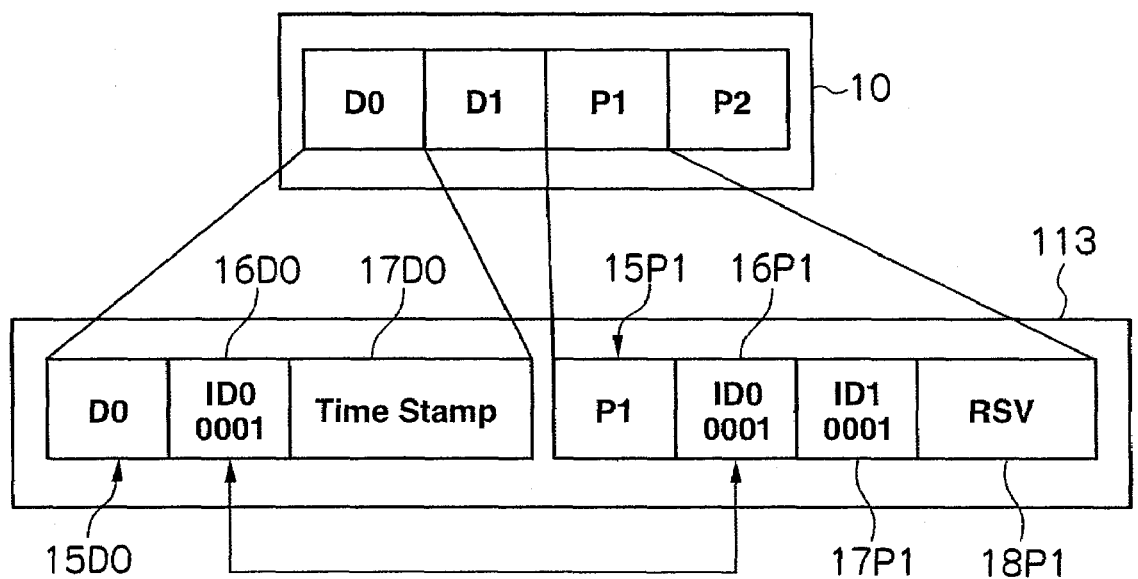
FIG. 25 is a conceptual diagram showing a case of reading read data in a disk adapter according to an embodiment of the present invention.

The redundant data generation unit 113A, as shown in FIG. 25, according to a compare command from the microprocessor 110A, compares (verifies) the guarantee code 16D0 of the partitioned host data D0 and the guarantee code 16P1 of the parity data P1 (SP92), and reports this comparison result to the microprocessor 110A (SP93).

When the microprocessor 110A receives the comparison result from the redundant data generation unit 113A (SP94), it determines the comparison result (SP95).

When the microprocessor 110A determines that the guarantee code. 16D0 of the partitioned host data D0 and the guarantee code 16P1 of the parity data P1 do not coincide (SP95: NO), it determines that one of the data is not guaranteed, and executes comparison abnormality processing (SP96). Incidentally, the comparison abnormality processing will be explained in detail later with reference to the flowchart shown in FIGS. 28 and 29.

Meanwhile, when the microprocessor 110A determines that the guarantee code 16D0 of the partitioned host data D0 and the guarantee code 16P1 of the parity data P1 coincide (SP95: YES), it sets a message indicating that the reading from the hard disk drive is complete in the message information table 900 of the shared memory 9 (SP97), and then ends this processing (SP98).

Figure 26:
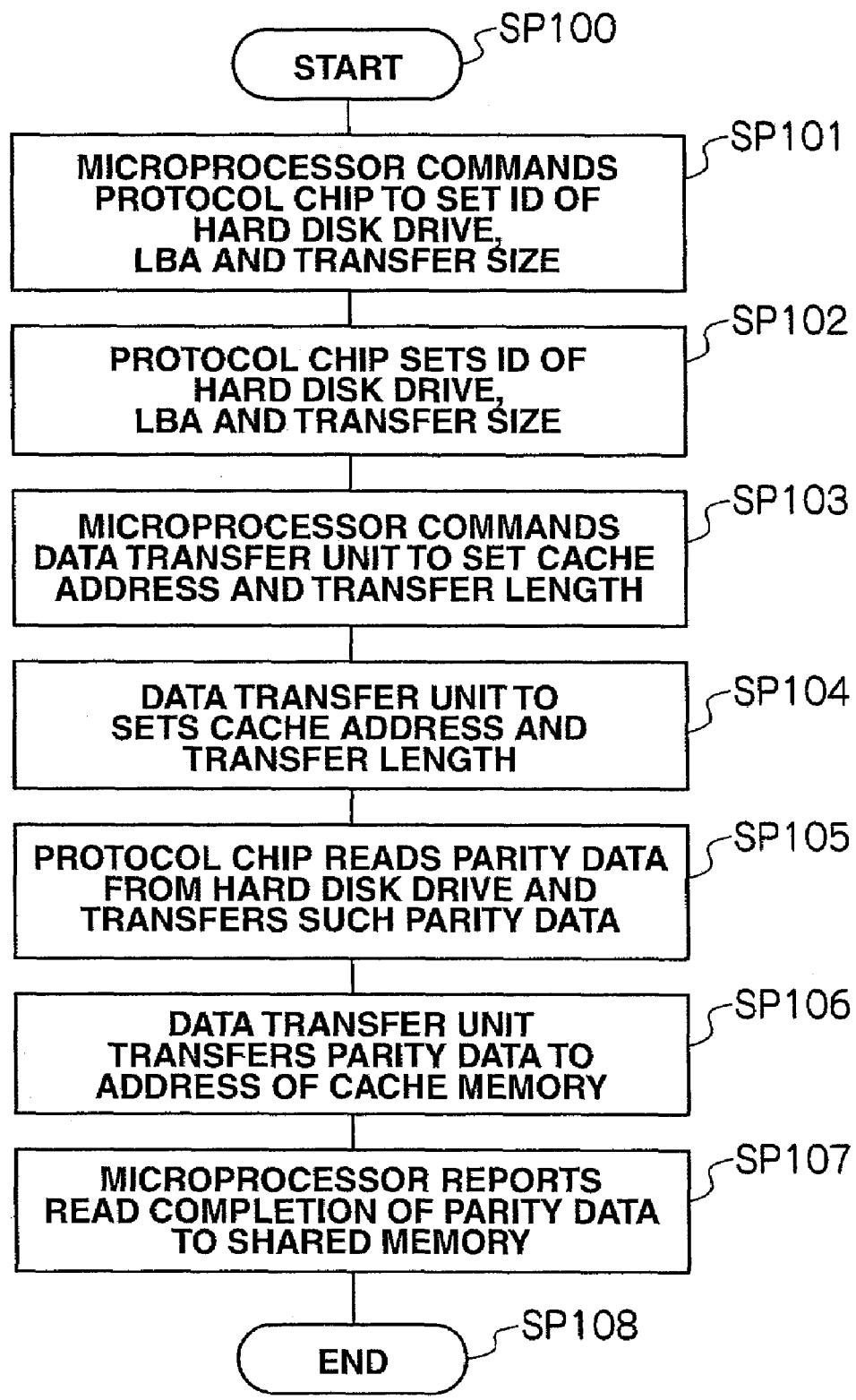
FIG. 26 is a flowchart for writing data in a hard disk drive according to an embodiment of the present invention.

The read processing of parity data P1 at step SP87 is now explained with reference to the flowchart shown in FIG. 26.

Specifically, the microprocessor 110C starts this processing when it confirms a read command in the shared memory 9 (SP100).

The microprocessor 110C thereafter issues a command to the protocol chip 111C to set the identification (ID), LBA and transfer size of the parity data P1 of the hard disk drive storing the parity data P1 (SP101).

The protocol chip 111C that received this command sets the identification (ID), LBA and transfer size of the parity data P1 of the hard disk drive storing the parity data P1 (SP102).

Subsequently, the microprocessor 110C issues a command to the data transfer unit 112C to set cache address and transfer size to temporarily store the parity data to be read from the hard disk drive 50C (SP103).

The data transfer unit 112C that received this command sets the address and transfer size of the cache memory 10 for temporarily storing the parity data P1 to be read from the hard disk drive 50C (SP104).

After these settings are complete, the protocol chip 111C reads the parity data P1 from the hard disk drive 50C and transfers it to the data transfer unit 112C (SP105).

The data transfer unit 112C thereafter transfers the parity data P1 that was read into the address of the set cache memory 10 (SP106).

Thereby, the microprocessor 110C sets read complete of the parity data P1 in the shared memory 9 (SP107), reports this completion to the microprocessor (SP107), and thereafter ends this processing (SP108).

(1-2-2-2-2) Comparative Processing Contents of Guarantee Code

Contents of the guarantee code comparative processing for the storage apparatus 4 to compare the guarantee code of partitioned host data and the guarantee code of parity data and read this as read data into the host system 2 based on a read request of data from the host system are now explained.

Figure 27:
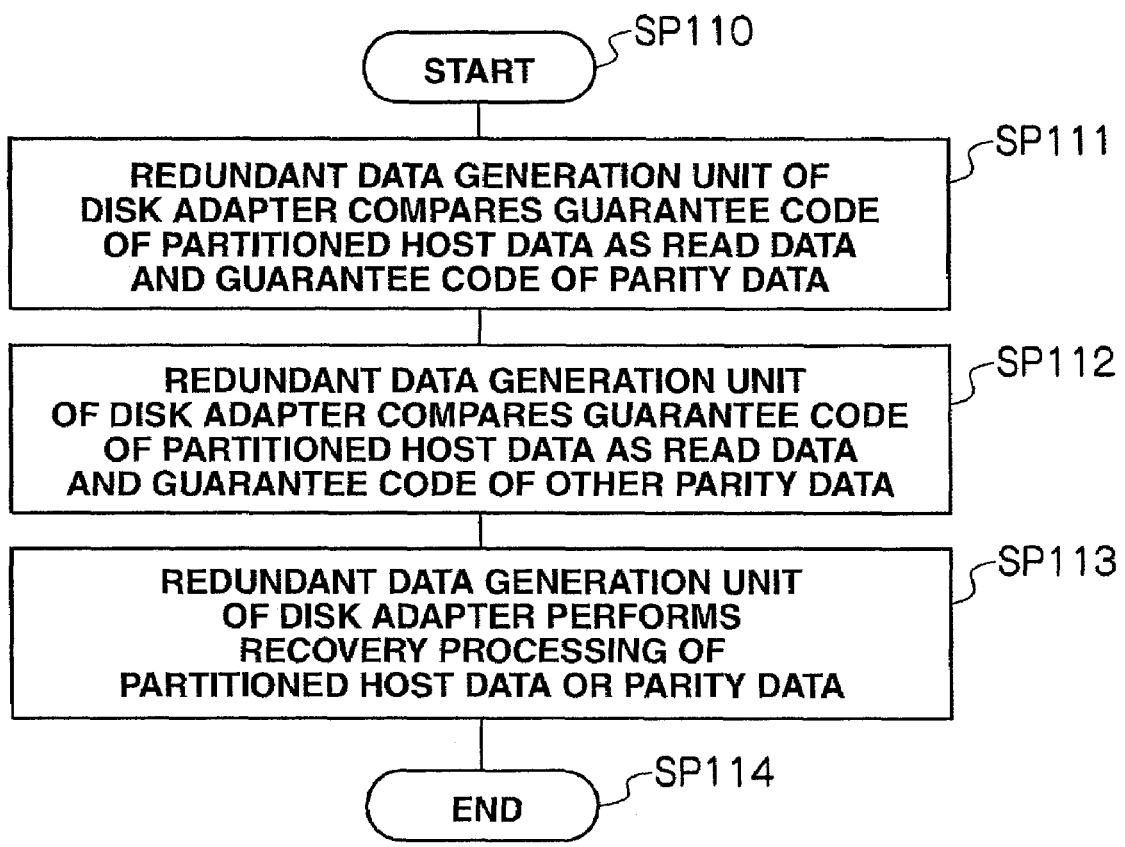
FIG. 27 is a flowchart for verifying a guarantee code according to an embodiment of the present invention.

Specifically, as shown in FIG. 27, when the data transfer unit 112 of the disk adapter 11 receives a read request of read data from the host system 2, it starts the guarantee code comparative processing (SP110).

The redundant data generation unit 113 of the disk adapter 11 compares the guarantee code 16D0 of the partitioned host data D0 as the read data, and the guarantee code 16P1 of the parity data P1 corresponding to the partitioned host data D0 (SP111).

When the guarantee codes coincide as a result of the foregoing comparison, the data transfer unit 112 reads the partitioned host data D0 into the host system 2.

When the guarantee codes do not coincide, the redundant data generation unit 113 of the disk adapter 11 compares the guarantee code 16D0 of the partitioned host data D0 as the read data, and the guarantee code 16P2 of the parity data P2 corresponding to the partitioned host data D0 (SP112).

When the guarantee codes coincide as a result of the foregoing comparison, the data transfer unit 112 reads the partitioned host data D0 into the host system 2.

When the guarantee codes do not coincide, the redundant data generation unit 113 of the disk adapter 11 performs partitioned host data or parity data recreation processing (SP113), and then ends this processing (SP114).

(1-2-2-2-3) Comparison Abnormality Processing

The comparison abnormality processing at step SP96 is now explained in detail. This comparison abnormality processing is executed by the microprocessor 110 of the disk adapter 11 based on the comparison abnormality program 117.

Figure 28:
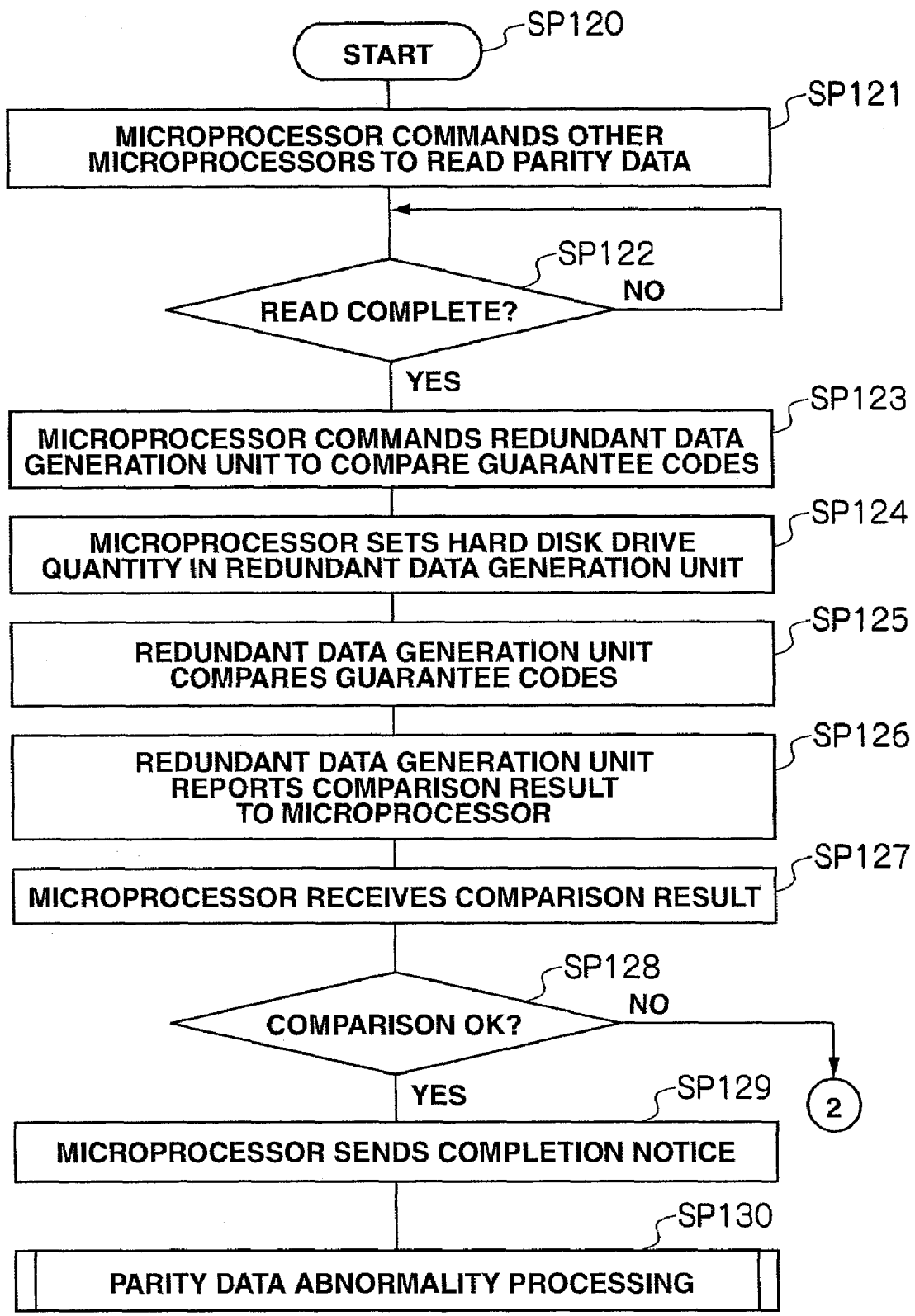
FIG. 28 is a flowchart of comparison abnormality processing according to an embodiment of the present invention.
Figure 29:
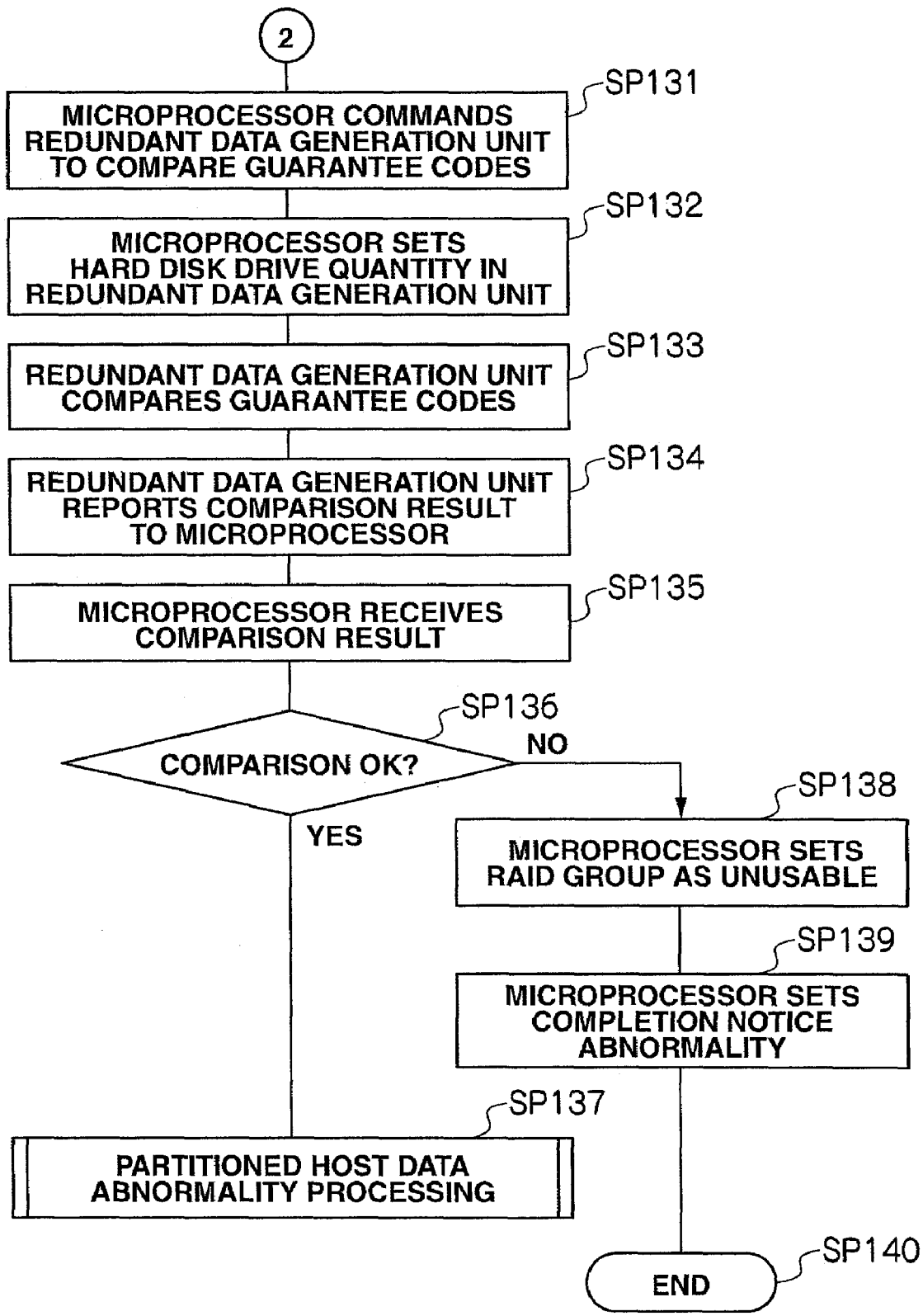
FIG. 29 is a flowchart of comparison abnormality processing according to an embodiment of the present invention.

Specifically, as shown in FIGS. 28 and 29, when the microprocessor 110A determines that the guarantee code 16D0 of the partitioned host data D0 and the guarantee code 16P1 of the parity data P1 do not coincide (SP95: NO), it starts the comparison abnormality processing (SP120).

Subsequently, the microprocessor 110A issues a command to the other microprocessor 110D connected to the hard disk drive 50D storing the parity data P2 to read the parity data P2 from the hard disk drive 50D (SP121).

The microprocessor 110A waits for the other microprocessor 110D to read the parity data P2 from the hard disk drive 50D, and for the parity data read to the shared memory 9 to be completed. Incidentally, this processing is the same as the processing from step SP100 to step SP108, and the explanation thereof is omitted.

The microprocessor 110A determines whether the parity data P2 has been read into the cache memory 10 (SP122), and waits for the parity data P2 to be read into the cache memory 10 (SP122: NO).

Figure 30:
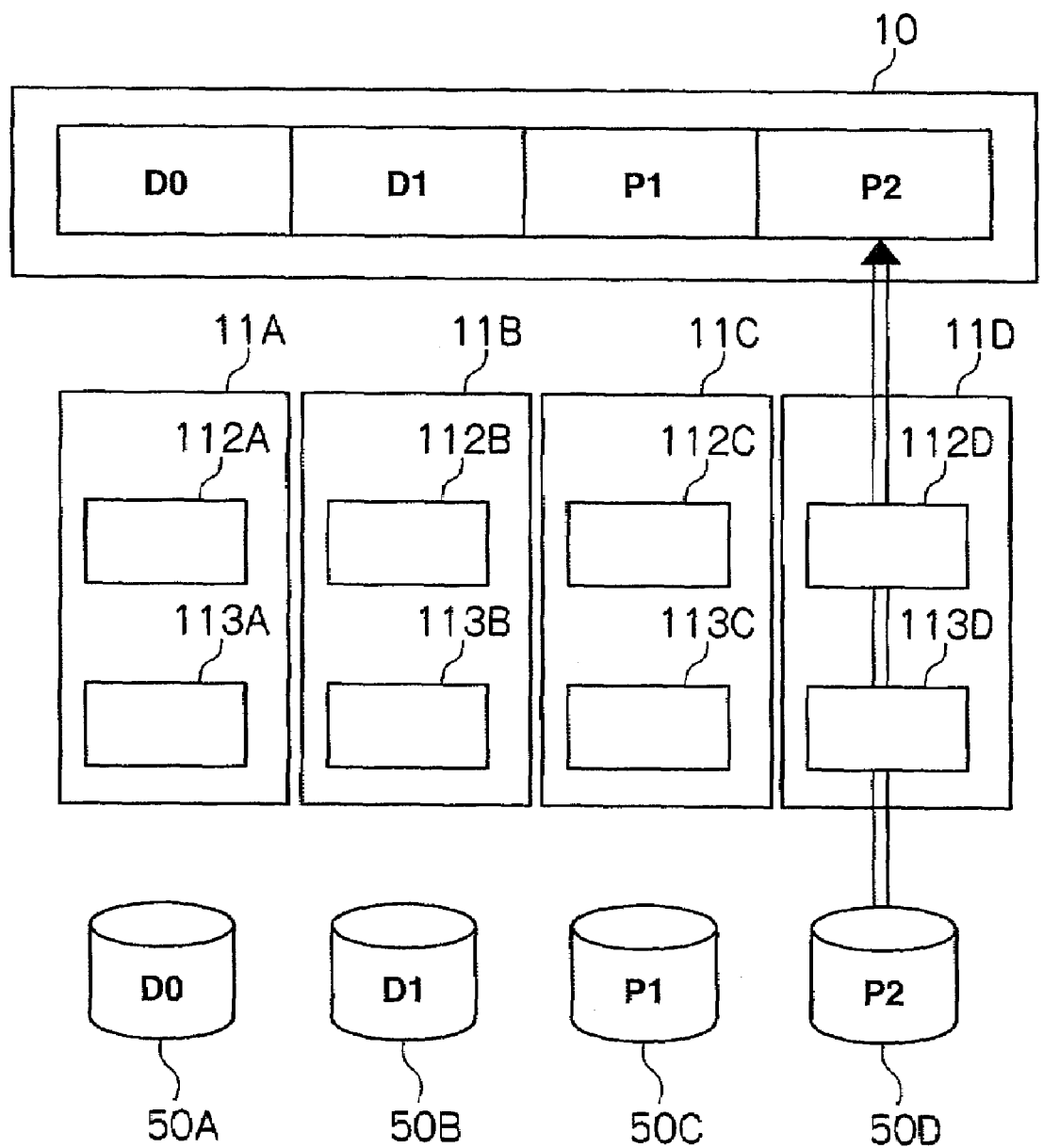
FIG. 30 is a conceptual diagram of comparison abnormality processing according to an embodiment of the present invention.

Meanwhile, as shown in FIG. 30, when the microprocessor 110A determines that the parity data P2 has been read into the cache memory 10 (SP122: YES), it issues a command to the redundant data generation unit 113A to compare the guarantee code 16D0 of the partitioned host data D0 and the guarantee code 16P2 of the read parity data P2 (SP123).

Figure 31:
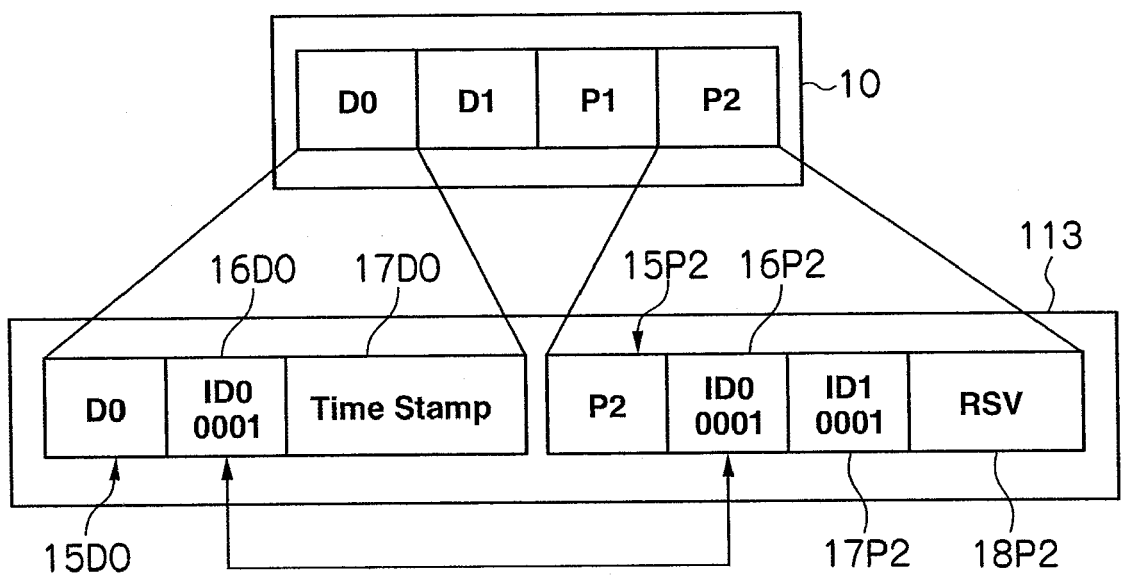
FIG. 31 is a conceptual diagram of comparison abnormality processing according to an embodiment of the present invention.

Then, the microprocessor 110A, as shown in FIG. 31, compares the guarantee code 16D0 of the partitioned host data D0 and the guarantee code 16P2 of the read parity data P2, and performs the processing routine of step SP124 to step SP128 as with the processing routine of step SP91 to step SP95.

When the microprocessor 110A determines that the guarantee code 16D0 of the partitioned host data D0 and the guarantee code 16P2 of the read parity data P2 coincide (SP128: YES), it sets the read complete of the parity data P2 in the shared memory 9 (SP129).

Since the microprocessor 110A determined that there is an abnormality in the parity data P1 read first based on the comparison result, it performs the abnormality processing of the parity data P1 (SP130). The abnormality processing of the parity data P1 will be described later in detail with reference to FIGS. 33 and 34.

Meanwhile, when the microprocessor 110A determines that the guarantee code 16D0 of the partitioned host data D0 and the guarantee code 16P2 of the read parity data P2 do not coincide (SP128: NG), it determines that the guarantee code of the parity data P1 is normal.

Subsequently, the microprocessor 110A issues a command to the redundant data generation unit 113A to compare the guarantee code 16P1 of the parity data P1 and the guarantee code 16P2 of the read parity data P2 (SP131).

Figure 32:
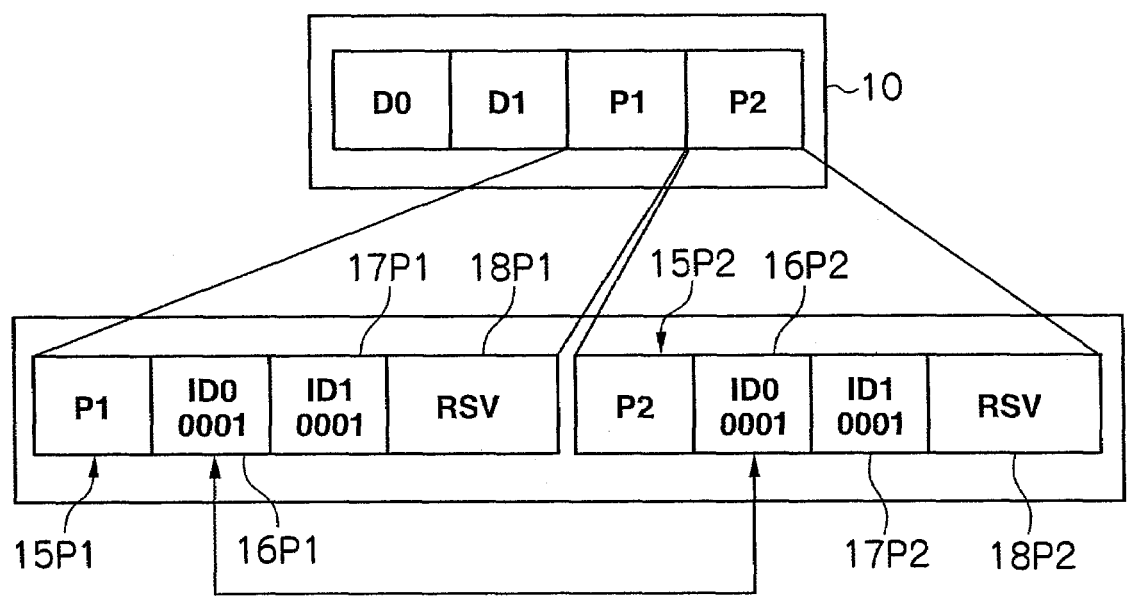
FIG. 32 is a conceptual diagram of comparison abnormality processing according to an embodiment of the present invention.

Then, the microprocessor 110A, as shown in FIG. 32, compares the guarantee code 16P1 of the parity data P1 and the guarantee code 16P2 of the read parity data P2, and performs the same processing as step SP91 to step SP95 at step SP132 to step SP136.

When the microprocessor 110A determines that the guarantee code 16P1 of the parity data P1 and the guarantee code 16P2 of the read parity data P2 coincide (SP136: YES), since it determines an abnormality in the partitioned host data D0 read first, the microprocessor 110A performs the abnormality processing of the partitioned host data D0 (SP137). The abnormality processing of the partitioned host data D0 will be explained in detail later with reference to FIGS. 37 and 38.

Meanwhile, when the microprocessor 110A determines that the guarantee code 16P1 of the parity data P1 and the guarantee code 16P2 of the read parity data P2 do not coincide (SP136: NO), it determines that none of the guarantee codes of the partitioned host data D0, D1 and the parity data P1, P2 coincide.

Therefore, the microprocessor 110A set this RAID group as unusable (SP138), sets completion abnormality of the disk adapter in the shared memory 9 (SP139), and then ends this processing (SP140).

(1-2-2-2-4) Abnormality Processing of Parity Data

Continuously, the abnormality processing of the parity data P1 at step SP130 is now explained in detail. This abnormality processing of the parity data is executed by the microprocessor 110 of the disk adapter 11 based on the parity data abnormality program 118.

Figure 33:
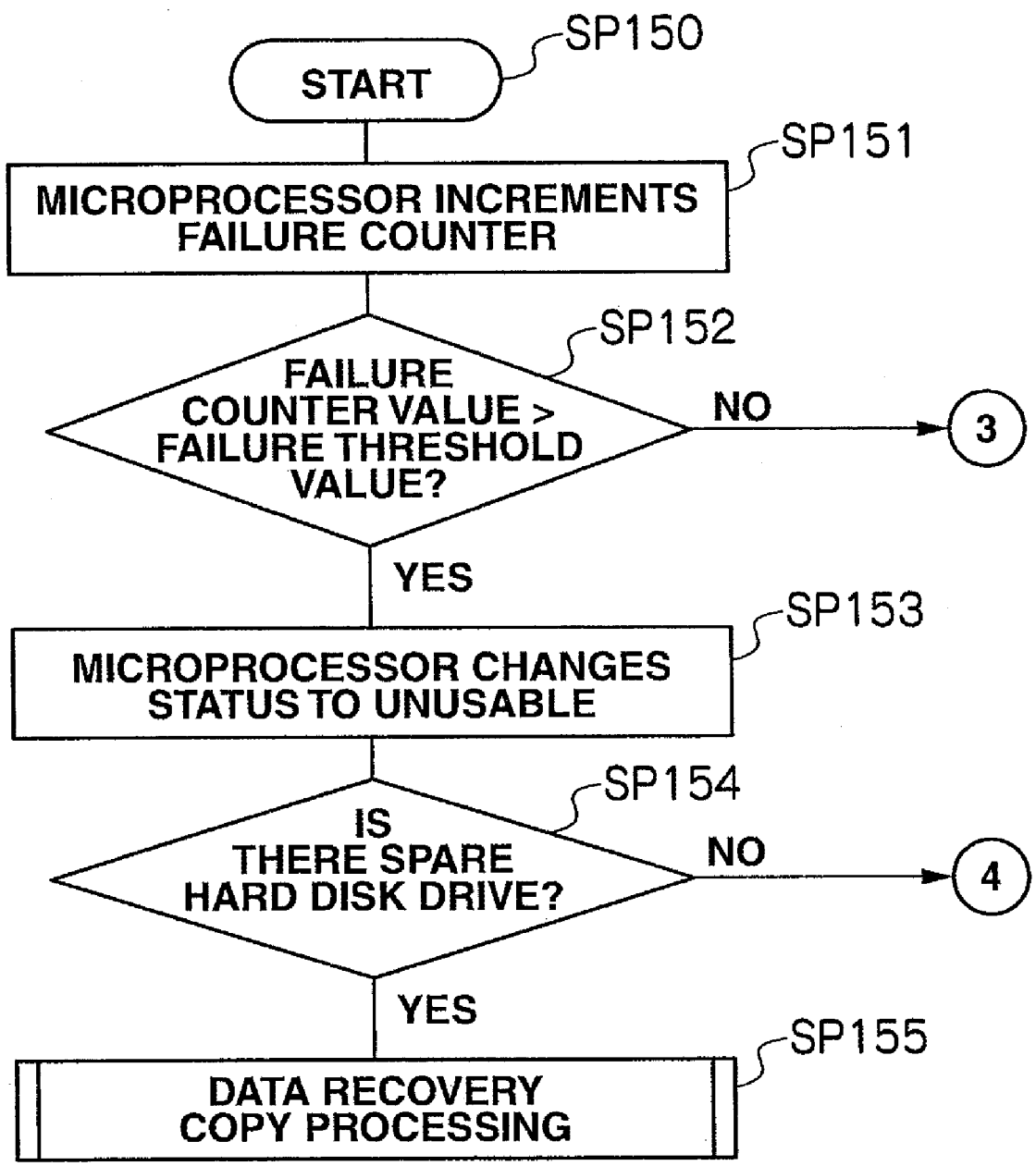
FIG. 33 is a flowchart of parity data abnormality processing according to an embodiment of the present invention.
Figure 34:
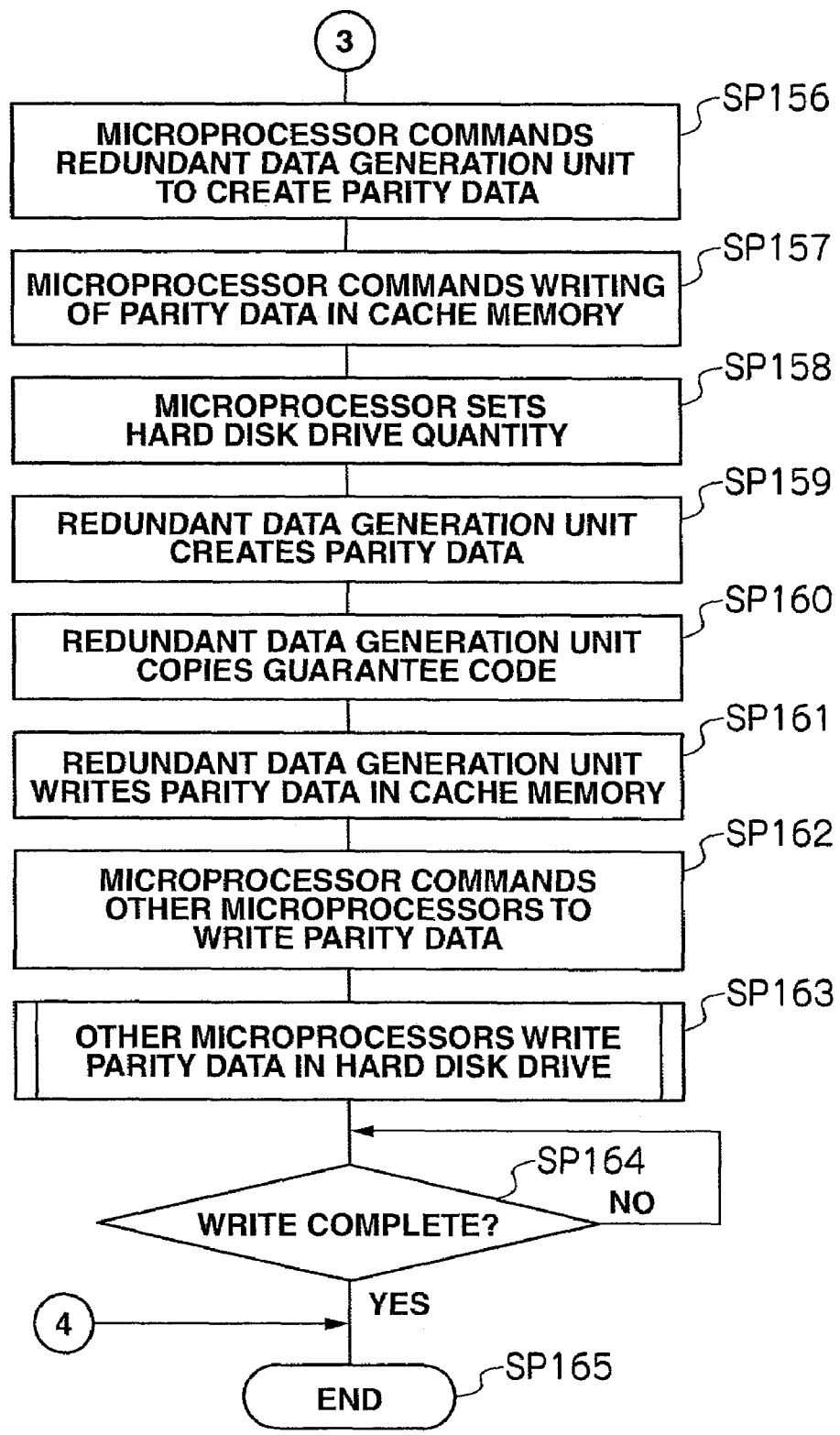
FIG. 34 is a flowchart of parity data abnormality processing according to an embodiment of the present invention.

Specifically, as shown in FIGS. 33 and 34, when the microprocessor 110A determines that the guarantee code 16D0 of the partitioned host data D0 and the guarantee code 16P2 of the parity data P2 coincide (SP128: YES), it starts the abnormality processing of the parity data P1 (SP150).

Foremost, the microprocessor 110A increments the failure counter of the failure information table 920 in the shared memory 9 (SP151). In this embodiment, the microprocessor 110A updates the counter value in the "sector failure" field 920B in the hard disk drive 50C storing the parity data P1.

The microprocessor 110A thereafter determines whether the failure counter value in the "sector failure" field 920B corresponding to the updated hard disk drive 50C exceeds the failure threshold value (SP152).

When the microprocessor 110A determines that the failure counter value in the "sector failure" field 920B corresponding to the updated hard disk drive 50C exceeds the failure threshold value (SP152: YES), it determines that the hard disk drive 50C is subject to a drive failure. Then the microprocessor 110A changes the "status" field 912B corresponding to the hard disk drive 50C in the hard disk drive information table 912 of the shared memory 9 to "unusable" (SP153).

Subsequently, the microprocessor 110A determines whether the hard disk drive 50C determines as a drive failure has a spare hard disk drive S (SP154), and, when it determines that there is no spare hard disk drive S (SP154: NO), the microprocessor 110A ends this abnormality processing of the parity data P1 (SP165).

Meanwhile, when the microprocessor 110A determines that there is a spare disk (SP154: YES), it performs data recovery copy processing for recovering the hard disk drive (SP155). Incidentally, the data recovery copy processing will be explained in detail later with reference to FIGS. 41 and 42.

When the microprocessor 110A determines that the failure counter value in the "sector failure" field 920B corresponding to the updated hard disk drive 50C does not exceed the failure threshold value at step SP152 (SP152: NO), it issues a command to the redundant data generation unit 113A to read the partitioned host data D0 and the parity data P2, and create the parity data P1 (SP156), and write the created parity data P1 into the cache memory 10 (SP157).

Further, the microprocessor 110A refers to the RAID group information table 910 of the shared memory 9, and sets the "hard disk drive quantity" field to "4" (SP158).

Figure 35:
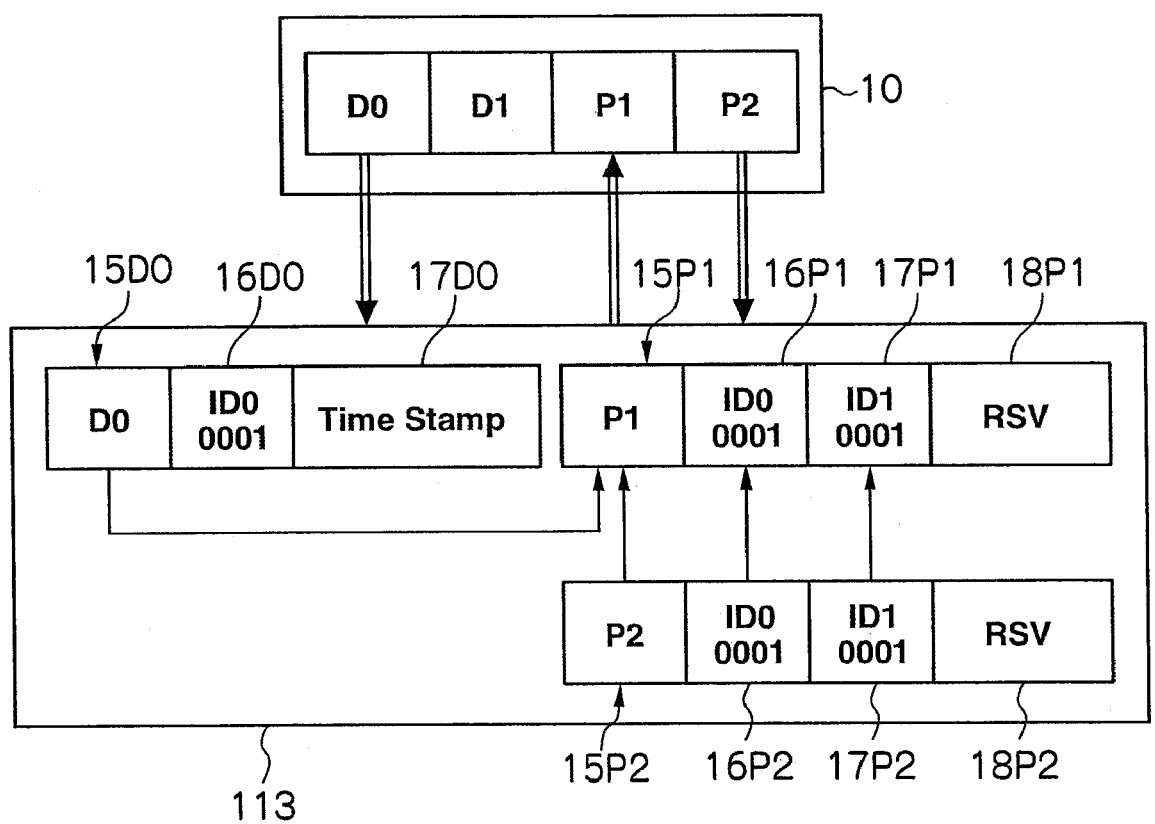
FIG. 35 is a conceptual diagram of parity data abnormality processing according to an embodiment of the present invention.

As shown in FIG. 35, the redundant data generation unit 113A that received a command from the microprocessor 110A reads the partitioned host data D0 and the parity data P2, and creates the parity data P1 (SP159). Simultaneously, the redundant data generation unit 113A copies the guarantee codes 16P2, 17P2 of the parity data P2 to the parity data P1, and recreates the guarantee codes 16P1, 17P1 of the parity data P1 (SP160).

The redundant data generation unit 113A writes the parity data P1 with the recreated guarantee codes 16P1, 17P1 into the cache memory 10 (SP161).

Thereby, the microprocessor 110A issues a write command to the other microprocessor 110C to write the recreated parity data P1 into the hard disk drive 50C (SP162). Specifically, the microprocessor 110A sets a hard disk write command in the shared memory 9.

The microprocessor 110A and the other microprocessor 110C perform the same processing as step SP40 to step SP46 regarding the recreated parity data at step SP163.

The microprocessor 110A determines whether the other microprocessor 110C has written the parity data P1 into the hard disk drive 50C (SP164), and, when such parity data P1 has not yet been written (SP164: NO), it waits until the writing is complete.

Figure 36:
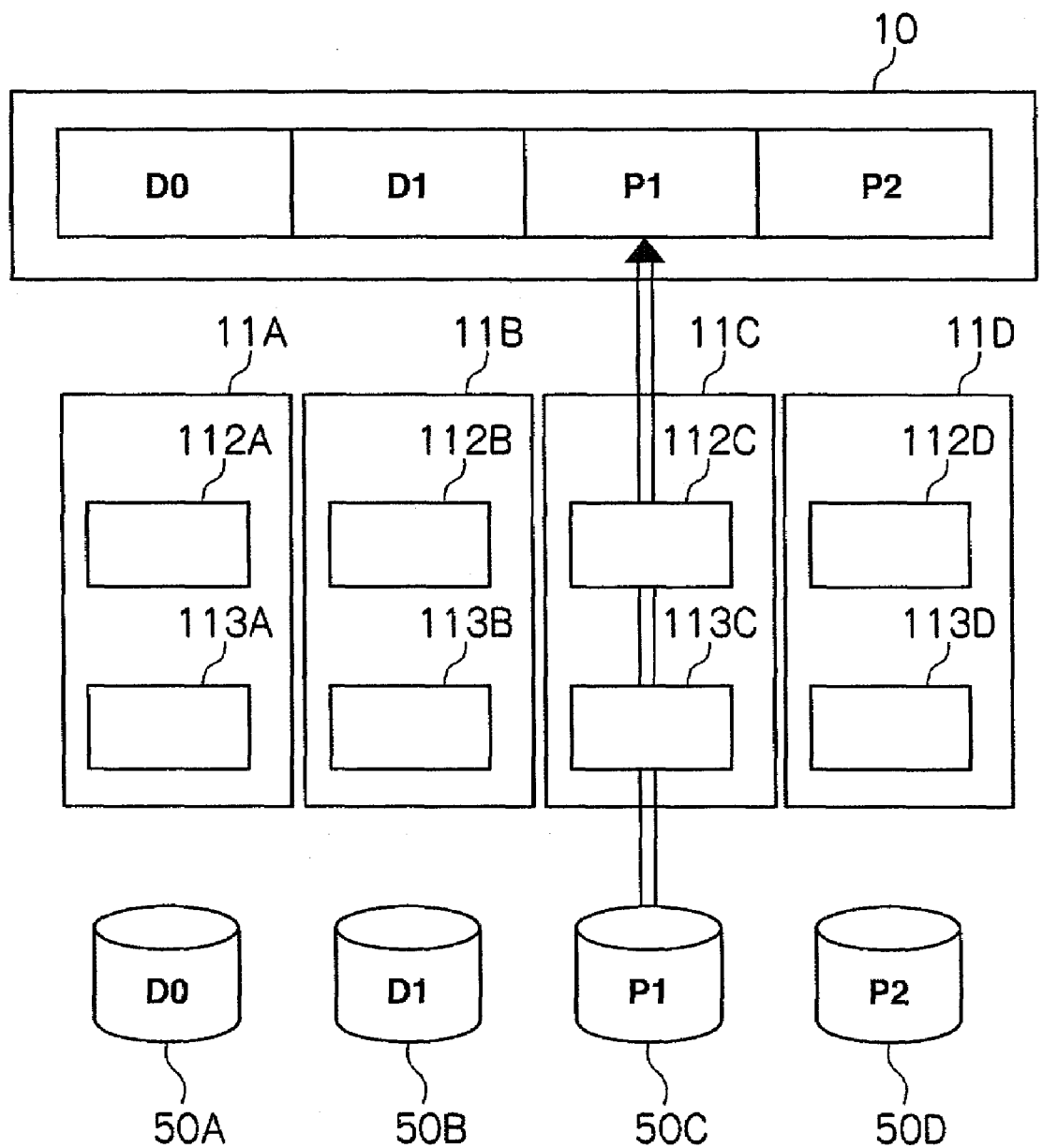
FIG. 36 is a conceptual diagram of parity data abnormality processing according to an embodiment of the present invention.

Meanwhile, when the microprocessor 110A receives a write completion report from the other microprocessor 110C as a result of the other microprocessor 110C writing the parity data P1 into the hard disk drive 50C as shown in FIG. 36 (SP164: YES), it ends the parity data abnormality processing (SP165).

(1-2-2-2-5) Abnormality Processing of Partitioned Host Data

Continuously, the abnormality processing of the partitioned host data D0 at step SP137 is now explained in detail. This abnormality processing of the partitioned host data is executed by the microprocessor 110 of the disk adapter 11 based on the partitioned host data abnormality program 119.

Figure 37:
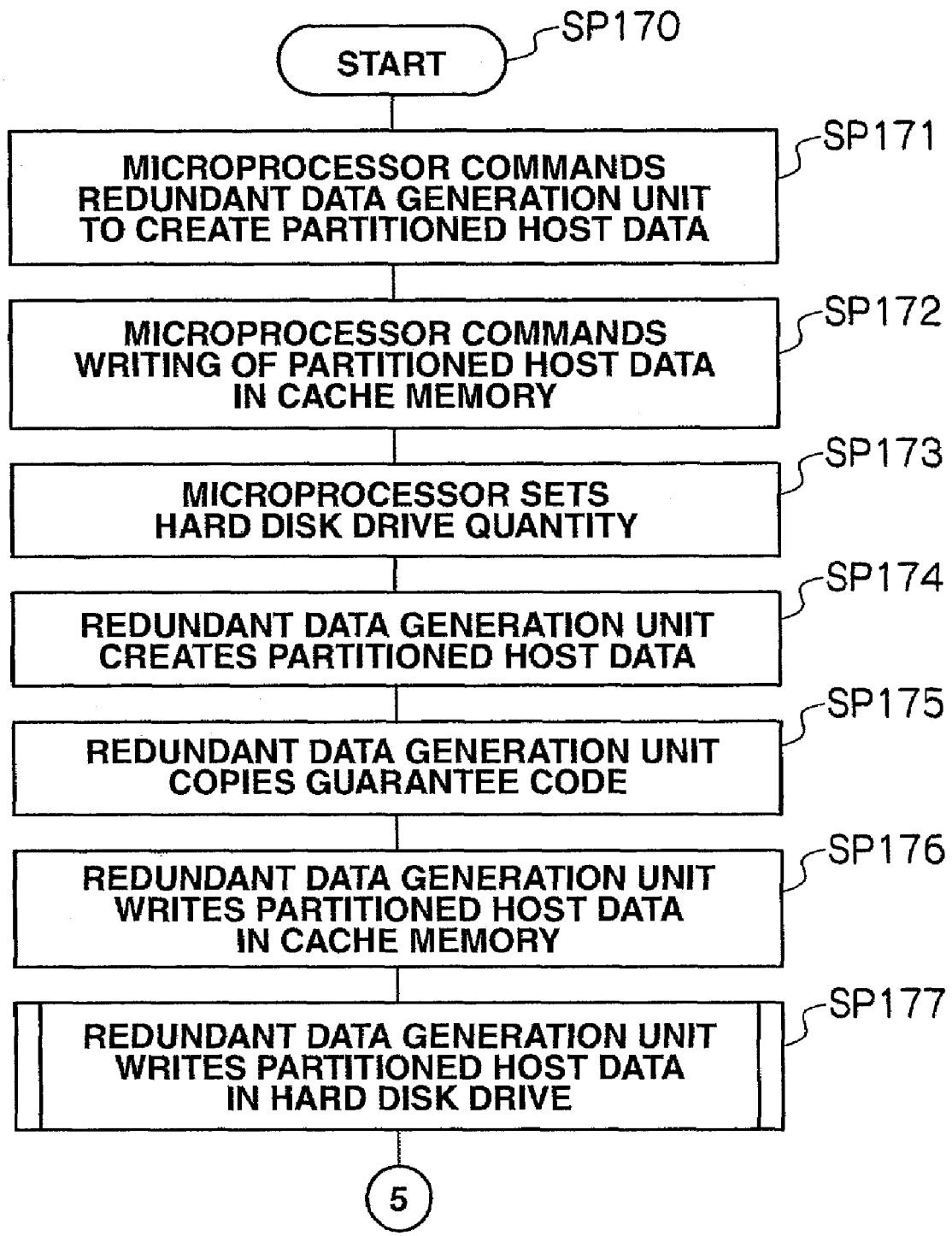
FIG. 37 is a flowchart of partitioned host data abnormality processing according to an embodiment of the present invention.
Figure 38:
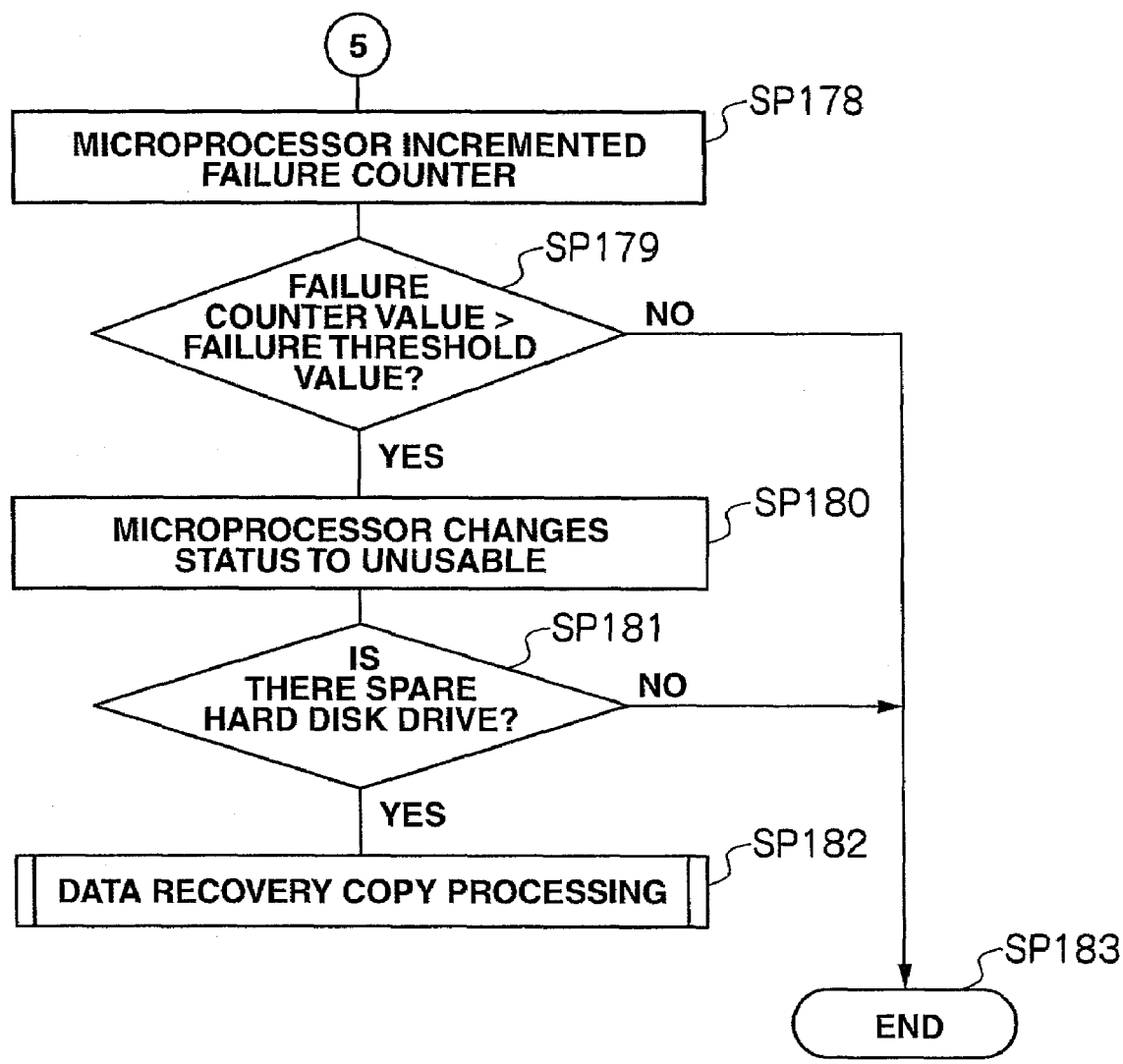
FIG. 38 is a flowchart of partitioned host data abnormality processing according to an embodiment of the present invention.

Specifically, as shown in FIGS. 37 and 38, when the microprocessor 110A determines that the guarantee code 16P1 of the parity data P1 and the guarantee code 16P2 of the read parity data P2 coincide (SP136: YES), it starts the abnormality processing of the partitioned host data D0 (SP170).

Subsequently, the microprocessor 110A issues a command to the redundant data generation unit 113A to read the parity data P1 and the parity data P2, and create the partitioned host data D0 (SP171), and write the created partitioned host data D0 into the cache memory 10 (SP172).

Further, the microprocessor 110A refers to the RAID group information table 910 of the shared memory 9 and sets the "hard disk drive quantity" field to "4" (SP173).

Figure 39:
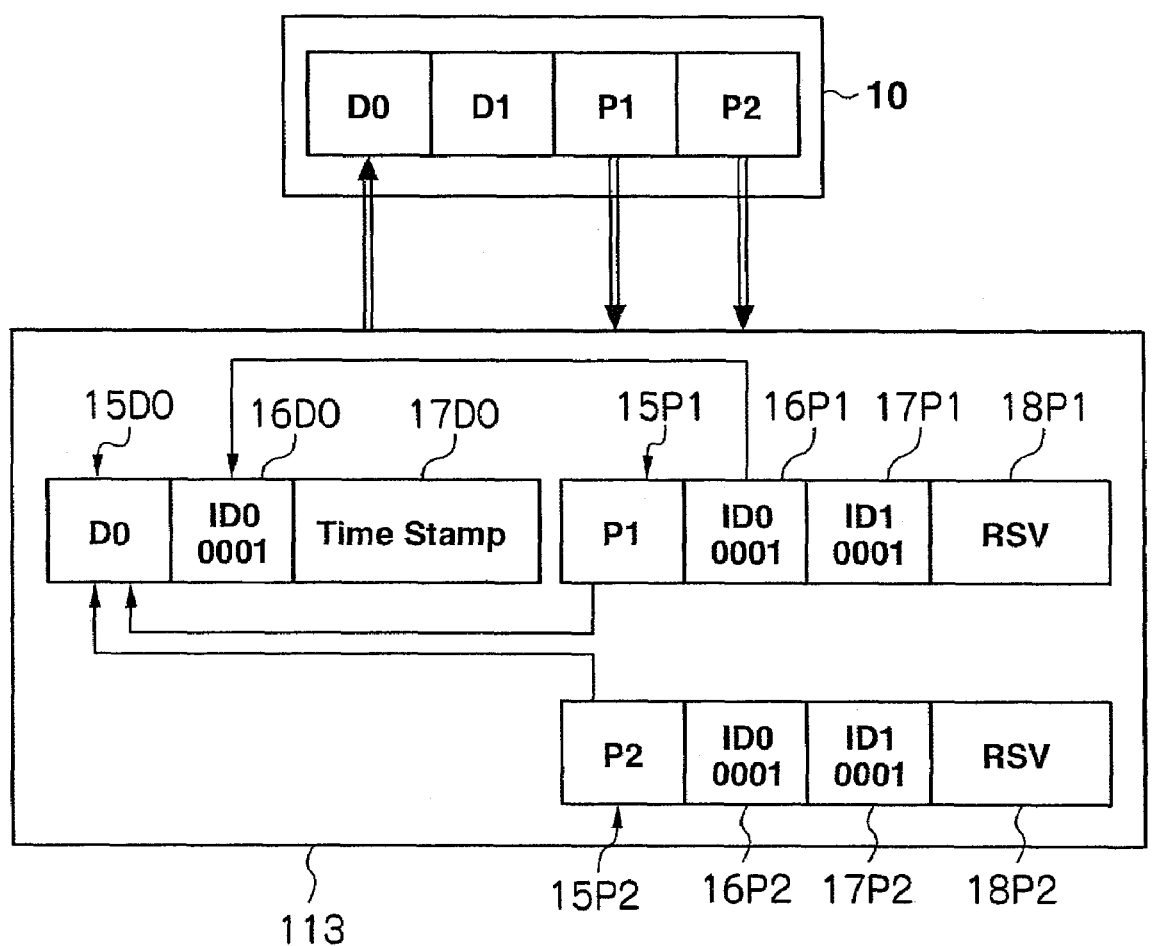
FIG. 39 is a conceptual diagram of partitioned host data abnormality processing according to an embodiment of the present invention.

As shown in FIG. 39, the redundant data generation unit 113A that received a command from the microprocessor 110A reads the parity data P1 and the parity data P2, and creates the partitioned host data D0 (SP174). Simultaneously, the redundant data generation unit 113A copies the guarantee codes 16P1, 17P1 of the parity data P1 to the partitioned host data D0, and recreates the guarantee code 16D0 of the partitioned host data D0 (SP175).

The redundant data generation unit 113A writes the partitioned host data D0 with the recreated guarantee code 16D0 into the cache memory 10 (SP176).

Figure 40:
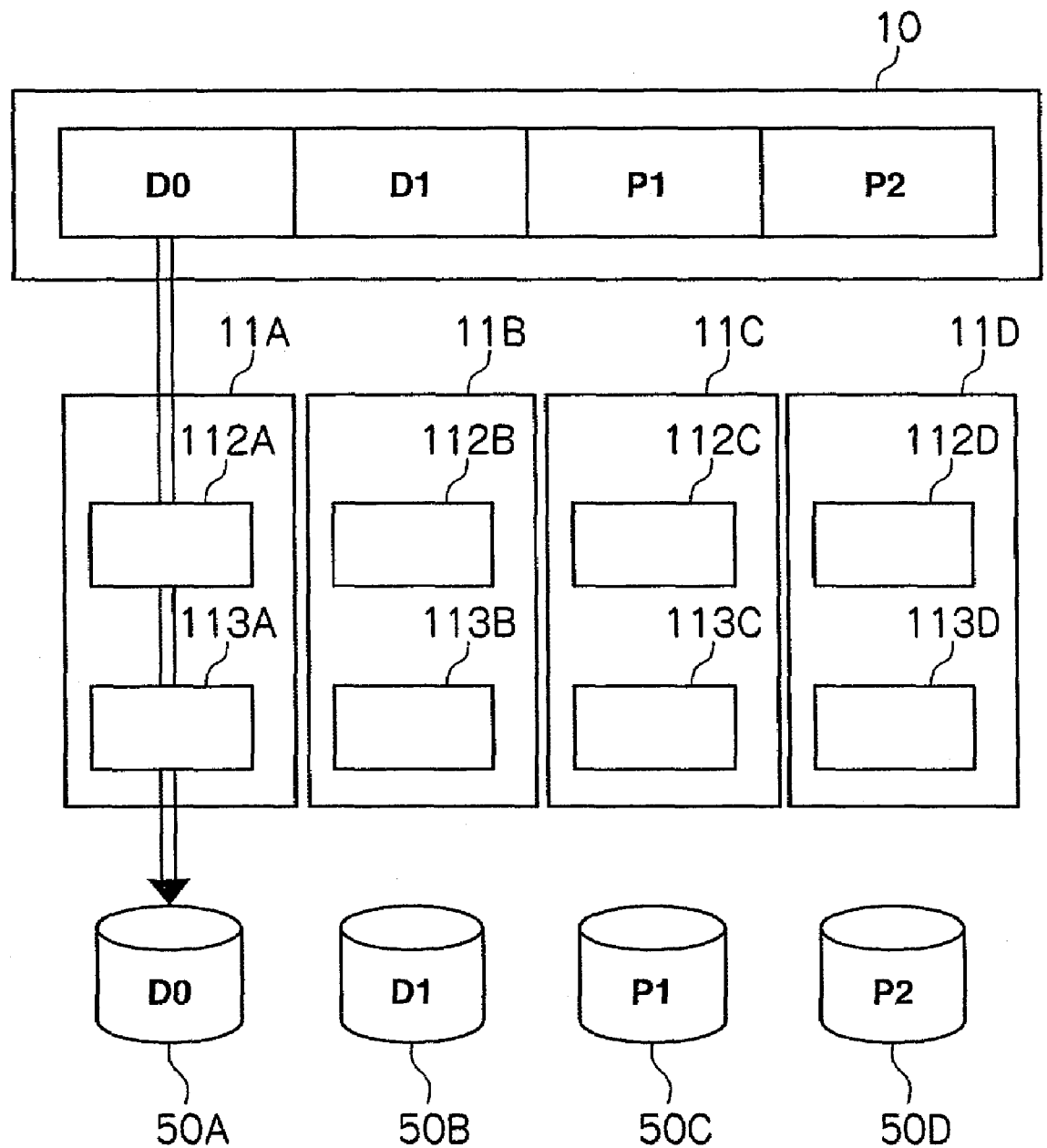
FIG. 40 is a conceptual diagram of partitioned host data abnormality processing according to an embodiment of the present invention.

Then, the microprocessor 110A, as shown in FIG. 40, writes the recreated partitioned host data D0, which was written into the cache memory 10, into the hard disk drive 50A (SP177).

Incidentally, the processing for writing the recreated partitioned host data D0 into the hard disk drive 50A is the same as the processing at step SP40 to step SP46, and the explanation thereof is omitted.

The microprocessor 110A thereafter performs the processing at step SP178 to step SP182 as with the processing at step SP151 to step SP155.

Thereby, when the microprocessor 110A determines that the failure counter value in the "sector failure" field 920B of the updated hard disk drive 50A does not exceed the failure threshold value (SP179: NO), or determines that there is no spare hard disk drive S at step SP181 (SP181: NO), it ends the abnormality processing of the partitioned host data D0 (SP183).

Meanwhile, when the microprocessor 110A determines that there is a spare hard disk drive (SP181: YES), it performs data recovery copy processing for recovering the hard disk drive (SP182). Incidentally, the data recovery copy processing will be explained in detail later with reference to FIGS. 41 and 42.

(1-2-2-2-6) Data Recovery Copy Processing

Continuously, the data recovery copy processing of the partitioned host data D0 at step SP182 is now explained in detail. This abnormality processing of the partitioned host data is executed by the microprocessor 110 of the disk adapter 11 based on the data recovery copy program 120.

Here, the data recovery copy processing of the partitioned host data D0 refers to the processing of recovering the partitioned host data D0 by copying the partitioned host data D0 stored in the hard disk drive 50A determined to be a defective disk to a spare hard disk drive S.

Incidentally, the data recovery copy processing of the parity data P1 at step SP155 is the same as the routine of the data recovery copy processing of the partitioned host data D0 excluding the difference in the data to be read from the hard disk drive, and the explanation thereof is omitted.

Figure 41:
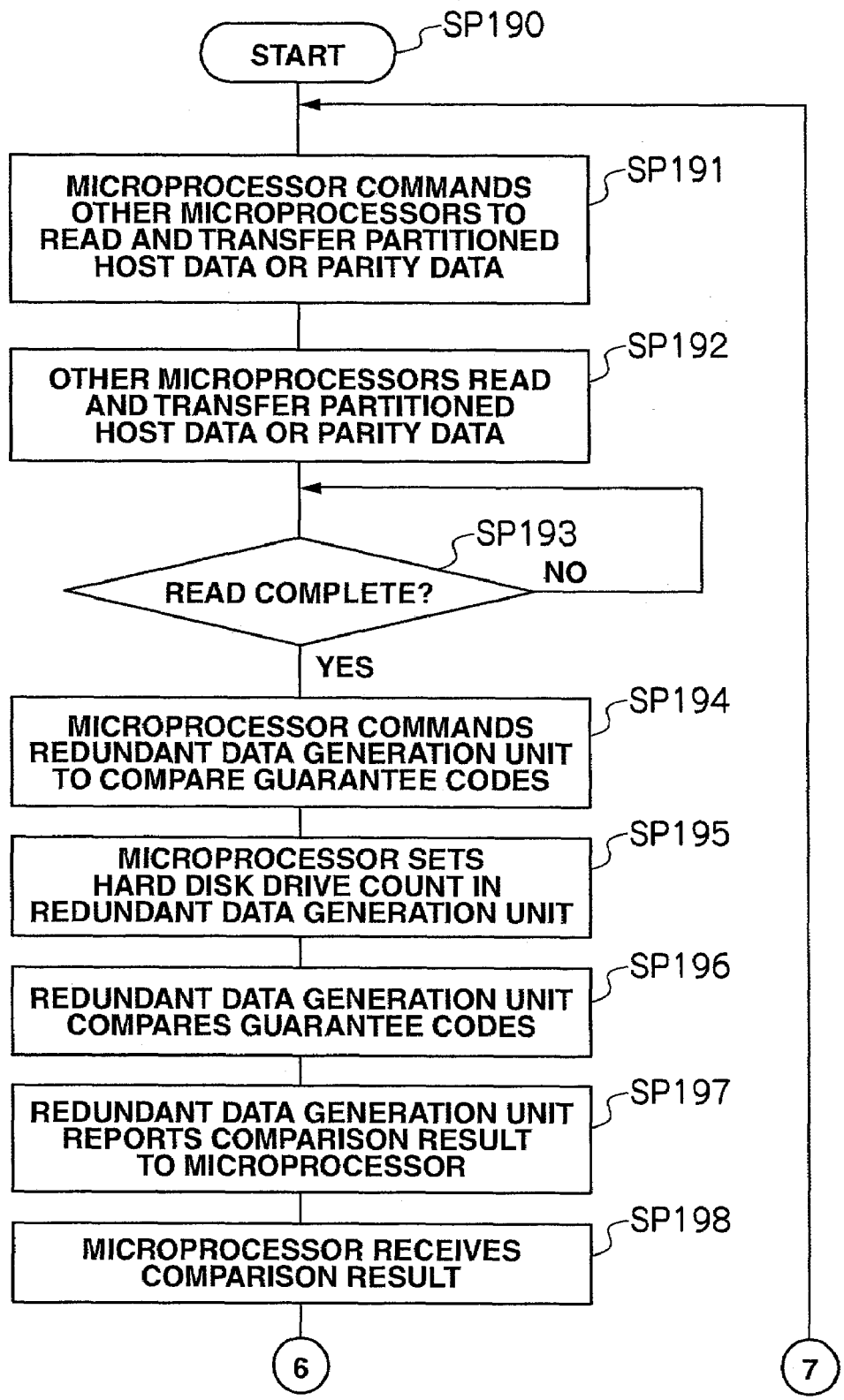
FIG. 41 is a flowchart of data recovery copy processing according to an embodiment of the present invention.
Figure 42:
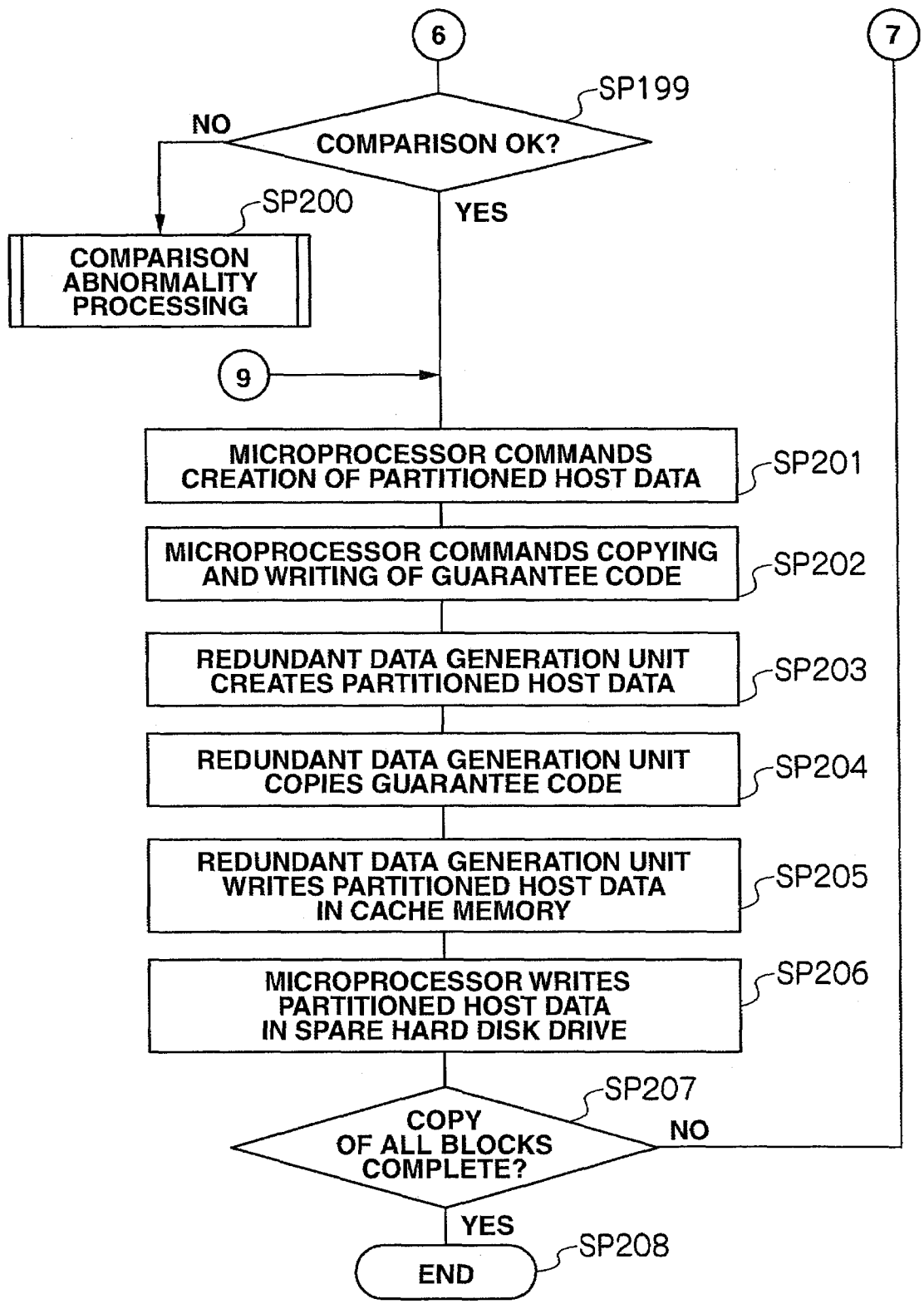
FIG. 42 is a flowchart of data recovery copy processing according to an embodiment of the present invention.

Specifically, as shown in FIGS. 41 and 42, when the microprocessor 110A determines that there is a spare hard disk drive S (SP181: YES), it starts the data recovery copy processing of the partitioned host data D0 (SP190).

The microprocessor 110A issues a command to the other microprocessors 110B, 110C to read the partitioned host data D1 or the parity data P1 from the respective hard disk drives 50B, 50C, and transfer such data to the cache memory 10 (SP191).

The other microprocessors 110B, 110C read the partitioned host data D1 or the parity data P1 from the respective hard disk drives 50B, 50C, and transfer such data to the cache memory 10 (SP192).

The microprocessor 110A determines whether the reading into the cache memory 10 is complete (SP193), and waits until the reading is complete (SP193: NO).

When the microprocessor 110A determines that the reading into the cache memory 10 is complete (SP193: YES), it thereafter performs the processing routine of step SP194 to step SP198 as with the processing routine of step SP90 to SP94.

Figure 43:
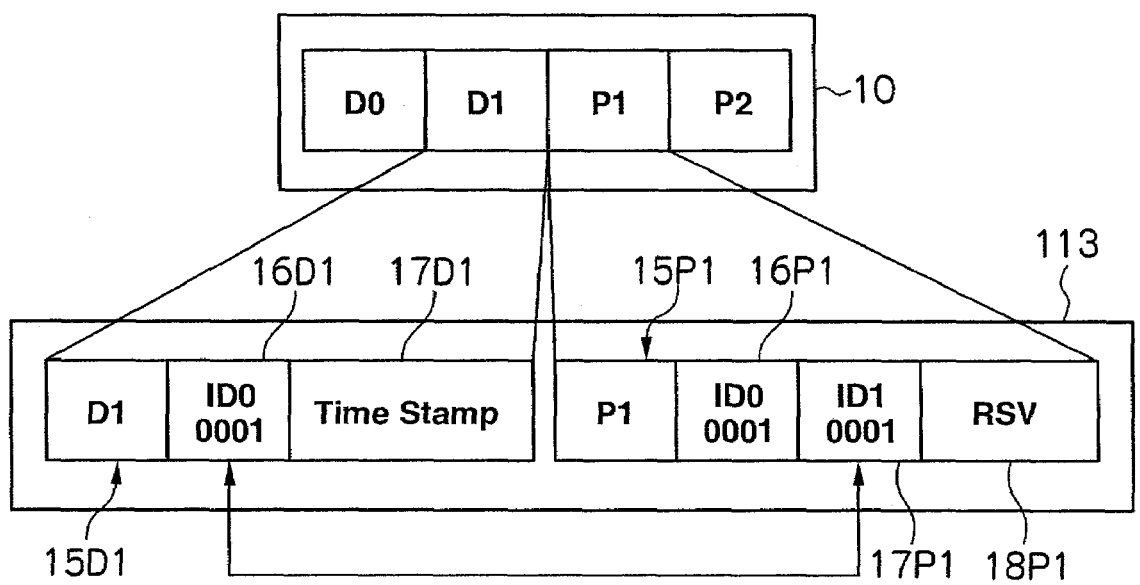
FIG. 43 is a conceptual diagram of data recovery copy processing according to an embodiment of the present invention.

Then, the microprocessor 110A, as shown in FIG. 43, compares the guarantee code 16D1 of the read partitioned host data D1 and the guarantee code 17P1 of the parity data P1 (SP199), and, when it determines that the two guarantee codes do not coincide (SP199: NO), the microprocessor 110A performs the comparison abnormality processing (SP200).

Meanwhile, when the microprocessor 110A determines that the two guarantee codes coincide (SP199: YES), it issues a command to the redundant data generation unit 113A to recreate the partitioned host data D0 (SP201). The microprocessor 110A thereafter issues a command to the redundant data generation unit 113A to copy the guarantee code 17P1 of the parity data P1 to the partitioned host data D0 (SP202), and write the recreated partitioned host data D0 into the cache memory 10 (SP203).

Figure 44:
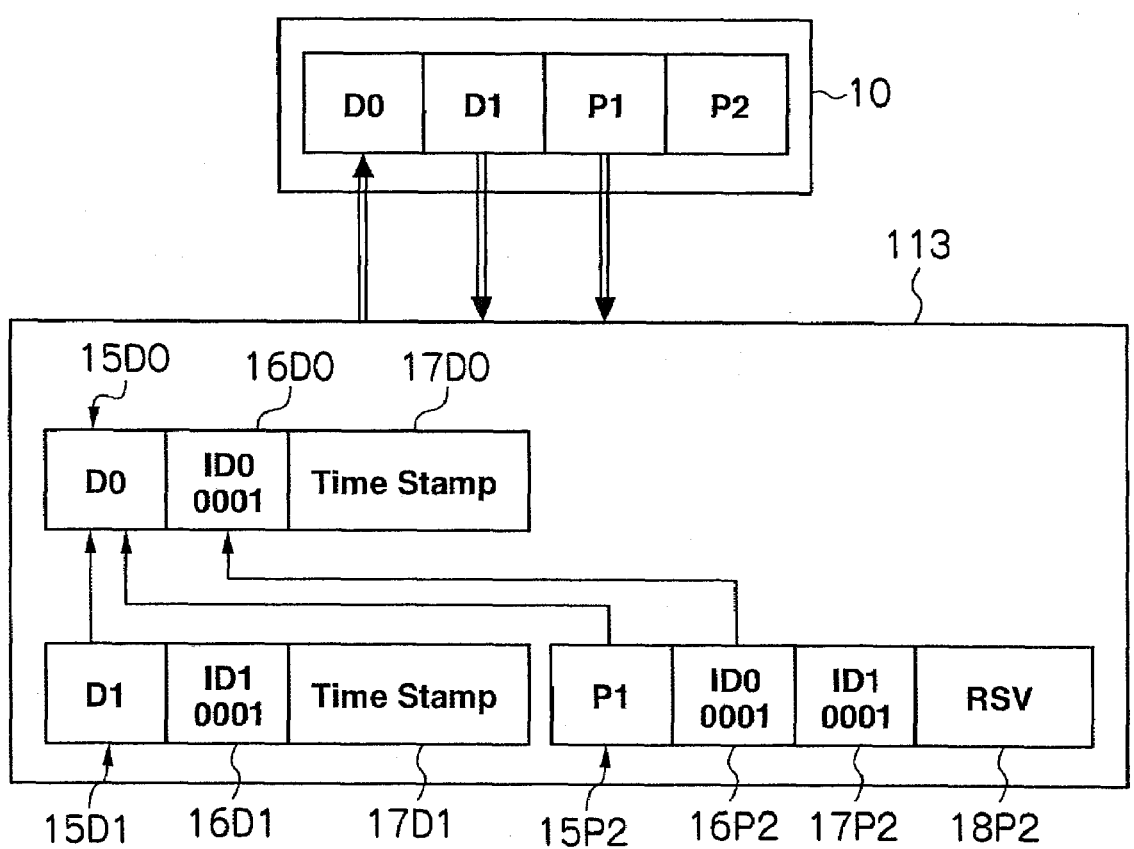
FIG. 44 is a conceptual diagram of data recovery copy processing according to an embodiment of the present invention.

The redundant data generation unit 113A that received this command recreates the partitioned host data (SP203), copies the guarantee code 17P1 of the parity data P1 to the partitioned host data D0 and reconfigures the guarantee code (SP204), and, as shown in FIG. 44, thereafter writes the recreated partitioned host data into the cache memory (SP205).

Figure 45:
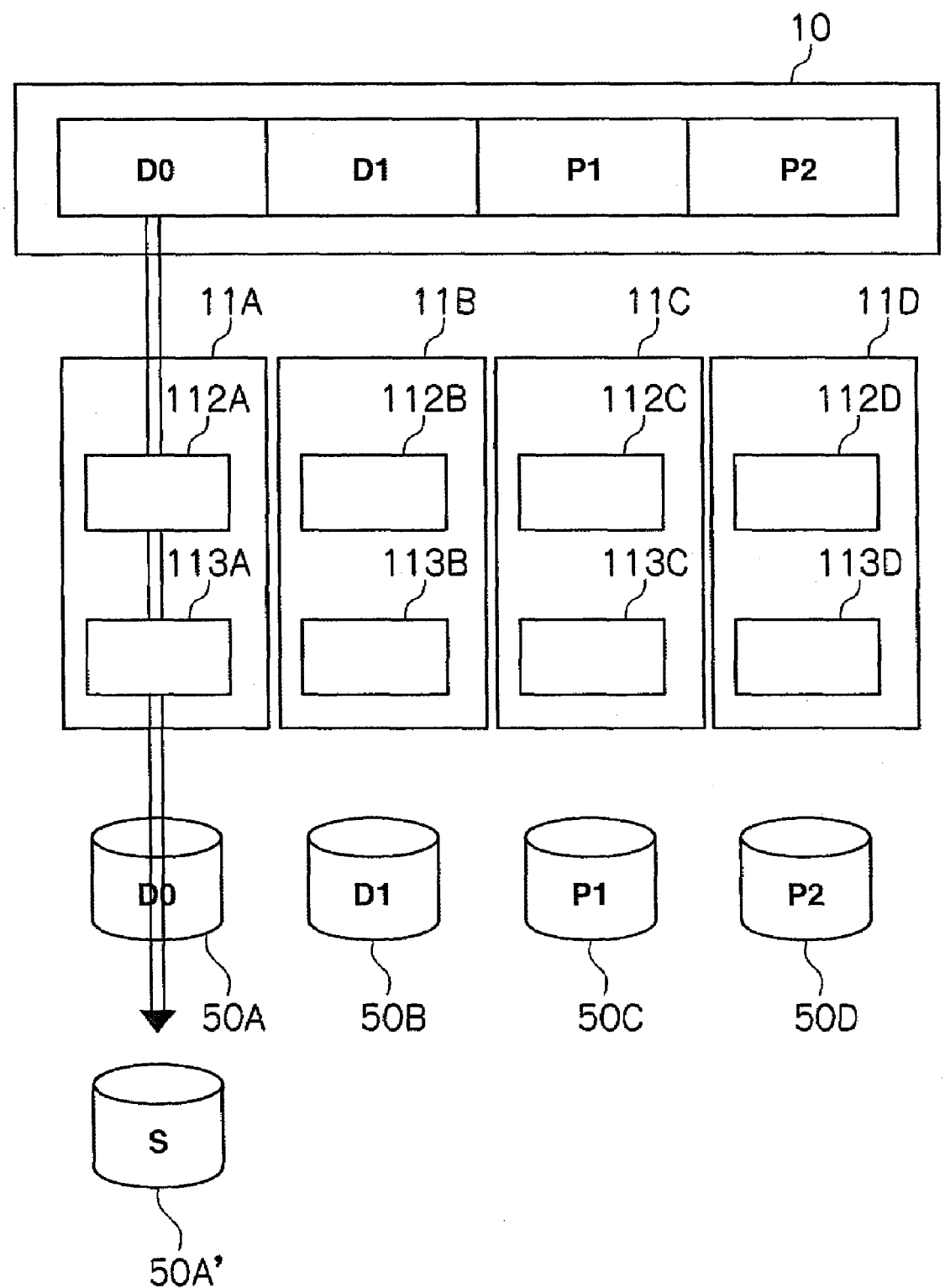
FIG. 45 is a conceptual diagram of data recovery copy processing according to an embodiment of the present invention.

Thereby, as shown in FIG. 45, the microprocessor 110A writes the recreated partitioned host data D0 in the cache memory 10 into the spare hard disk drive S (SP206).

The microprocessor 110A determines whether the copying in all blocks of the partitioned host data D0 is complete (SP207), and, if complete (SP207: NO), it returns once again to step SP191.

When the copying in all blocks of the partitioned host data D0 is complete (SP207: YES), the microprocessor 110A ends this data recovery copy processing (SP208).

The comparison abnormality processing at step SP200 is now explained. This processing is executed by the microprocessor 110A based on the comparison abnormality program.

Figure 46:
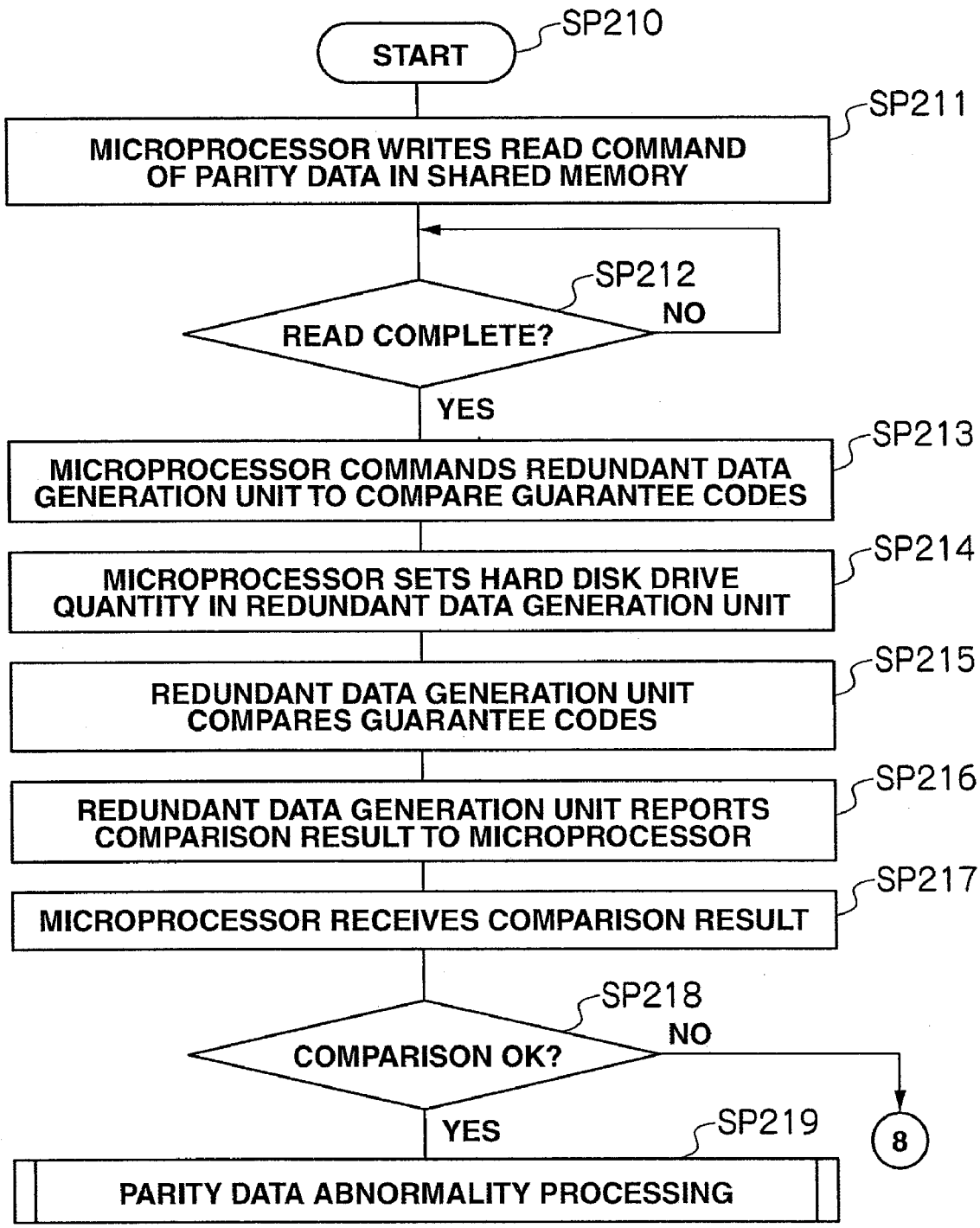
FIG. 46 is a flowchart of comparison abnormality processing during data recovery copy processing according to an embodiment of the present invention.
Figure 47:
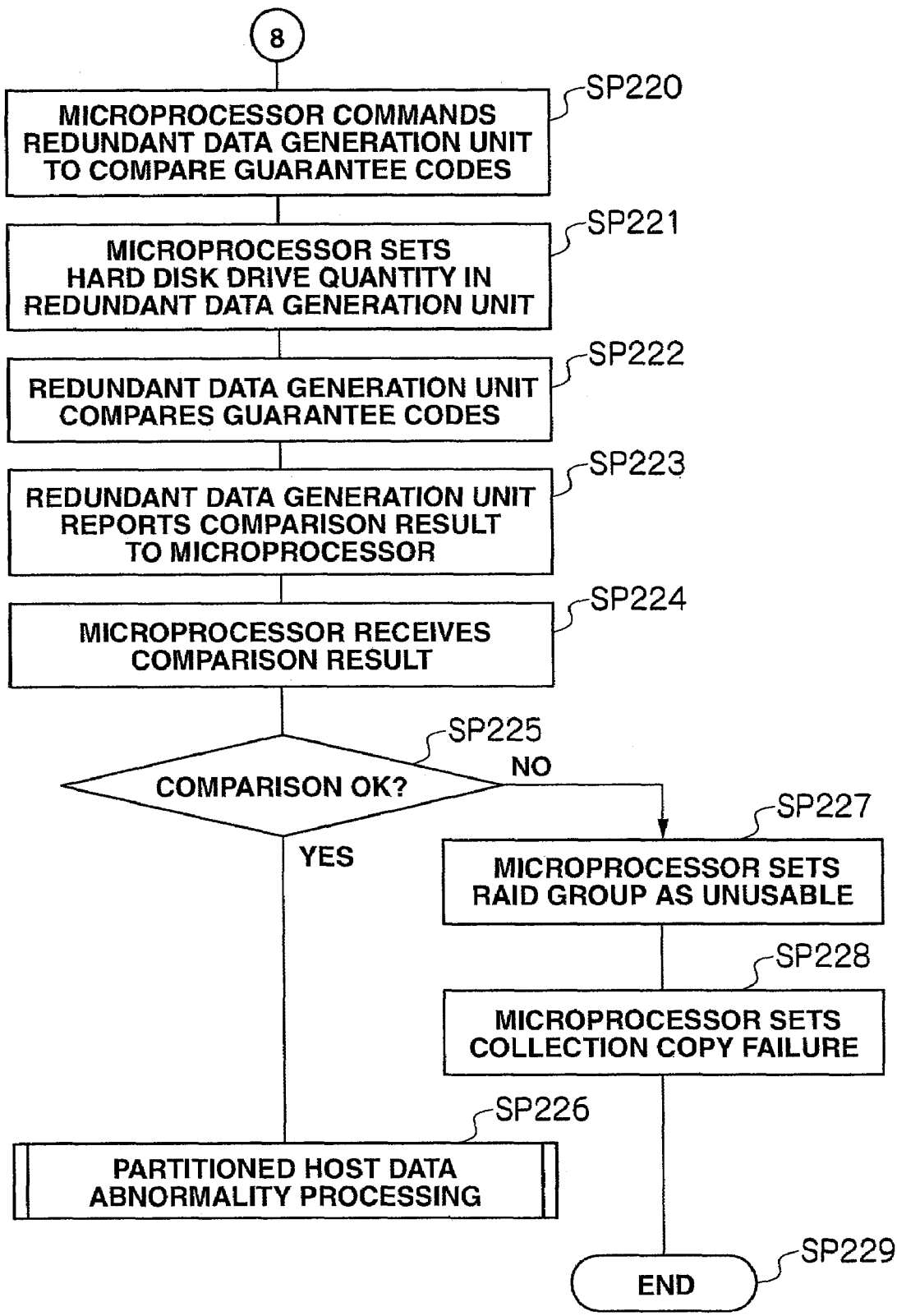
FIG. 47 is a flowchart of comparison abnormality processing during data recovery copy processing according to an embodiment of the present invention.

Specifically, as shown in FIGS. 46 and 47, when the microprocessor 110A determines that the guarantee code 16D1 of the read partitioned host data D1 and the guarantee code 17P1 of the parity data P1 do not coincide at step SP199 (SP199: NO), it starts the comparison abnormality processing (SP210).

The microprocessor 110A thereafter performs the processing routine of step SP211 to step SP218 as with the processing routine of step SP121 to step SP128.

Figure 48:
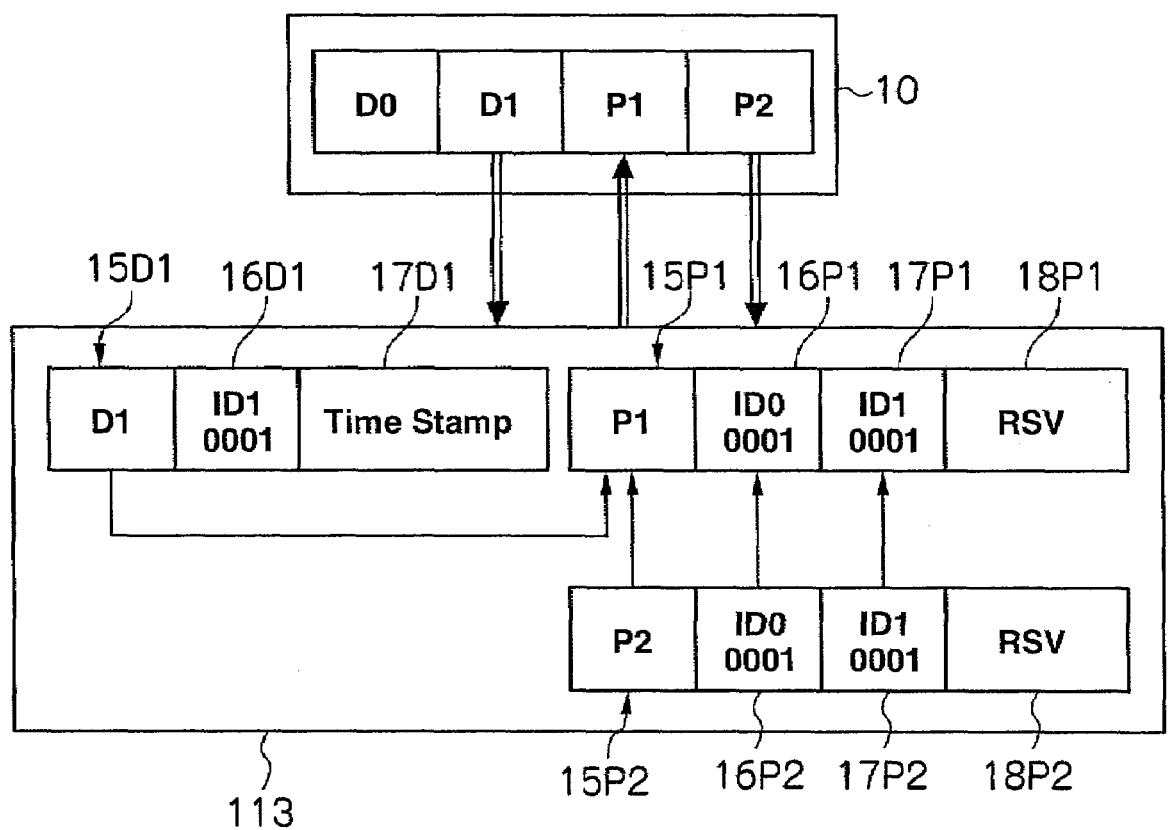
FIG. 48 is a conceptual diagram of comparison abnormality processing during data recovery copy processing according to an embodiment of the present invention.

When the microprocessor 110A, as shown in FIG. 48, determines that the guarantee code 16D1 of the partitioned host data D1 and the guarantee code 16P2 of the read parity data P2 coincide (SP218: YES), it determines that there is an abnormality in the parity data P1 that was read first, and therefore performs the abnormality processing of the parity data P1 (SP219).

Figure 49:
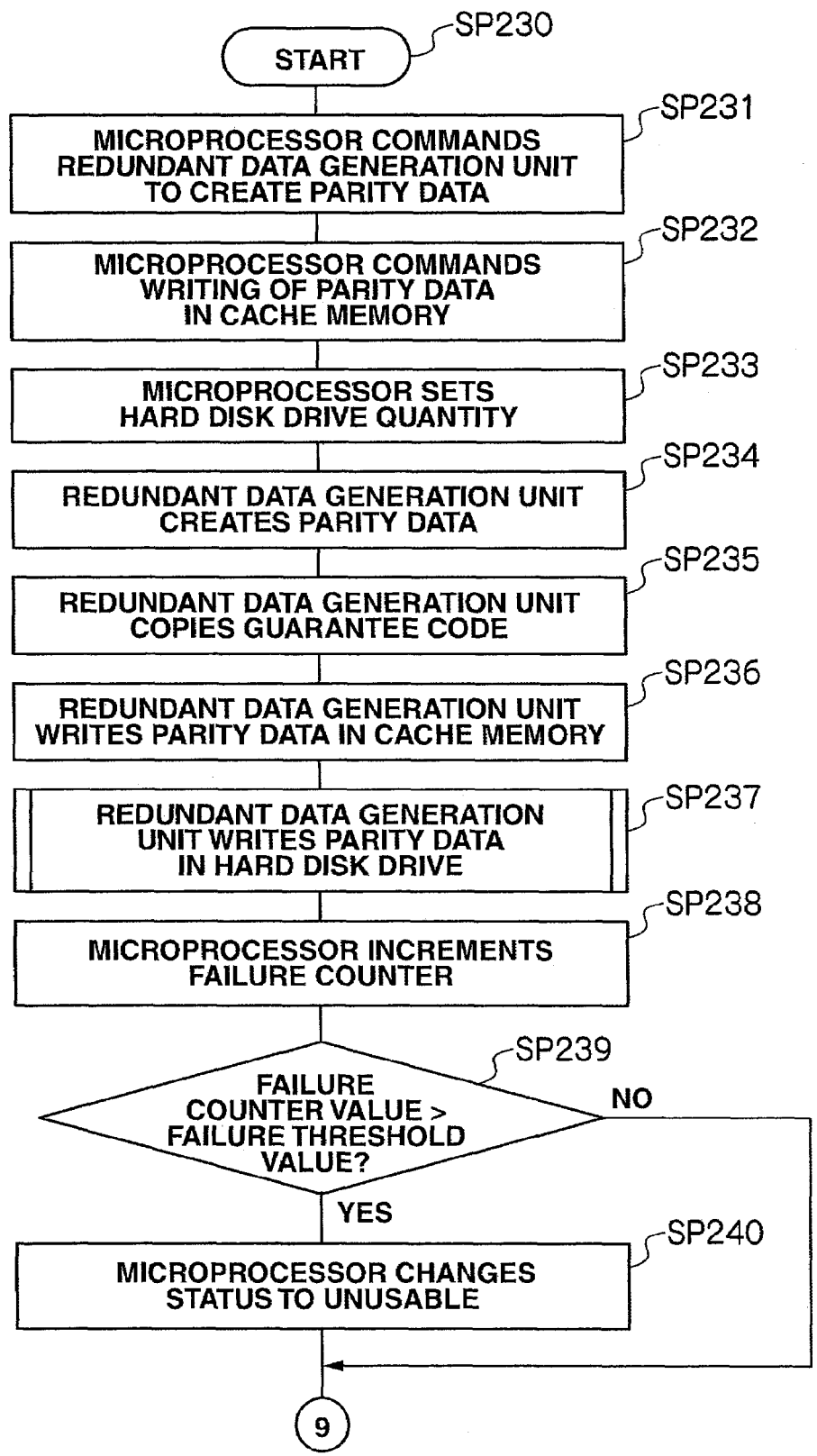
FIG. 49 is a flowchart of parity data abnormality processing during data recovery copy processing according to an embodiment of the present invention.

Then, the microprocessor 110A, as shown in FIG. 49, performs the processing routine of step SP230 to step SP240 regarding the parity data P1 as with the processing routine of step SP170 to step SP180. Thereby, the microprocessor 110A proceeds to the routine of step SP201 after the result of executing the abnormality processing of the parity data P1.

Meanwhile, when the microprocessor 110A, at step SP218, determines that the guarantee code 16D1 of the partitioned host data D1 and the guarantee code 16P2 of the read parity data P2 do not coincide (SP218: NO), it performs the processing routine of step SP220 to step SP225 as with the processing routine of step SP131 to step SP136.

When the microprocessor 110A determines that the guarantee code 16P1 of the parity data P1 and the guarantee code 16P2 of the read parity data P2 coincide (SP225: YES), it determines that there is an abnormality in the partitioned host data D1 that was read first, and performs the abnormality processing of the partitioned host data D1 (SP226).

Figure 50:
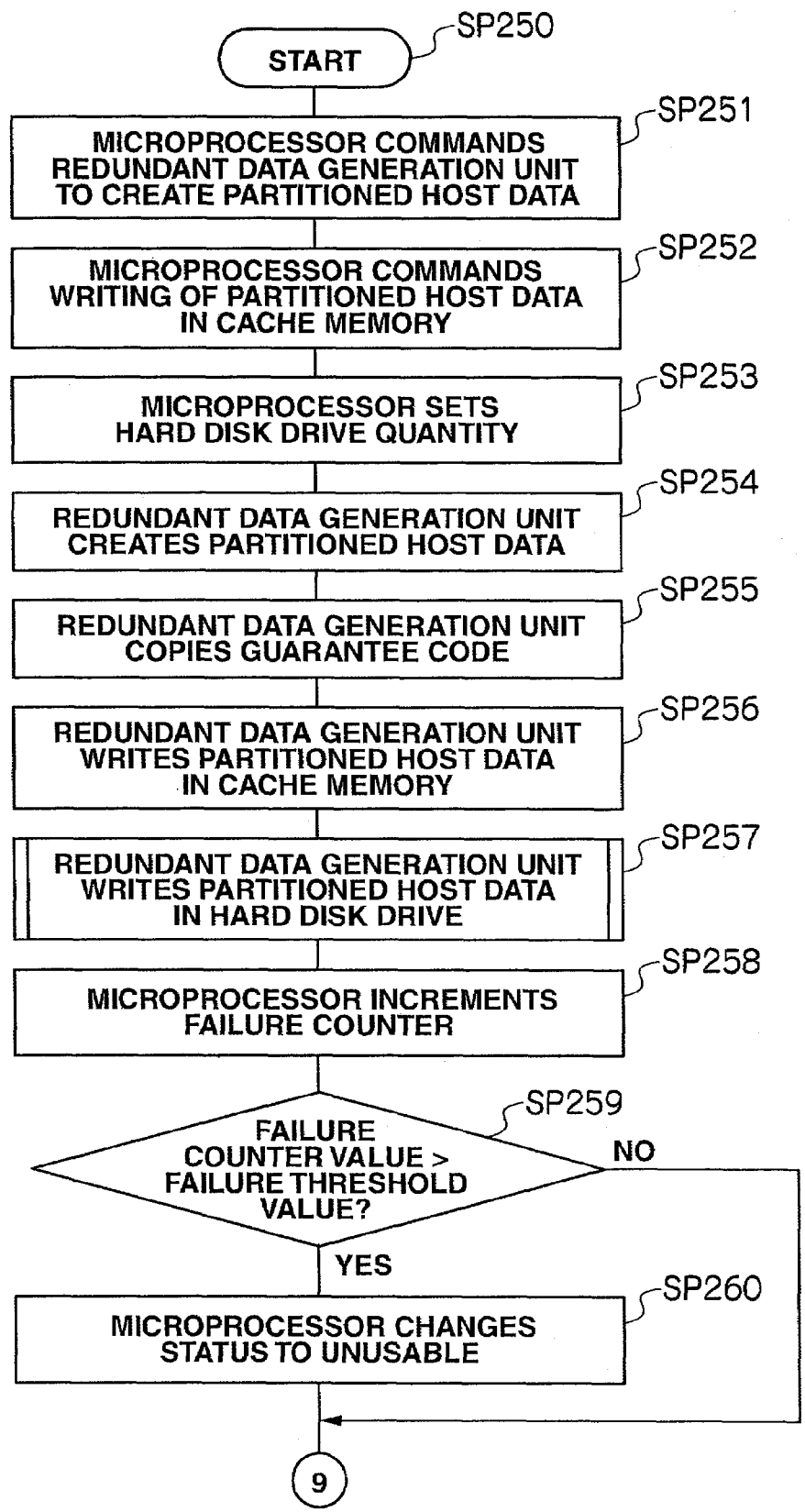
FIG. 50 is a flowchart of partitioned host data abnormality processing during data recovery copy processing according to an embodiment of the present invention.

Regarding this abnormality processing of the partitioned host data D1, as shown in FIG. 50, the microprocessor 110A will perform the processing routine of step SP250 to step SP260 regarding the partitioned host data D1 as with the processing routine of step SP170 to step SP180. Thereby, the microprocessor 110A proceeds to step SP201 after the result of executing the abnormality processing of the partitioned host data D1.

Meanwhile, when the microprocessor 110A determines that the guarantee code 16P1 of the parity data P1 and the guarantee code 16P2 of the read parity data P2 do not coincide (SP225: NG), it determines that none of the guarantee codes of the partitioned host data D0, D1 and the parity data P1, P2 coincide.

Accordingly, the microprocessor 110A sets the RAID group as "unusable" (SP227), sets the data recovery copy to "failure" (SP228), and then ends this processing (SP229).

(1-2-2-2-7) Processing Contents of Guarantee Code Recovery

The processing contents of recovering the guarantee code when the storage apparatus 4 compares the guarantee code of the partitioned host data and the guarantee code of the parity data and the guarantee codes do not coincide based on a read request of data from the host system are now explained.

Figure 51:
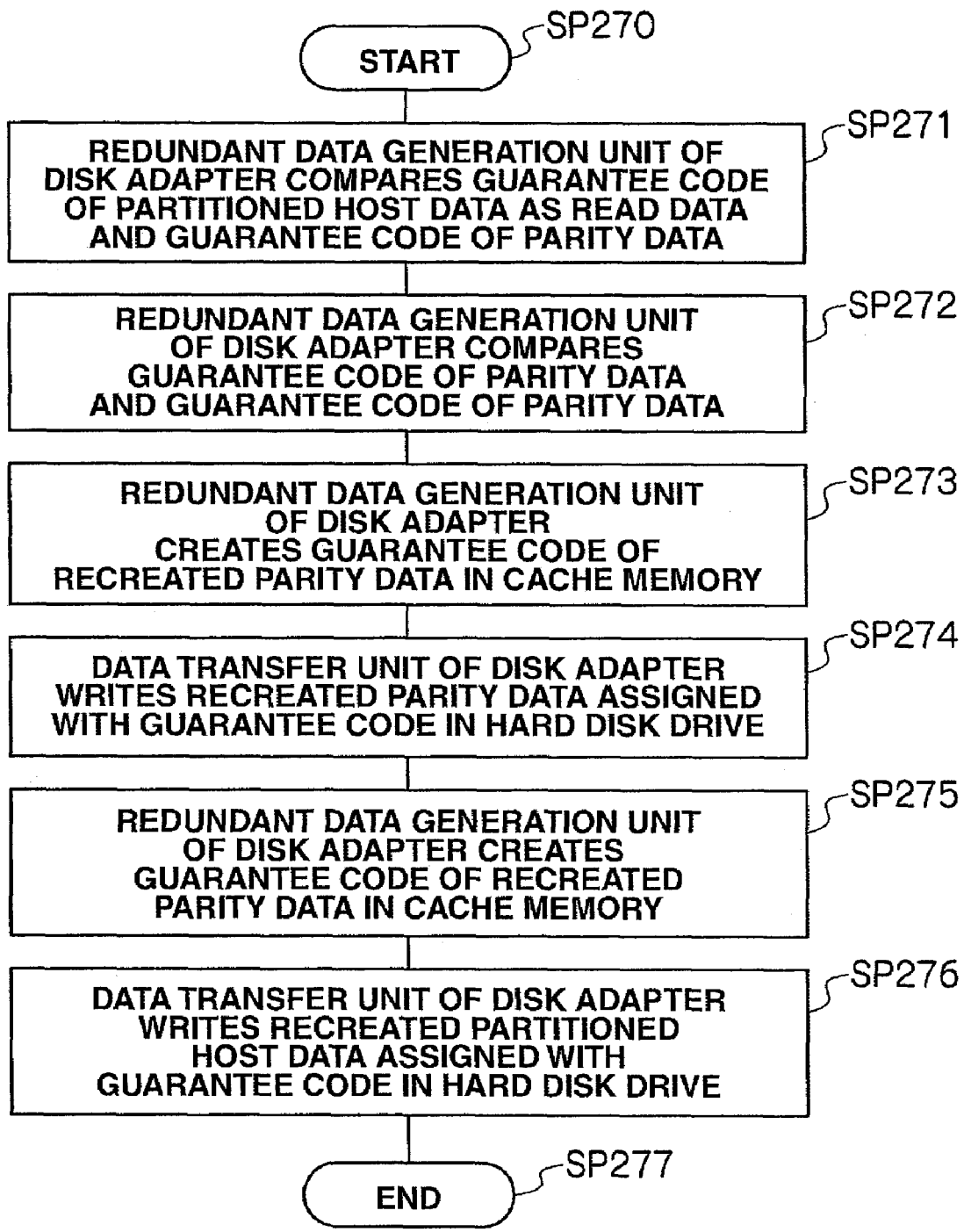
FIG. 51 is a flowchart of verifying a guarantee code during data recovery copy according to an embodiment of the present invention.

Specifically, as shown in FIG. 51, the disk adapter 11 starts the guarantee code recovery processing once it starts the data recovery copy processing based on the data recovery copy program (SP270).

The redundant data generation unit 113 of the disk adapter 11 compares the guarantee code of the partitioned host data as the read data and the guarantee code of the parity data corresponding to the partitioned host data (SP271).

Subsequently, the redundant data generation unit 113 of the disk adapter 11 compares the guarantee codes of the parity data corresponding to the partitioned host data as the read data (SP272).

The redundant data generation unit 113 of the disk adapter 11 creates a guarantee code of the recreated parity data in the cache memory (SP273).

The data transfer unit 112 of the disk adapter 11 writes the recreated parity data assigned with a guarantee code into the hard disk drive (SP274).

The redundant data generation unit 113 of the disk adapter 11 creates a guarantee code of the recreated partitioned host data in the cache memory (SP275).

The data transfer unit 112 of the disk adapter 11 writes the recreated partitioned host data assigned with a guarantee code into the hard disk drive (SP276), and then ends this guarantee code recovery processing (SP277).

(1-3) Effect of First Embodiment

According to the present invention, it is possible to guarantee the reliability of data by comparing the guarantee codes even with the heavy use of inexpensive hard disk drives.

Further, since the channel adapters and disk adapters verify the guarantee codes inside the storage system, it is possible to verify the reliability of data stored in the hard disk drive in a short period of time.

(2) Second Embodiment

The storage system 1 according to the present embodiment is configured the same as the storage system 1 according to the first embodiment, and the explanation thereof is omitted. Further, the same reference numeral is given to the same component as in the first embodiment.

In the second embodiment, the processing contents for setting a guarantee code of partitioned host data and copying the guarantee code of such data to parity data using the partitioned host data and parity data stored in advance in the hard disk drive 50 based on a write request from the host system are explained.

(2-1) Processing Contents of Channel Adapter

Figure 52:
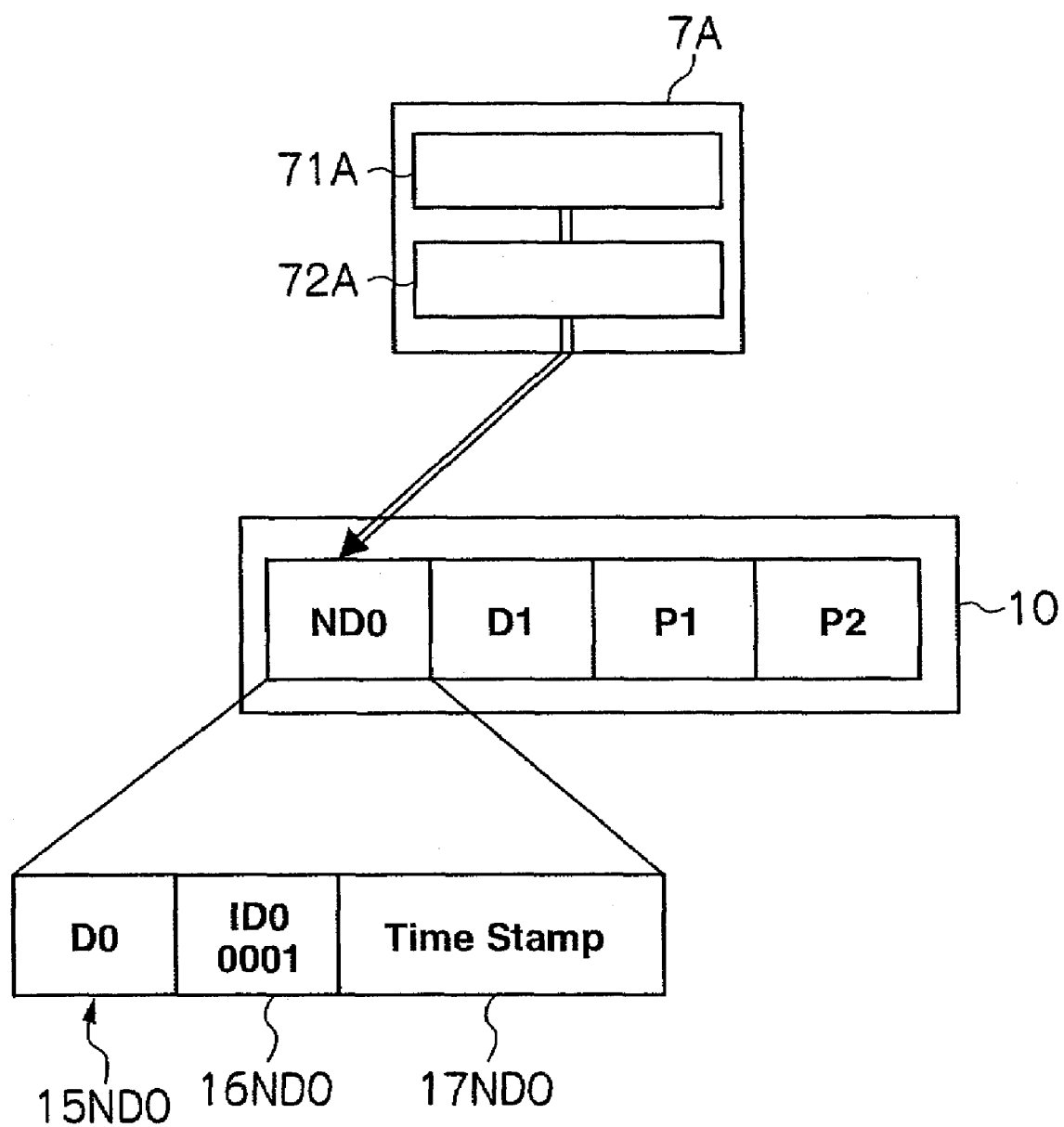
FIG. 52 is a conceptual diagram showing a case of writing partitioned host data in a channel adapter according to another embodiment of the present invention.

Foremost, the processing contents of the microprocessor 70 of the channel adapter 7 setting a guarantee code 16ND0 of a new partitioned host data ND0 based on a write request from the host system are explained. The microprocessor 70, as shown in FIG. 52, performs the same routine as the processing routine of step SP0 to SP12 regarding the new partitioned host data ND0 based on the channel adapter write program 730 since the new partitioned host data ND0 is written in the cache memory, and thereafter written in the hard disk drive 50A.

(2-2) Processing Contents of Disk Adapter

Foremost, the processing contents of the disk adapter 11 copying the guarantee code 16ND0 of the new partitioned host data ND0 to the parity data P1, P2 based on the a write request from the host system 2 are explained. The write processing on the side of the disk adapter 11 is executed by the microprocessor 110 based on the disk adapter write program 115.

Figure 53:
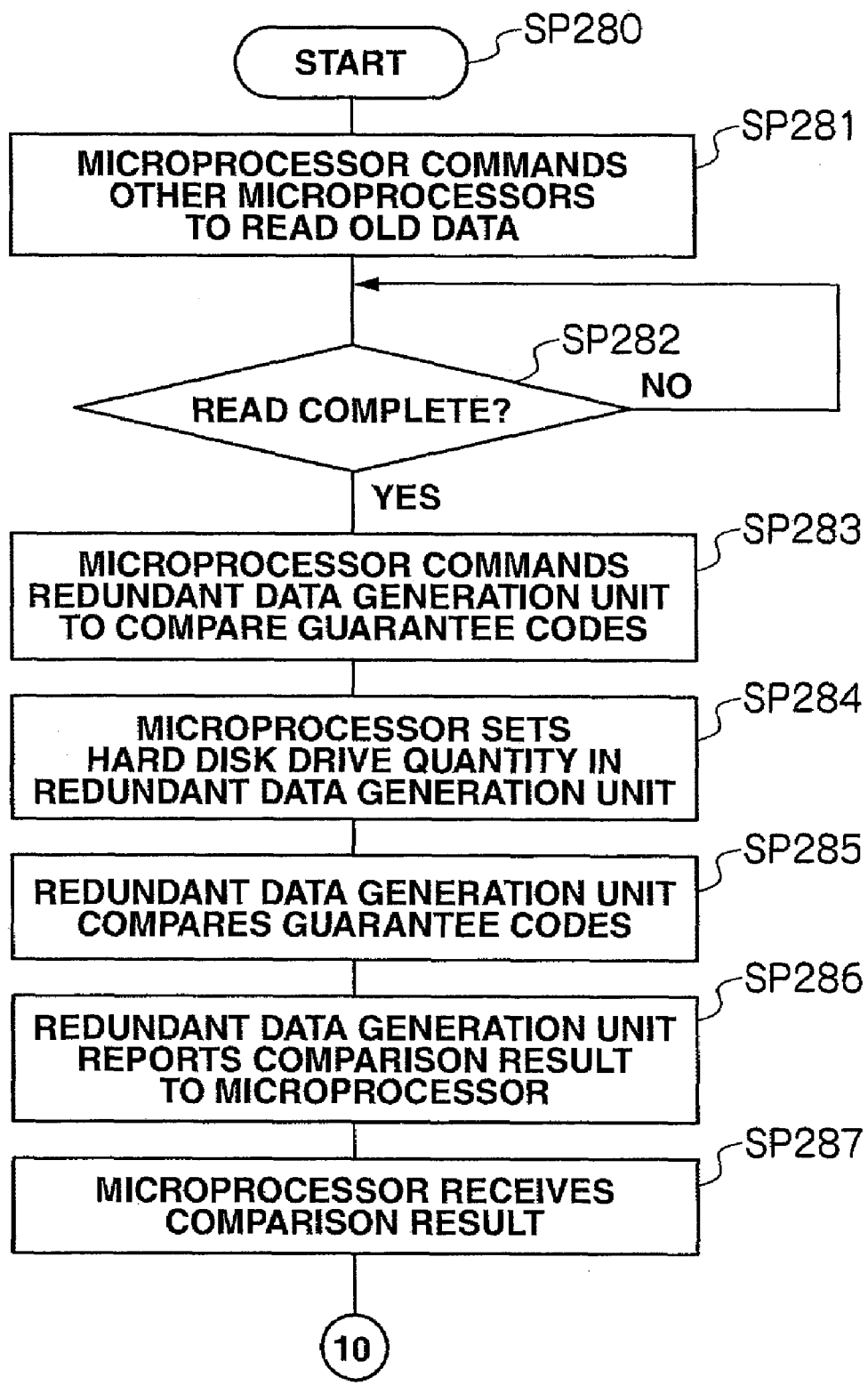
FIG. 53 is a flowchart for writing partitioned host data in a disk adapter according to another embodiment of the present invention.
Figure 54:
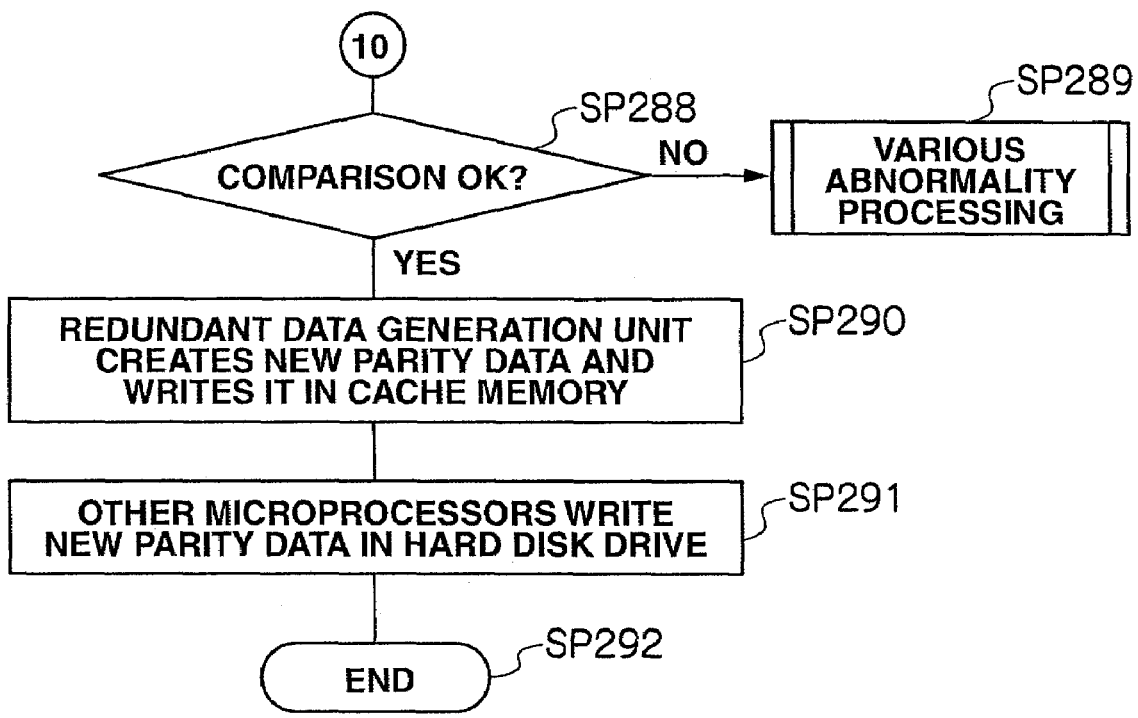
FIG. 54 is a flowchart for writing partitioned host data in a disk adapter according to another embodiment of the present invention.

Specifically, as shown in FIGS. 53 and 54, the microprocessor 110A starts this processing when a read command for writing data into the hard disk drive 50 is written into the message area 90 of the shared memory 9 (SP280).

The microprocessor 110A issues a command to the other microprocessors 110C, 110D to read the old parity data P1, P2 from the hard disk drives 50C, 50D, and read the old partitioned host data D0 from the hard disk drive 50A (SP281).

The microprocessor 110A determines whether the old parity data P1, P2 and the old partitioned host data D0 have been written into the cache memory 10 (SP282), and waits until the reading is complete (SP282: NO).

Figure 55:
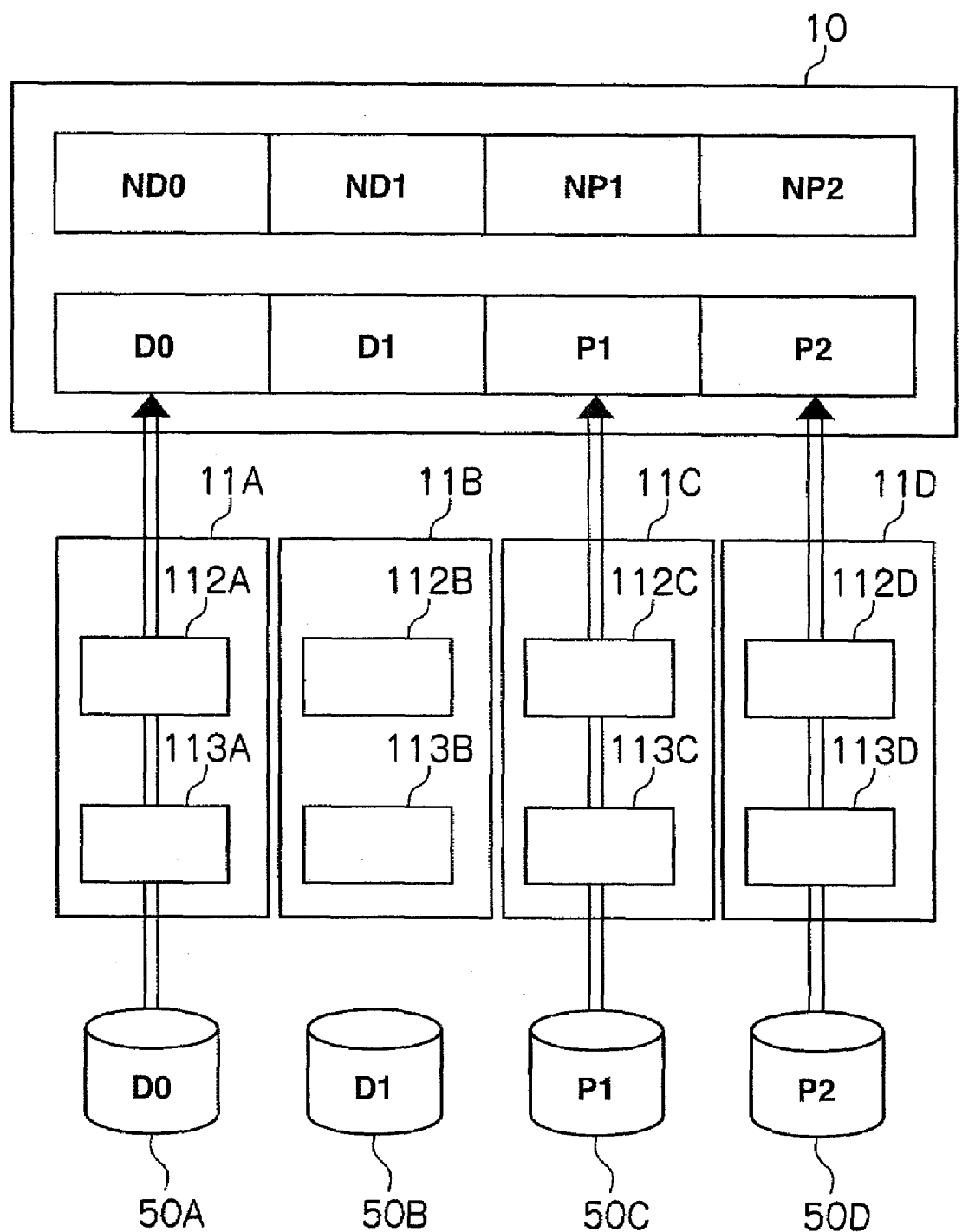
FIG. 55 is a conceptual diagram showing a case of writing partitioned host data in a disk adapter according to another embodiment of the present invention.

Meanwhile, as shown in FIG. 55, when the microprocessor 110A reads the new partitioned host data ND0, the old partitioned host data D0 and the old parity data P1, P2 in the cache memory 10 into the disk adapter 11A, it issues a command to compare the guarantee codes 16D0, 16P1 of the old partitioned host data D0 and the old parity data P1 (SP283).

The microprocessor 110A issues a command to the redundant data generation unit 113A to refer to the RAID group information table 910 in the configuration information area 91 of the shared memory 9, and set the number of hard disk drives configuring the RAID group (SP284). In this embodiment, the microprocessor 110A sets the number of hard disk drives to "4".

Figure 56:
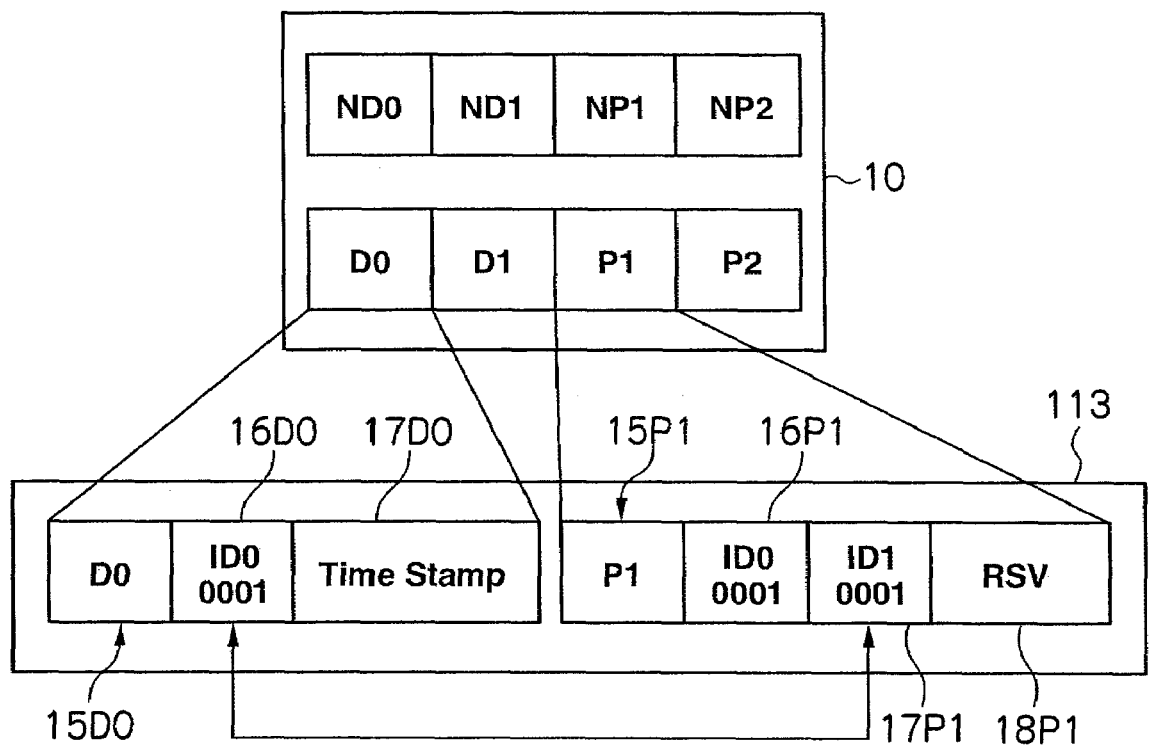
FIG. 56 is a conceptual diagram showing a case of writing partitioned host data in a disk adapter according to another embodiment of the present invention.

The redundant data generation unit 113A that received this command, as shown in FIG. 56, compares the guarantee codes 16D0, 16P1 of the old partitioned host data D0 and the old parity data P1 (SP285), and reports the comparison result to the microprocessor 110A (SP286).

When the microprocessor 110A receives this report (SP287), it determines whether the comparison was a match (SP288), and, when the microprocessor 110A determines that the guarantee codes do not coincide (SP288: NO), it starts the abnormality processing of the old parity data P1 or the old partitioned host data D0 as with the routine of step SP150 to step SP165 or step SP170 to step SP183.

Figure 57:
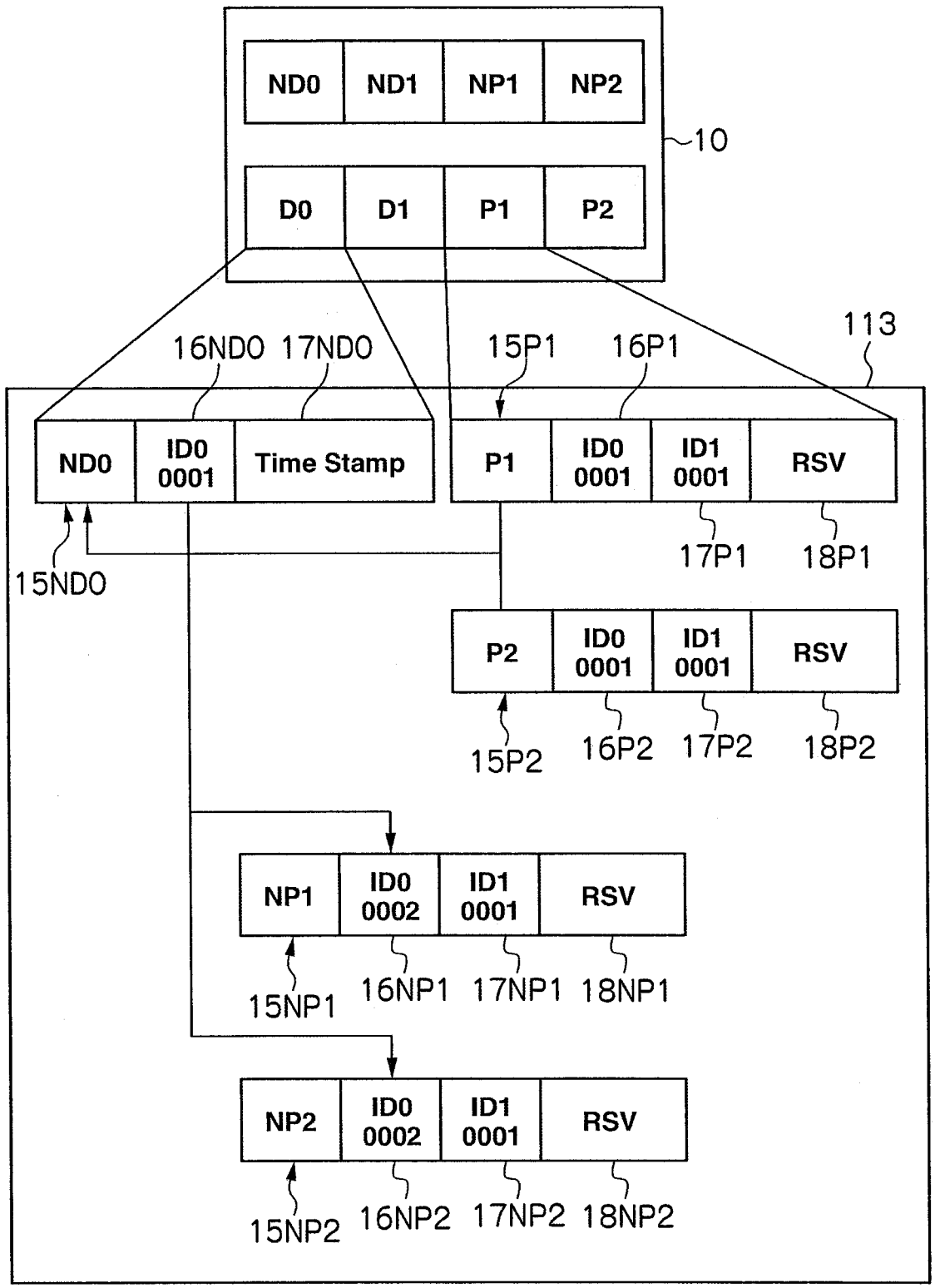
FIG. 57 is a conceptual diagram showing a case of writing partitioned host data in a disk adapter according to another embodiment of the present invention.

Meanwhile, when the microprocessor 110A determines that the guarantee codes coincide (SP288: YES), as shown in FIG. 57, the redundant data generation unit 113A copies the guarantee code of the new partitioned host data ND0, creates the new parity data NP1, NP2, and writes the new parity data NP1, NP2 in the cache memory 10 (SP290).

Then, based on the command from the microprocessor 110A, the other microprocessors 110B, 110C write the new parity data NP1, NP2 into the respective hard disk drives 50B, 50C (SP291), and then end this processing (SP292).

Incidentally, the write processing of the other microprocessors 110B, 110C is performed according to the same routine as step SP40 to step SP46 regarding the new parity data NP1, NP2.

Further, when reading data in the second embodiment, the same processing routine as the first embodiment is employed, and the explanation thereof is omitted.

(2-3) Effect of Second Embodiment

According to the present invention, it is possible to guarantee the reliability of new data when writing new data even with the heavy use of inexpensive hard disk drives by comparing the guarantee codes that were stored first.

Further, since the channel adapters and disk adapters verify the guarantee codes inside the storage system, it is possible to verify the reliability of data stored in the hard disk drive in a short period of time.

(3) Other Embodiments

The comparison (verification) of guarantee codes can also be conducted by reading the partitioned host data or the parity data from the hard disk drive after writing the partitioned host data or the parity data into the hard disk drive. Moreover, the comparison (verification) of guarantee codes can also be conducted periodically or during the reading of data.

Although four hard disk drives were illustrated in the first and second embodiments, the number of hard disk drives is not limited to the above. For example, the hard disk unit may be equipped with eight hard disk drives, and the partitioned host data D0 to D5 and the parity data P1, P2 may be stored in the respective hard disk drives.

Although a case was illustrated of providing a channel adapter 7 in the storage controller (storage apparatus) as the first generation unit for generating a guarantee number (guarantee code) in data from a host system to be stored in a hard disk drive showing the guarantee of such data, and a disk adapter 11 as a second generation unit for generating a guarantee number showing the guarantee of parity data corresponding to the data from the host system and a verification unit for verifying the guarantee number showing the guarantee of data from the host system, the first generation unit, the second generation unit and the verification unit may be configured from individual hardware.

Although a case was illustrated of providing a channel adapter 7 as the first assignment unit for assigning a guarantee number to data showing the guarantee of such data from the host system generated based on the first generation unit, and a disk adapter 11 as a second assignment unit for assigning a guarantee number to parity data showing the guarantee of such parity data generated based on the second generation unit, the first assignment unit and the second assignment unit may be configured from individual hardware.

The present invention can be broadly applied to a storage system having one or more storage apparatuses, or a storage system of various other embodiments.

We claim:

1. A storage system having a storage apparatus that provides a storage extent for reading and writing data from and in a host system, and a storage controller for controlling said storage apparatus, comprising:

a first generation unit for generating a guarantee number which guarantees the reliability of data to or from a host system to be stored in said storage apparatus;

a second generation unit for generating a guarantee number which guarantees the reliability of parity data corresponding to data from said host system; and a verification unit for verifying the guarantee number which guarantees the reliability of data to or from said host system and the guarantee number which guarantees the reliability of said parity data, wherein upon a microprocessor, included in a disk adapter of said storage controller, receiving a read command from a channel adapter included in said storage controller, the microprocessor issues a command to a protocol chip included in the disk adapter to set an identification (ID), Logical Block Address (LBA) and transfer size of partitioned host data of a hard disk drive stored in the partitioned host data, wherein the microprocessor thereafter sets the LBA and transfer size of a cache memory as a transfer destination of the partitioned host data in a data transfer unit, wherein according to a command from the microprocessor, a protocol chip included in the disk adapter sets the ID, LBA and transfer size of the partitioned host data of the hard disk drive, and thereafter reads the partitioned host data and transfers the ID, LBA and transfer size of the partitioned host data to the data transfer unit, wherein the data transfer unit transfers the partitioned host data to the address of the cache memory, wherein the microprocessor issues a command to another microprocessor to read parity data from the hard disk drive and transfer the parity data to the cache memory, wherein the another microprocessor reads the parity data from the hard disk drive and transfers the parity data to the cache memory, wherein the microprocessor determines, based on the command, whether the parity data was transferred and read into the cache memory, and when the microprocessor determines that such parity data was not read into the cache memory, the microprocessor waits for the parity data to be read into the cache memory, wherein, when the microprocessor determines, based on the command, that the parity data has been read into the cache memory, the microprocessor issues a command to the verification unit to read the partitioned host data and the parity data from the cache memory into the disk adapter, wherein when the partitioned host data and the parity data are read into the disk adapter, the microprocessor issues a command to the verification unit to verify the guarantee code of the partitioned host data and the guarantee code of the parity data, wherein the microprocessor refers to a Redundant Array of Independent Disks (RAID) group information table in a configuration information area of a shared memory, and sets the number of hard disk drives configuring the RAID group in the verification unit, wherein the verification unit, according to a verify command from the microprocessor, verifies the guarantee code of the partitioned host data and the guarantee code of the parity data, and reports a result of the verification to the microprocessor, wherein when the microprocessor receives the verification result from the verification unit, the microprocessor determines based on the verification result whether the guarantee code of the partitioned host data and the guarantee code of the parity data coincides or not, wherein when the microprocessor determines that the guarantee code of the partitioned host data and the guarantee code of the parity data do not coincide, the microprocessor determines that one of the data is not guaranteed, and executes comparison abnormality processing, wherein when the microprocessor determines that the guarantee code of the partitioned host data and the guarantee code of the parity data coincide, the microprocessor sets a message indicating that the reading from the hard disk drive is complete in the message information table of the shared memory.

2. The storage system according to claim 1, further comprising:

a first assignment unit for assigning a guarantee number showing the guarantee of data from said host system generated based on the first generation unit to said data; and a second assignment unit for assigning a guarantee number showing the guarantee of said parity data generated based on the second generation unit to said parity data.

3. The storage system according to claim 1, wherein said second generation unit generates a guarantee number showing the guarantee of said parity data by copying a guarantee number showing the guarantee of data from said host system generated with the first generation unit.

4. The storage system according to claim 1, further comprising:

a detection unit for detecting a failure in data from said host system or said parity data when the guarantee number assigned to data from said host system and the guarantee number assigned to said parity data do not coincide based on said verification unit.

5. The storage system according to claim 1, wherein the first assignment unit and the second assignment unit assign a guarantee number for each minimum block unit of data to be stored in said storage apparatus.

6. A data guarantee method of a storage system having a storage apparatus that provides a storage extent for reading and writing data from and in a host system, and a storage controller for controlling said storage apparatus, comprising:

a first generation step for generating a guarantee number showing the guarantee of data from a host system to be stored in said storage apparatus;

a second generation step for generating a guarantee number showing the guarantee of parity data corresponding to data from said host system; and a verification step for verifying the guarantee number showing the guarantee of data from said host system and the guarantee number showing the guarantee of said parity data, wherein upon a microprocessor, included in a disk adapter of said storage controller, receiving a read command from a channel adapter included in said storage controller, the microprocessor issues a command to a protocol chip included in the disk adapter to set an identification (ID), Logical Block Address (LBA) and transfer size of partitioned host data of a hard disk drive stored in the partitioned host data, wherein the microprocessor thereafter sets the LBA and transfer size of a cache memory as a transfer destination of the partitioned host data in a data transfer unit, wherein according to a command from the microprocessor, a protocol chip included in the disk adapter sets the ID, LBA and transfer size of the partitioned host data of the hard disk drive, and thereafter reads the partitioned host data and transfers the ID, LBA and transfer size of the partitioned host data to the data transfer unit, wherein the data transfer unit transfers the partitioned host data to the address of the cache memory, wherein the microprocessor issues a command to another microprocessor to read parity data from the hard disk drive and transfer the parity data to the cache memory, wherein the another microprocessor reads the parity data from the hard disk drive and transfers the parity data to the cache memory, wherein the microprocessor determines, based on the command, whether the parity data was transferred and read into the cache memory, and when the microprocessor determines that such parity data was not read into the cache memory, the microprocessor waits for the parity data to be read into the cache memory, wherein, when the microprocessor determines, based on the command, that the parity data has been read into the cache memory, the microprocessor issues a command to the verification unit to read the partitioned host data and the parity data from the cache memory into the disk adapter, wherein when the partitioned host data and the parity data are read into the disk adapter, the microprocessor issues a command to the verification unit to verify the guarantee code of the partitioned host data and the guarantee code of the parity data, wherein the microprocessor refers to a Redundant Array of Independent Disks (RAID) group information table in a configuration information area of a shared memory, and sets the number of hard disk drives configuring the RAID group in the verification unit, wherein the verification unit, according to a verify command from the microprocessor, verifies the guarantee code of the partitioned host data and the guarantee code of the parity data, and reports a result of the verification to the microprocessor, wherein when the microprocessor receives the verification result from the verification step, the microprocessor determines based on the verification result whether the guarantee code of the partitioned host data and the guarantee code of the parity data coincides or not, wherein when the microprocessor determines that the guarantee code of the partitioned host data and the guarantee code of the parity data do not coincide, the microprocessor determines that one of the data is not guaranteed, and executes comparison abnormality processing, wherein when the microprocessor determines that the guarantee code of the partitioned host data and the guarantee code of the parity data coincide, the microprocessor sets a message indicating that the reading from the hard disk drive is complete in the message information table of the shared memory.

7. The data guarantee method according to claim 6, further comprising:

a first assignment step for assigning a guarantee number showing the guarantee of data from said host system generated based on the first generation step to said data; and a second assignment step for assigning a guarantee number showing the guarantee of said parity data generated based on the second generation step to said parity data.

8. The data guarantee method according to claim 6, wherein at said second generation step, a guarantee number showing the guarantee of said parity data is generated by copying a guarantee number showing the guarantee of data from said host system generated at the first generation step.

9. The data guarantee method according to claim 6, further comprising:

a detection step for detecting a failure in data from said host system or said parity data when the guarantee number assigned to data from said host system and the guarantee number assigned to said parity data do not coincide based on said verification step.

10. The data guarantee method according to claim 6, wherein the first assignment step and the second assignment step assign a guarantee number for each minimum block unit of data to be stored in said storage apparatus.

* * * * *